(12) United States Patent  (10) Patent No.: US 7,105,210 B2
Heckmeier et al.  (45) Date of Patent: Sep. 12, 2006

(54) LIQUID-CRYSTALLINE MEDIUM

(75) Inventors: Michael Heckmeier, Hemsbach (DE); Brigitte Schuler, Grossostheim (DE); Izumi Saito, Darmstadt (DE); Sabine Schoen, Herten (DE); Peer Kirsch, Seeheim-Jugenheim (DE)

(73) Assignee: Merck Patent GmbH, Darmstadt (DE)

( * ) Notice: Subject to any disclaimer, the term of this patent is extended or adjusted under 35 U.S.C. 154(b) by 172 days.

(21) Appl. No.: 10/792,794

(22) Filed: Mar. 5, 2004

(65) Prior Publication Data

US 2004/0173776 A1  Sep. 9, 2004

(30) Foreign Application Priority Data

Mar. 5, 2003 (DE) ................. 103 09 513

(51) Int. Cl.
C09K 19/30 (2006.01)
C09K 19/12 (2006.01)
C09K 19/20 (2006.01)
C09K 19/34 (2006.01)
C09K 19/32 (2006.01)

(52) U.S. Cl. ............ 428/1.1; 252/299.63; 252/299.66; 252/299.67; 252/299.62; 252/299.61

(58) Field of Classification Search ........... 252/299.61, 252/299.63, 299.66, 299.67, 299.62; 428/1.1
See application file for complete search history.

(56) References Cited

U.S. PATENT DOCUMENTS 5,045,229 A * 9/1991 Bartmann et al. ..... 252/299.01
5,961,881 A * 10/1999 Andou et al. ......... 252/299.63
6,007,740 A * 12/1999 Andou et al. ......... 252/299.63
6,187,223 B1 * 2/2001 Andou et al. ......... 252/299.63
6,325,949 B1 * 12/2001 Takeshita et al. ...... 252/299.63
6,395,353 B1 * 5/2002 Yanai et al. ................. 428/1.1
6,497,929 B1 * 12/2002 Miyairi et al. ............... 428/1.1
6,641,872 B1 * 11/2003 Kubo et al. .................. 428/1.1
6,723,866 B1 * 4/2004 Kirsch et al. ................. 558/17

* cited by examiner

Primary Examiner—Shean C. Wu
(74) Attorney, Agent, or Firm—Millen, White, Zelano, Branigan, P.C.

(57) ABSTRACT

A liquid-crystalline medium based on a mixture of polar compounds of positive dielectric anisotropy, which contains one or more compounds of the formula I

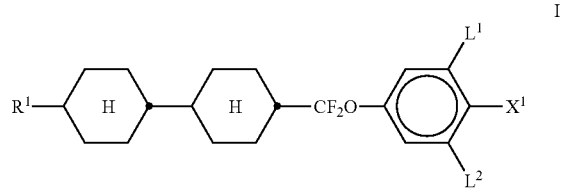

and one or more compounds of the formula IA

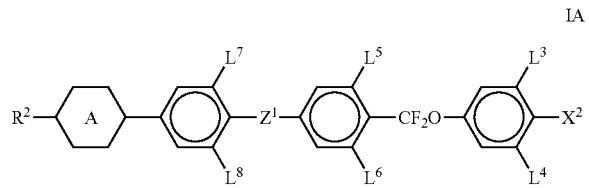

in which $R^1$, $R^2$, ring A, $L^{1-8}$, $Z^1$, $X^1$ and $X^2$ are as defined in claim 1.

21 Claims, No Drawings

LIQUID-CRYSTALLINE MEDIUM

The present invention relates to a liquid-crystalline medium, to the use thereof for electro-optical purposes, and to displays containing this medium.

Liquid crystals are used principally as dielectrics in display devices, since the optical properties of such substances can be modified by an applied voltage. Electro-optical devices based on liquid crystals are extremely well known to the person skilled in the art and can be based on various effects. Examples of such devices are cells having dynamic scattering, DAP (deformation of aligned phases) cells, guest/host cells, TN cells having a twisted nematic structure, STN (supertwisted nematic) cells, SBE (superbirefringence effect) cells and OMI (optical mode interference) cells. The most common display devices are based on the Schadt-Helfrich effect and have a twisted nematic structure.

The liquid-crystal materials must have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase for the above-mentioned cells, at the usual operating temperatures, i.e. in the broadest possible range above and below room temperature. Since liquid crystals are generally used as mixtures of a plurality of components, it is important that the components are readily miscible with one another. Further properties, such as the electrical conductivity, the dielectric anisotropy and the optical anisotropy, have to satisfy various requirements depending on the cell type and area of application. For example, materials for cells having a twisted nematic structure should have positive dielectric anisotropy and low electrical conductivity.

For example, for matrix liquid-crystal displays with integrated non-linear elements for switching individual pixels (MLC displays), media having large positive dielectric anisotropy, broad nematic phases, relatively low birefringence, very high specific resistance, good UV and temperature stability and lower vapor pressure are desired.

Matrix liquid-crystal displays of this type are known. Non-linear elements which can be used for individual switching of the individual pixels are, for example, active elements (i.e. transistors). The term "active matrix" is then used, where a distinction can be made between two types:
1. MOS (metal oxide semiconductor) or other diodes on a silicon wafer as substrate.
2. Thin-film transistors (TFTs) on a glass plate as substrate.

The use of single-crystal silicon as substrate material restricts the display size, since even modular assembly of various part-displays results in problems at the joins.

In the case of the more promising type 2, which is preferred, the electro-optical effect used is usually the TN effect. A distinction is made between two technologies: TFTs comprising compound semiconductors, such as, for example, CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully color-capable displays, in which a mosaic of red, green and blue filters is arranged in such a way that a filter element is opposite each switchable pixel.

The TFT displays usually operate as TN cells with crossed polarizers in transmission and are illuminated from the back.

The term MLC displays here covers any matrix display with integrated non-linear elements, i.e., besides the active matrix, also displays with passive elements, such as varistors or diodes (MIM=metal-insulator-metal).

MLC displays of this type are particularly suitable for TV applications (for example pocket TVs) or for high-information displays for computer applications (laptops) and in automobile or aircraft construction. Besides problems regarding the angle dependence of the contrast and the response times, difficulties also arise in MLC displays due to insufficiently high specific resistance of the liquid-crystal mixtures [TOGASHI, S., SEKOGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display deteriorates, and the problem of after-image elimination may occur. Since the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore important that the specific resistance exhibits the smallest possible increase with increasing temperature and after heating and/or UV exposure. The low-temperature properties of the mixtures from the prior art are also particularly disadvantageous. It is demanded that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and a low threshold voltage which do not have these disadvantages, or only do so to a reduced extent.

In addition to liquid-crystal displays which use back-lighting, i.e. are operated transmissively and if desired transflectively, reflective liquid-crystal displays are also particularly interesting. These reflective liquid-crystal displays use the ambient light for information display. They thus consume significantly less energy than back-lit liquid-crystal displays having a corresponding size and resolution. Since the TN effect is characterized by very good contrast, reflective displays of this type can even be read well in bright ambient conditions. This is already known of simple reflective TN displays, as used, for example, in watches and pocket calculators. However, the principle can also be applied to high-quality, higher-resolution active matrix-addressed displays, such as, for example, TFT displays. Here, as already in the transmissive TFT-TN displays which are generally conventional, the use of liquid crystals of low birefringence ($\Delta n$) is necessary in order to achieve low optical retardation (d·$\Delta n$). This low optical retardation results in usually acceptable low viewing-angle dependence of the contrast (cf. DE 30 22 818). In reflective displays, the use of liquid crystals of low birefringence is even more important than in transmissive displays since the effective layer thickness through which the light passes is approximately twice as large in reflective displays as in transmissive displays having the same layer thickness.

In TN (Schadt-Helfrich) cells, media are desired which facilitate the following advantages in the cells:
extended nematic phase range (in particular down to low temperatures)
storage stability, even at extremely low temperatures
the ability to switch at extremely low temperatures (outdoor use, automobiles, avionics)
increased resistance to UV radiation (longer service life)
low optical birefringence (Δn) for reflective displays.

The media available from the prior art do not allow these advantages to be achieved while simultaneously retaining the other parameters.

In the case of supertwisted (STN) cells, media are desired which enable greater multiplexability and/or a lower threshold voltage and/or broader nematic phase ranges (in particular at low temperatures). To this end, a further widening of the available parameter latitude (clearing point, smectic-nematic transition or melting point, viscosity, dielectric para-meters, elastic parameters) is urgently desired.

The invention has an object of providing media, in particular for MLC, TN or STN displays of this type, which do not have the above-mentioned disadvantages or only do so to a reduced extent, and preferably simultaneously have very low threshold voltages and at the same time high values for the voltage holding ratio (VHR).

Upon further study of the specification and appended claims, further objects and advantages of this invention will become apparent to those skilled in the art.

It has now been found that these and other objects can be achieved if media according to the invention are used in displays.

The invention thus relates to a liquid-crystalline medium based on a mixture of polar compounds of positive dielectric anisotropy, characterized in that it comprises one or more compounds of the formula I

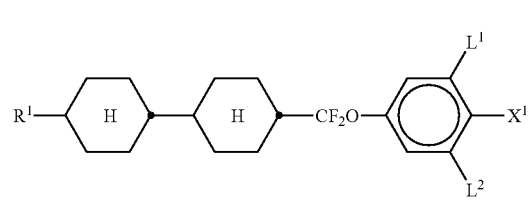

and one or more compounds of the formula IA

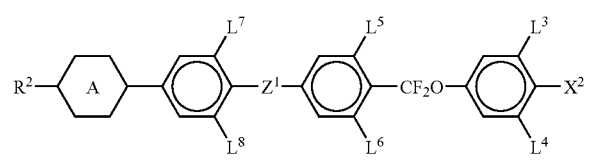

in which the individual radicals have the following meanings:
$R^1$ and $R^2$ are each, independently of one another, H, a halogenated or unsubstituted alkyl radical having from 1 to 15 carbon atoms, where one or more $CH_2$ groups in these radicals may also be replaced, in each case independently of one another, by —C≡C—, —CH=CH—, —O—,

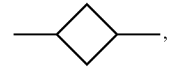

—CO—O— or —O—CO— in such a way that O atoms are not linked directly to one another,
$X^1$ and $X^2$ are each, independently of one another, F, Cl, CN, $SF_5$, SCN, NCS, or OCN, or a halogenated alkyl radical, a halogenated alkenyl radical, a halogenated alkoxy radical or a halogenated alkenyloxy radical, each having 1 to 6 carbon atoms,

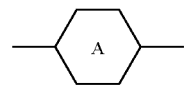

is

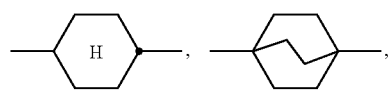

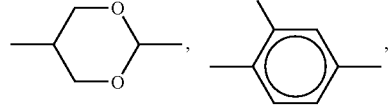

$Z^1$ is —$CH_2CH_2$—, —CH=CH—, —C≡C—, —COO—, —$CH_2O$—, —$OCH_2$—, —OOC—, —$(CH_2)_4$—, —HFO—, —CH=CF—, —CF=CH—, —CF=CF—, —$C_2F_4$—, —$CF_2O$—, —$OCF_2$— or a single bond,
$L^{1-8}$ are each, independently of one another, H or F.

The compounds of the formulae I and IA have a broad range of applications. Depending on the choice of substituents, these compounds can serve as base materials of which liquid-crystalline media are predominantly composed; however, it is also possible to add compounds of the formulae I and IA to liquid-crystalline base materials from other classes of compound in order, for example, to modify the dielectric and/or optical anisotropy of a dielectric of this type and/or in order to optimize its threshold voltage and/or its viscosity. The mixing concept according to the invention results in mixtures which are distinguished over the prior art, for example, by their very good reliability and $V_{th}/\gamma_1$ ratio, in particular in 2.5 V and 3.3 V mixtures. Furthermore, the mixtures according to the invention are distinguished over the prior art, such as, for example, EP 10 46 693 and EP 10 46 694, by smaller values for the birefringence. The mixtures according to the invention preferably have Δn values of <0.0780.

In the pure state, the compounds of the formulae I and IA are colorless and form liquid-crystalline mesophases in a temperature range which is favorably located for electro-optical use. They are stable chemically, thermally and to light.

Preferred radicals for the compounds of the formulae I and IA are indicated below.

$X^1$ and $X^2$ in the compounds of the formulae are, independently of one another, preferably F, Cl, CN, NCS, $CF_3$, $C_2F_5$, $C_3F_7$, $SF_5$, $CF_2H$, $OCF_3$, $OCF_2H$, $OCFHCF_3$, $OCFHCF_2H$, $OCFHCF_2H$, $OCF_2CH_3$, $OCF_2CFH_2$, $OCF_2CF_2H$, $OCF_2CF_2CF_2H$, $OCF_2CF_2CFH_2$, $OCF_2CF_2CF_3$, $OCFHCF_2CF_2H$, $OCFHCFHCF_3$, $OCH_2CF_2CF_3$, $OCF_2CF_2CF_3$, $OCF_2CFHCFH_2$, $OCF_2CH_2CF_2H$, $OCFHCF_2CFH_2$, $OCFHCFHCF_2H$, $OCFHCH_2CF_3$, $OCH_2CFHCF_3$, $OCH_2CF_2CF_2H$, $OCF_2CFHCH_3$, $OCF_2CH_2CFH_2$, $OCFHCF_2CH_3$, $OCFHCFHCFH_2$, $OCFHCH_2CF_3$, $OCH_2CF_2CFH_2$, $OCH_2CFHCF_2H$, $OCF_2CH_2CH_3$, $OCFHCFHCH_3$, $OCFHCH_2CFH_2$, $OCH_2CF_2CH_3$, $OCH_2CFHCFH_2$, $OCH_2CH_2CF_2H$, $OCHFCH_2CH_3$, $OCH_2CFHCH_3$, $OCH_2CH_2CFH_2$, $OCClCF_3$, $OCClCClF_2$, $OCClCFH_2$, $OCFHCCl_2F$, $OCClCF_2H$, $OCClCClF_2$, $OCF_2CClH_2$, $OCF_2CCl_2H$, $OCF_2CCl_2F$, $OCF_2CClFH$, $OCF_2CClF_2$, $OCF_2CF_2CClF_2$, $OCF_2CF_2CCl_2F$, $OCClCF_2CF_3$, $OCClCF_2CF_2H$, $OCClCF_2CClF_2$, $OCClCFHCF_3$, $OCClCClFCF_3$, $OCCl_2CF_2CF_3$, $OCClHCH_2CF_3$, $OCClCF_2CF_3$, $OCClFClFCF_3$, $OCF_2CClFCFH_2$, $OCF_2CF_2CCl_2F$, $OCF_2CCl_2CF_2H$, $OCF_2CH_2CClF_2$, $OCClCF_2CFH_2$, $OCFHCF_2CCl_2F$, $OCClCFHCF_2H$, $OCClCClFCF_2H$, $OCFHCFHCClF_2$, $OCClCH_2CF_3$, $OCFHCCl_2CF_3$, $OCHCClCF_3$, $OCH_2CClCF_3$, $OCCl_2CF_2CH_2$, $OCH_2CF_2CClF_2$, $OCF_2CClCH_3$, $OCF_2CFHCCl_2H$, $OCF_2CCl_2CFH_2$, $OCF_2CH_2CCl_2F$, $OCClCF_2CH_3$, $OCFHCF_2CCl_2H$, $OCClCClFCFH_2$, $OCFHCFHCCl_2F$, $OCClCH_2CF_3$, $OCFHCCl_2CF_3$, $OCCl_2CF_2CFH_2$, $OCH_2CF_2CCl_2F$, $OCCl_2CFHCF_2H$, $OCClHCClFCF_2H$, $OCF_2CClHCClH_2$, $OCF_2CH_2CCl_2H$, $OCClCFHCH_3$, $OCF_2CClFCCl_2H$, $OCClCH_2CFH_2$, $OCFHCCl_2CFH_2$, $OCCl_2CF_2CH_3$, $OCH_2CF_2CClH_2$, $OCCl_2CFHCFH_2$, $OCH_2CClFCFCl_2$, $OCH_2CH_2CF_2H$, $OCClHCClHCF_2H$, $OCH_2CCl_2CF_2H$, $OCClCH_2CH_3$, $OCFHCH_2CCl_2H$, $OCClHCFHCClH_2$, $OCH_2CFHCCl_2H$, $OCCl_2CH_2CF_2H$, $OCH_2CCl_2CF_2H$, $CH=CF_2$, $CF=CF_2$, $OCH=CF_2$, $OCF=CF_2$, $CH=CHF$, $OCH=CHF$, $CF=CHF$, $OCF=CHF$, in particular F, Cl, CN, NCS, $CF_3$, $SF_5$, $CF_2H$, $OCF_3$, $OCF_2H$, $OCFHCF_3$, $OCFHCFH_2$, $OCFHCF_2H$, $OCF_2CH_3$, $OCF_2CFH_2$, $OCF_2CF_2H$, $OCF_2CF_2CF_2H$, $OCF_2CF_2CFH_2$, $OCFHCF_3$, $OCFHCF_2CF_2H$, $OCF_2CF_2CF_3$ or $OCF_2CHFCF_3$.

If $R^1$ and/or $R^2$ are an alkyl radical and/or an alkoxy radical, this may be straight-chain or branched. It is preferably straight-chain, has 1, 2, 3, 4, 5, 6 or 7 carbon atoms and accordingly is preferably methyl, ethyl, propyl, butyl, pentyl, hexyl, heptyl, ethoxy, propoxy, butoxy, pentoxy, hexyloxy or heptyloxy, furthermore octyl, nonyl, decyl, undecyl, dodecyl, tridecyl, tetradecyl, pentadecyl, methoxy, octyloxy, nonyloxy, decyloxy, undecyloxy, dodecyloxy, tridecyloxy or tetradecyloxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxadecyl.

If $R^1$ and/or $R^2$ are an alkyl radical in which one $CH_2$ group has been replaced by —CH=CH—, this may be straight-chain or branched. It is preferably straight-chain and has from 2 to 10 carbon atoms. Accordingly, it is in particular vinyl, prop-1- or -2-enyl, but-1-, -2- or -3-enyl, pent-1-, -2-, -3- or -4-enyl, hex-1-, -2-, -3-, -4- or -5-enyl, hept-1-, -2-, -3-, -4-, -5- or -6-enyl, oct-1-, -2-, -3-, -4-, -5-, -6- or -7-enyl, non-1-, -2-, -3-, -4-, -5-, -6-, -7- or -8-enyl, or dec-1-, -2-, -3-, -4-, -5-, -6-, -7-, -8- or -9-enyl.

If $R^1$ and/or $R^2$ are an alkyl radical in which one $CH_2$ group has been replaced by —O— and one has been replaced by —CO—, these are preferably adjacent. These thus contain an acyloxy group —CO—O— or an oxycarbonyl group —O—CO—. These are preferably straight-chain and have from 2 to 6 carbon atoms. Accordingly, they are in particular acetoxy, propionyloxy, butyryloxy, pentanoyloxy, hexanoyloxy, acetoxymethyl, propionyloxymethyl, butyryloxymethyl, pentanoyloxymethyl, 2-acetoxyethyl, 2-propionyloxyethyl, 2-butyryloxyethyl, 2-acetoxypropyl, 3-propionyloxypropyl, 4-acetoxybutyl, methoxycarbonyl, ethoxycarbonyl, propoxycarbonyl, butoxycarbonyl, pentoxycarbonyl, methoxycarbonyl-methyl, ethoxycarbonylmethyl, propoxycarbonylmethyl, butoxycarbonylmethyl, 2-(methoxycarbonyl)ethyl, 2-(ethoxycarbonyl)ethyl, 2-(propoxycarbonyl)ethyl, 3-(methoxycarbonyl)propyl, 3-(ethoxycarbonyl)propyl or 4-(methoxycarbonyl)butyl.

If $R^1$ and/or $R^2$ are an alkyl radical in which one $CH_2$ group has been replaced by unsubstituted or substituted —CH=CH— and an adjacent $CH_2$ group has been replaced by CO or CO—O or O—CO, this may be straight-chain or branched. It is preferably straight-chain and has from 4 to 12 carbon atoms. Accordingly, it is in particular acryloyloxymethyl, 2-acryl-oyloxyethyl, 3-acryloyloxypropyl, 4-acryloyloxybutyl, 5-acryloyloxypentyl, 6-acryloyloxy-hexyl, 7-acryloyloxyheptyl, 8-acryloyloxyoctyl, 9-acryloyloxynonyl, 10-acryloyloxydecyl, methacryloyloxymethyl, 2-methacryloyloxyethyl, 3-methacryloyloxypropyl, 4-methacryloyloxybutyl, 5-methacryloyloxypentyl, 6-methacryloyloxyhexyl, 7-methacryloyloxyheptyl, 8-methacryloyloxyoctyl or 9-methacryloyloxynonyl.

If $R^1$ and/or $R^2$ are an alkyl or alkenyl radical which is monosubstituted by CN or $CF_3$, this radical is preferably straight-chain. The substitution by CN or $CF_3$ is in any desired position.

If $R^1$ and/or $R^2$ are an alkyl or alkenyl radical which is at least monosubstituted by halogen, this radical is preferably straight-chain, and halogen is preferably F or Cl. In the case of polysubstitution, halogen is preferably F. The resultant radicals also include perfluorinated radicals. In the case of monosubstitution, the fluorine or chlorine substituent may be in any desired position, but is preferably in the ω-position.

Compounds containing branched wing groups $R^1$ and/or R may occasionally be of importance owing to better solubility in the conventional liquid-crystalline base materials, but in particular as chiral dopants if they are optically active. Smectic compounds of this type are suitable as components of ferroelectric materials.

Branched groups of this type generally contain not more than one chain branch. Preferred branched radicals R are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexyloxy, 1-methylhexyloxy and 1-methylheptyloxy.

If $R^1$ and/or $R^2$ are an alkyl radical in which two or more $CH_2$ groups have been replaced by —O— and/or —CO—O—, this may be straight-chain or branched. It is preferably branched and has from 3 to 12 carbon atoms. Accordingly, it is in particular biscarboxymethyl, 2,2-biscarboxyethyl, 3,3-biscarboxypropyl, 4,4-biscarboxybutyl, 5,5-biscarboxypentyl, 6,6-biscarboxyhexyl, 7,7-biscarboxyheptyl, 8,8-biscarboxyoctyl, 9,9-biscarboxynonyl, 10,10-biscarboxydecyl, bis(methoxycarbonyl)methyl, 2,2-bis(methoxy-carbonyl)ethyl, 3,3-bis(methoxycarbonyl)propyl, 4,4-bis(methoxycarbonyl)butyl, 5,5-bis(methoxycarbonyl)pentyl, 6,6-bis(methoxycarbonyl)hexyl, 7,7-bis-(methoxycarbonyl)heptyl, 8,8-bis(methoxycarbonyl)octyl, bis(ethoxycarbonyl)methyl, 2,2-bis(ethoxycarbonyl)ethyl, 3,3-bis(ethoxycarbonyl)propyl, 4,4-bis(ethoxycarbonyl)butyl or 5,5-bis(ethoxycarbonyl)pentyl.

$Z^1$ is preferably a single bond, furthermore —$C_2F_4$—, —COO—, —$C_2H_4$— or —$CF_2O$—.

Ring A is preferably

furthermore

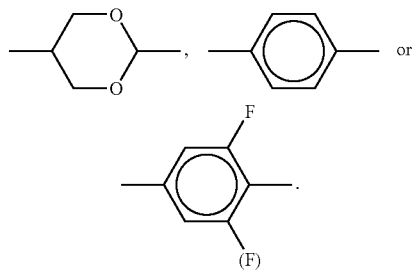

The compounds of the formulae I and IA can be prepared by methods known per se, as described in the literature (for example in the standard works, such as Houben-Weyl, Methoden der organischen Chemie [Methods of Organic Chemistry], Georg-Thieme-Verlag, Stuttgart), to be precise under reaction conditions which are known and suitable for the said reactions. Use can also be made here of variants which are known per se, but are not mentioned here in greater detail. The compounds of the formula IA are known, for example, from EP 1 046 693 A1 and EP 1 046 694 A1. The compounds of the formula I are described, for example, in GB 2,229,438.

The invention also relates to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which contain media of this type, and to the use of these media for electro-optical purposes.

The liquid-crystal mixtures according to the invention enable a significant widening of the available parameter latitude. The achievable combinations of clearing point, viscosity at low temperature, thermal and UV stability and dielectric anisotropy are far superior to previous materials from the prior art.

Compared with the mixtures disclosed in EP 1 046 693 A1, the mixtures according to the invention have low $\gamma_1$ values and relatively low threshold and Δn values. The mixtures according to the invention are preferably suitable as TN-TFT mixtures for notebook PC applications with 3.3 and 2.5 V drivers.

The liquid-crystal mixtures according to the invention, while preferably retaining the nematic phase down to −30° C., particularly preferably down to −40° C., enable clearing points preferably above 70° C., more preferably above 75° C., particularly preferably above 80° C., simultaneously dielectric anisotropy values, Δε, preferably of ≧6, more preferably ≧8, and a high value for the specific resistance to be achieved, enabling excellent STN and MLC displays to be obtained. In particular, the mixtures are characterized by low operating voltages. The TN thresholds are preferably below 1.5 V, more preferably below 1.4 V, particularly preferably <1.3 V.

It goes without saying that, through a suitable choice of the components of the mixtures according to the invention, it is also possible for higher clearing points (for example above 110° C.) to be achieved at higher threshold voltages or lower clearing points to be achieved at lower threshold voltages with retention of the other advantageous properties. At viscosities correspondingly increased only slightly, it is likewise possible to obtain mixtures having greater Δε and thus low thresholds. The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. This enables significantly higher specific resistances to be achieved using the mixtures according to the invention at the first minimum than in the case of mixtures comprising cyano compounds. Through a suitable choice of the individual components and their proportions by weight, the person skilled in the art is able to set the birefringence necessary for a pre-specified layer thickness of the MLC display using simple routine methods.

The flow viscosity $v_{20}$ at 20° C. is preferably <60 mm$^2$·s$^{-1}$, particularly preferably <50 mm$^2$·s$^{-1}$. The rotational viscosity $\gamma_1$ at 20° C. of the mixtures according to the invention is preferably <140 mPa·s, particularly preferably <120 mPa.s. The nematic phase range is preferably at least 100°, in particular at least 110°. This range preferably extends at least from −40° to +80°.

A short response time is desired in liquid-crystal displays. This applies in particular to displays which are capable of video reproduction. For displays of this type, response times (sum: $t_{on}+t_{off}$) of at most 16 ms are required. The upper limit of the response time is determined by the image refresh frequency.

Measurements of the voltage holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I and IA exhibit a significantly smaller decrease in the HR with increasing temperature than analogous mixtures comprising cyanophenylcyclohexanes of the formula

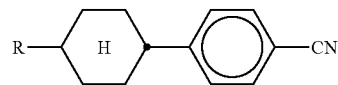

or esters of the formula

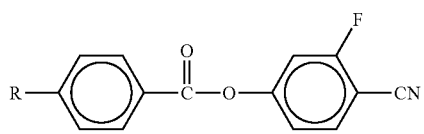

instead of the compounds of the formula IA.

The mixtures according to the invention preferably comprise only small amounts (≦10% by weight) or no nitrites. The mixtures according to the invention have values for the holding ratio of >98%, in particular greater than 99%.

The UV stability of the mixtures according to the invention is also considerably better, i.e. they exhibit a significantly smaller decrease in the HR on exposure to UV.

The formula I compounds preferably are compounds of the sub-formulae I-1 to I-27:

I-1
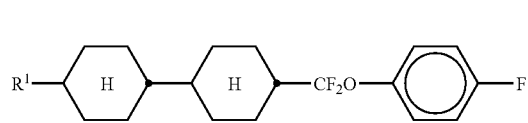

I-2
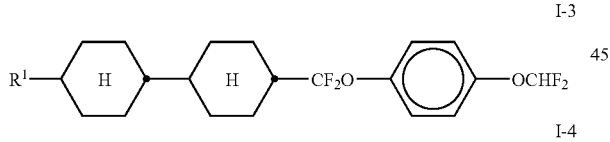

I-3
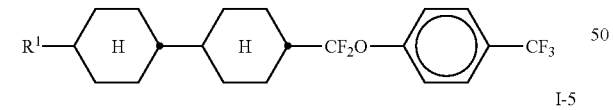

I-4
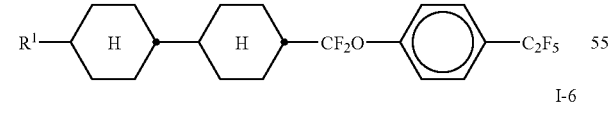

I-5

I-6

I-7

I-8
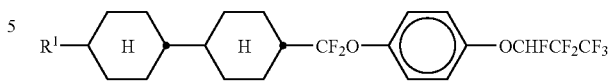

I-9
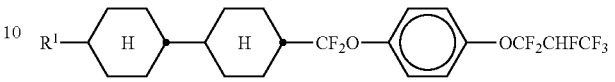

I-10

I-11
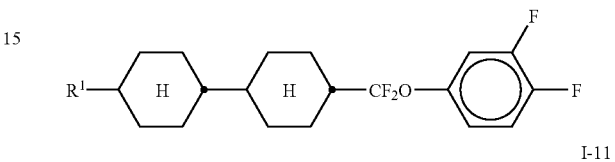

I-12

I-13
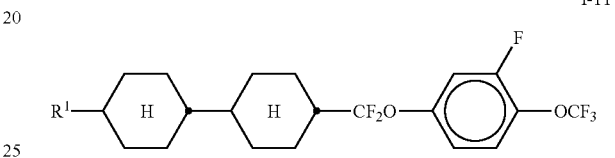

I-14

I-15
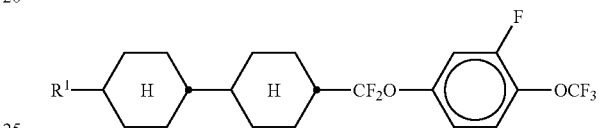

I-16
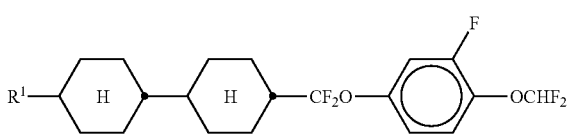

-continued

I-17
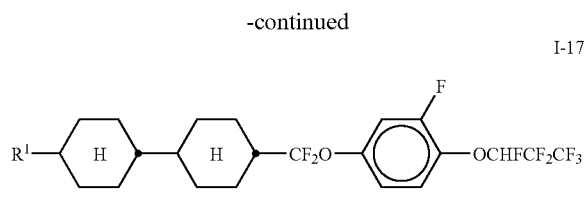

I-18

I-19
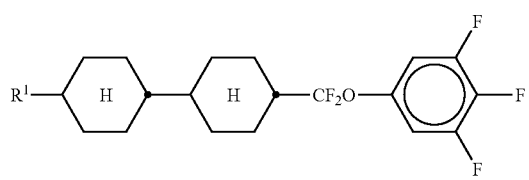

I-20
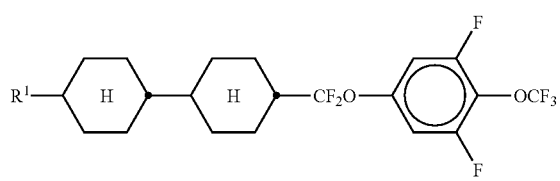

I-21
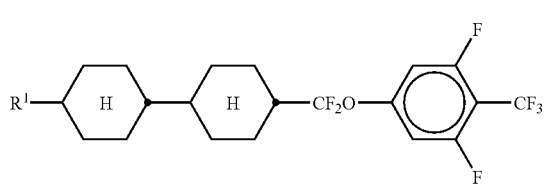

I-22

I-23
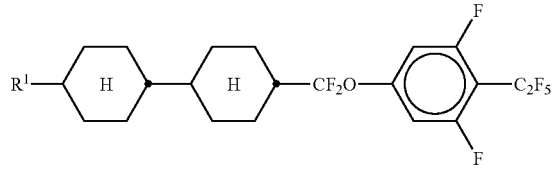

-continued

I-24
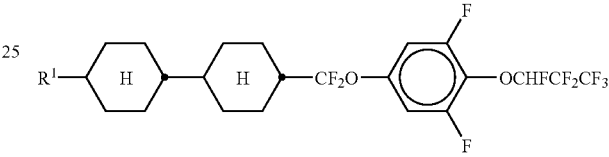

I-25

I-26
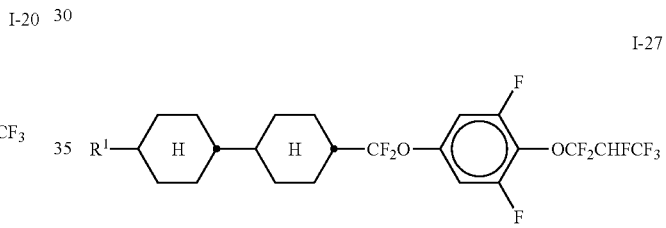

I-27

in which $R^1$ is as defined above. $R^1$ is preferably H, $CH_3$, $C_2H_5$, n-$C_3H_7$, n-$C_4H_9$, n-$C_5H_{11}$, n-$C_6H_{13}$, $CH_2$=CH, $CH_3CH$=CH, $CH_3CH$=$CHCH_2CH_2$ or $CH_2$=$CHCH_2CH_2$.

Preference is given to media according to the invention which comprise at least one compound of the formulae I-10 and/or I-19, particularly preferably in each case at least one compound of the formula I-19. Preference is furthermore given to compounds of the formulae I-11 and I-20.

Particularly preferred compounds of the formula IA are compounds of the formula IAA:

IAA

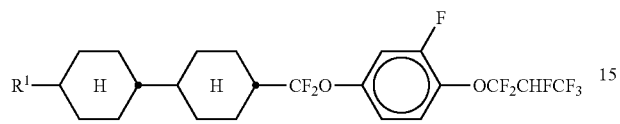

In the compound IAA, $Z^1$ is preferably a single bond.

Preferred sub-formulae of the formula IA are compounds of the sub-formulae IA-1 to IA-108:

IA-1
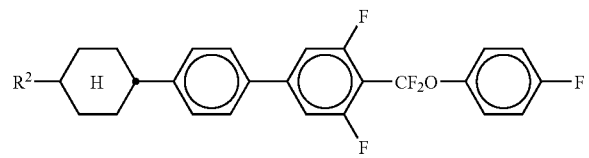
IA-2
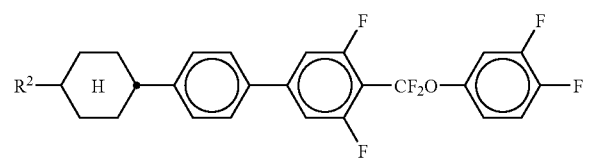
IA-3
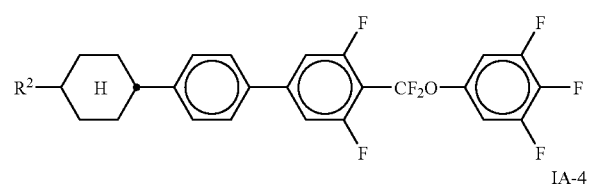
IA-4
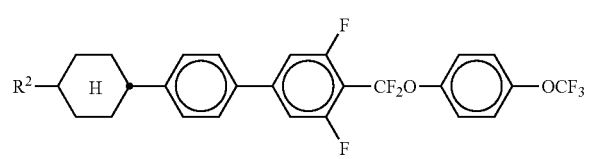
IA-5
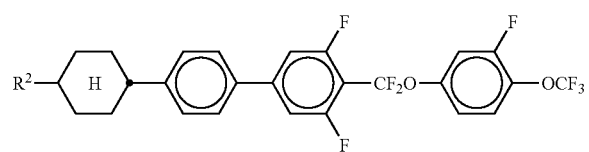
IA-6
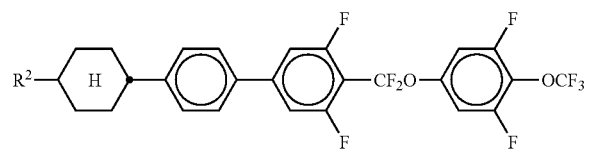
IA-7
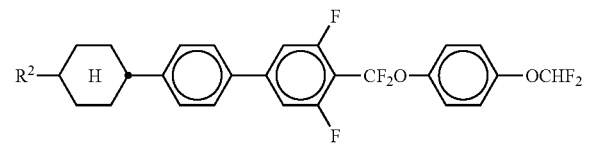
IA-8
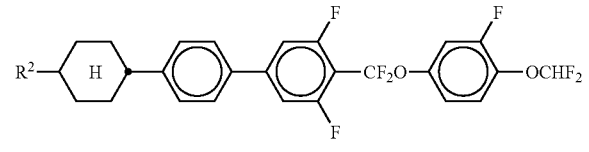
IA-9
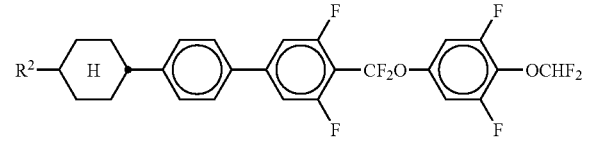

-continued
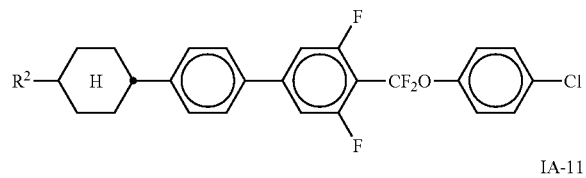
IA-10
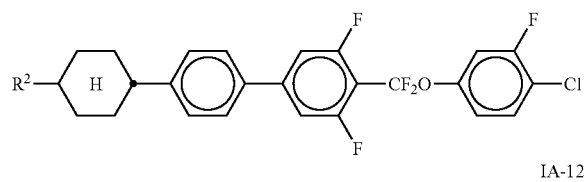
IA-11
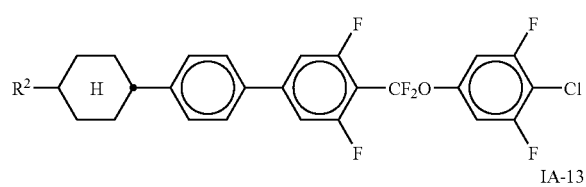
IA-12
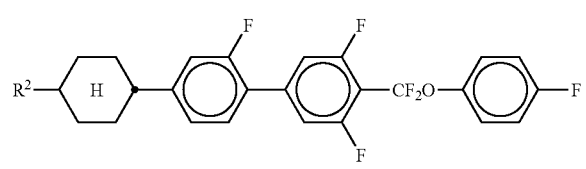
IA-13
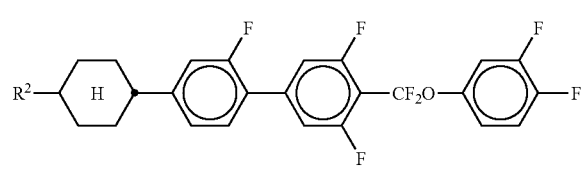
IA-14
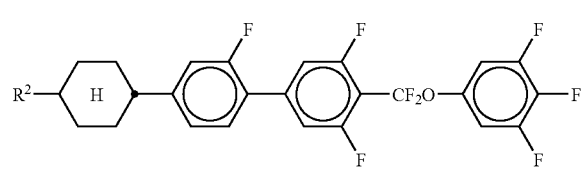
IA-15
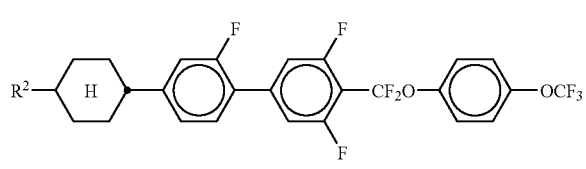
IA-16
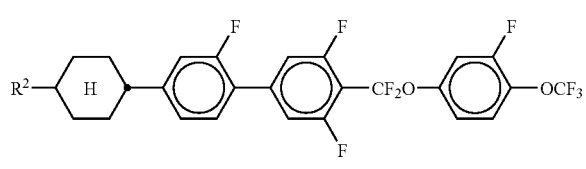
IA-17
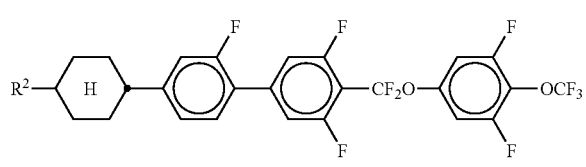
IA-18

-continued
IA-19
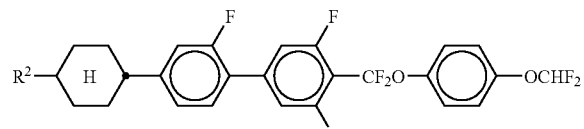
IA-20
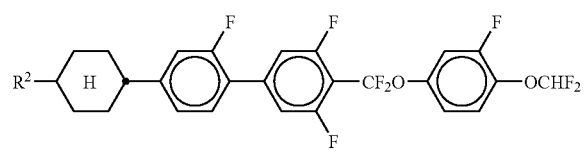
IA-21
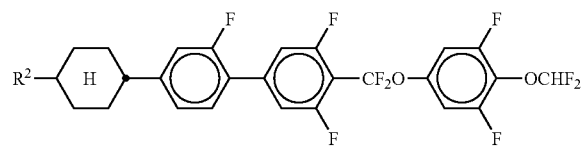
IA-22
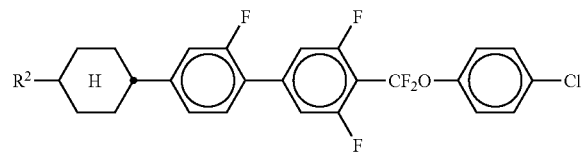
IA-23
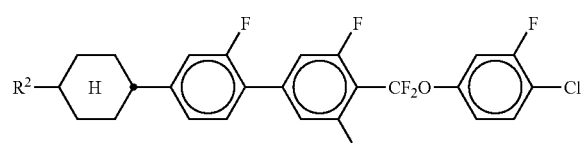
IA-24
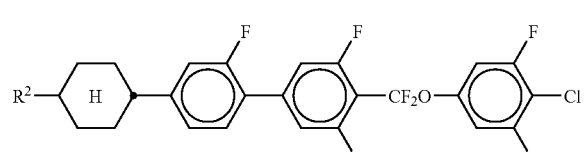
IA-25
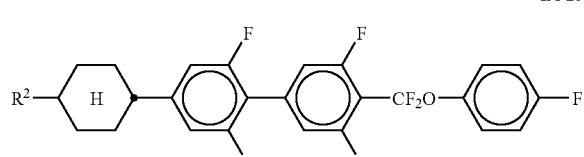
IA-26
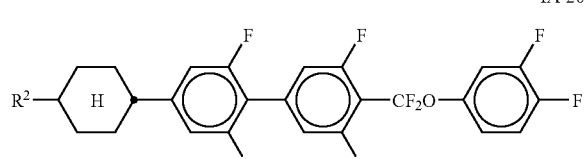
IA-27
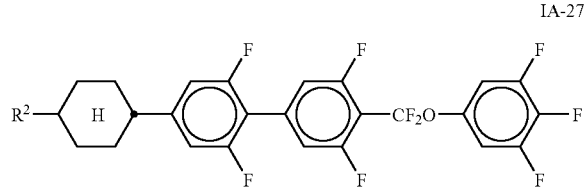

-continued
IA-28
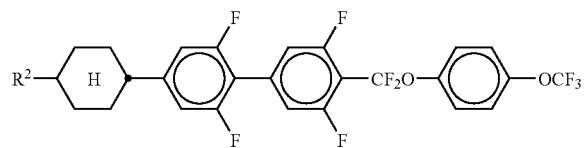
IA-29
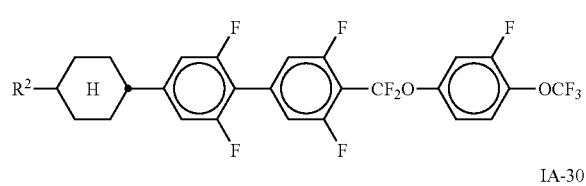
IA-30
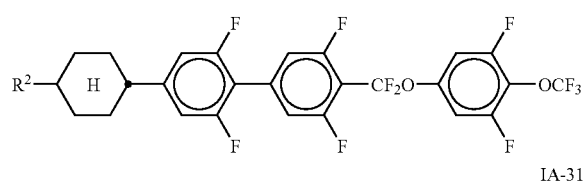
IA-31
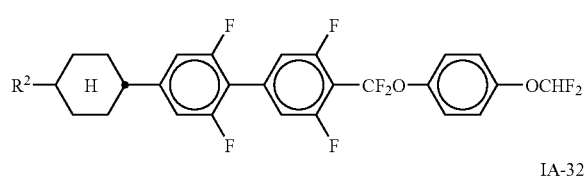
IA-32
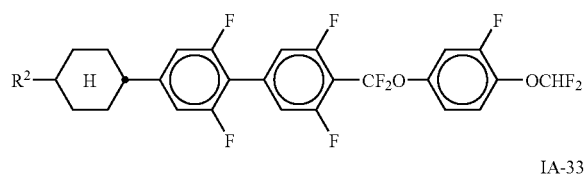
IA-33
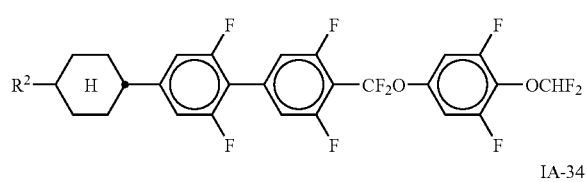
IA-34
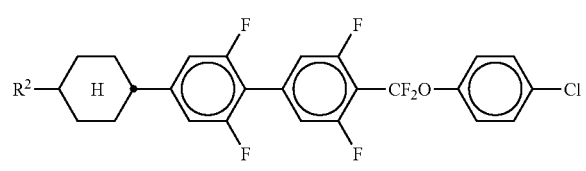
IA-35
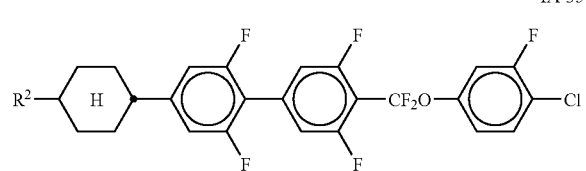
IA-36
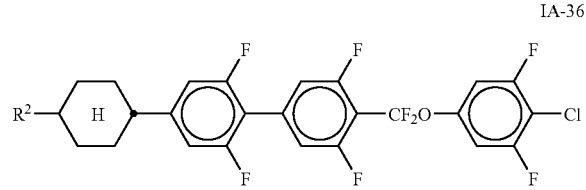

-continued
IA-37
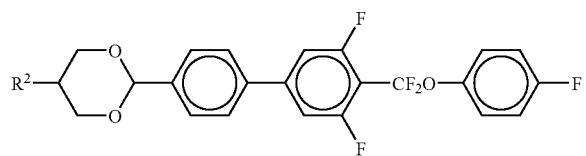
IA-38
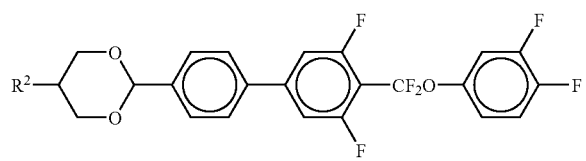
IA-39
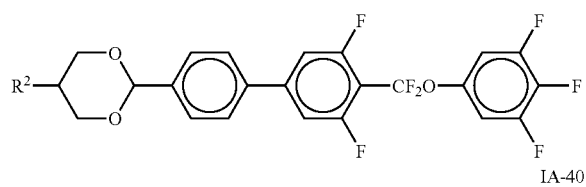
IA-40
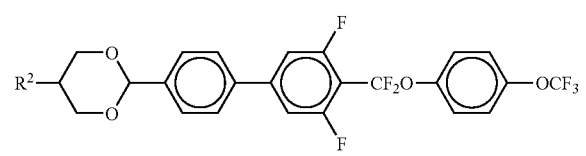
IA-41
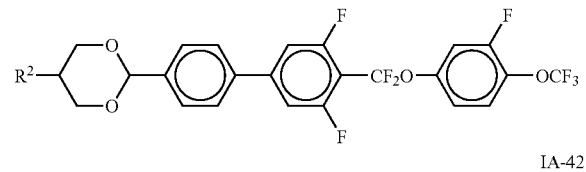
IA-42
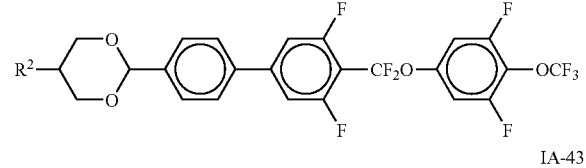
IA-43
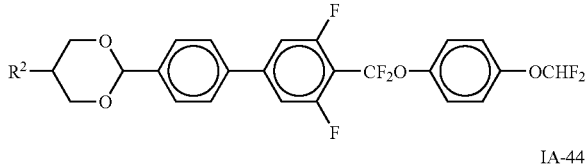
IA-44
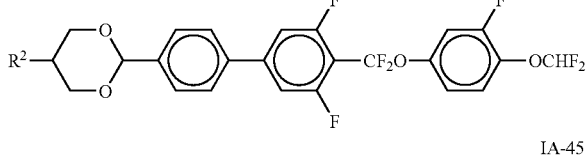
IA-45
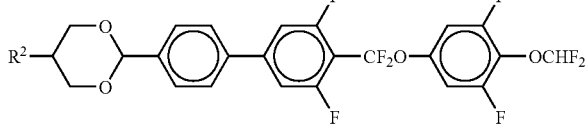

-continued
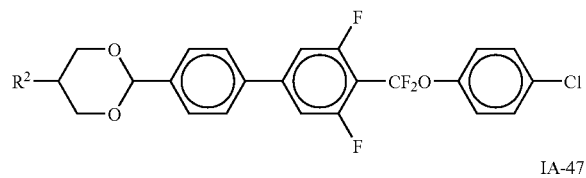
IA-46
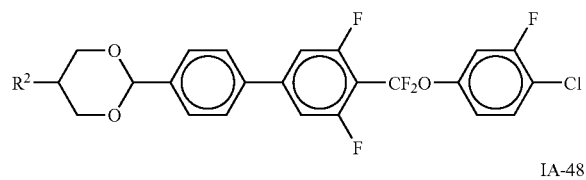
IA-47
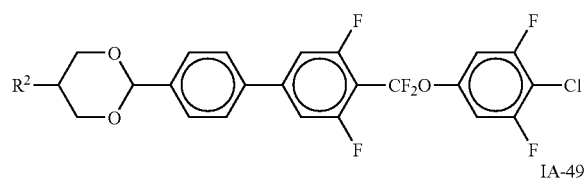
IA-48
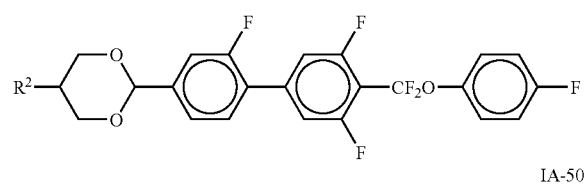
IA-49
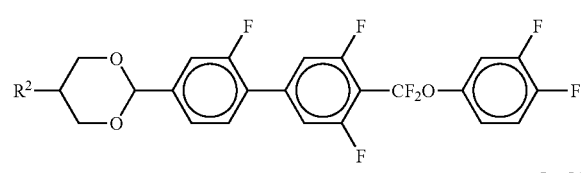
IA-50
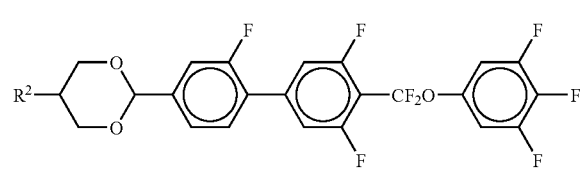
IA-51
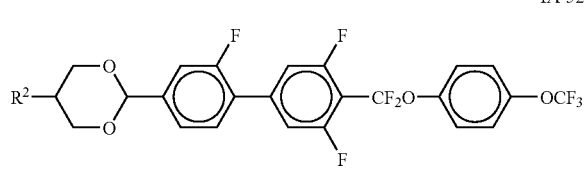
IA-52
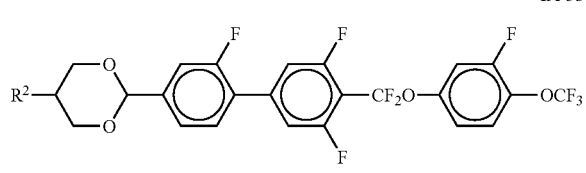
IA-53
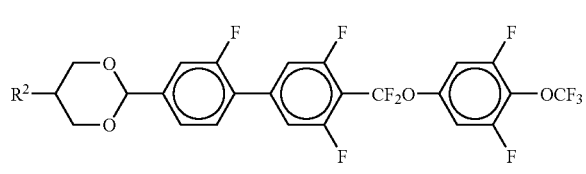
IA-54

-continued
IA-55
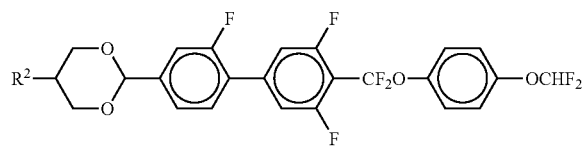
IA-56
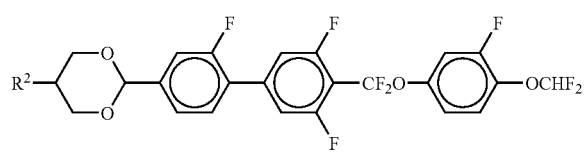
IA-57
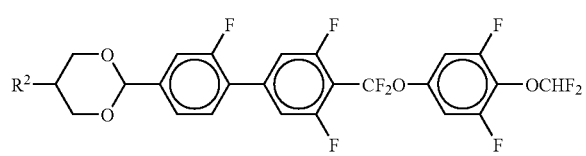
IA-58
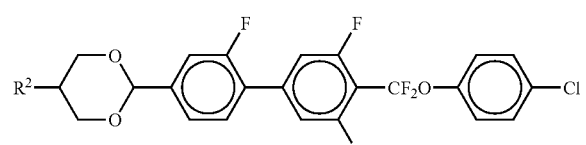
IA-59
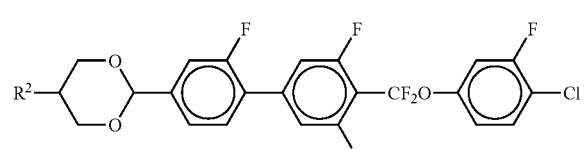
IA-60
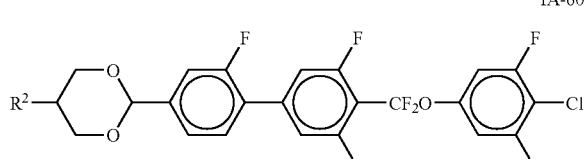
IA-61
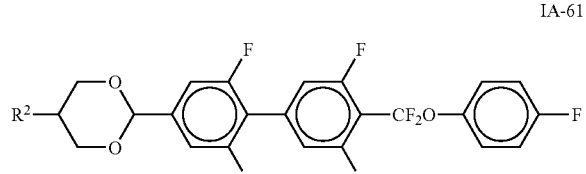
IA-62
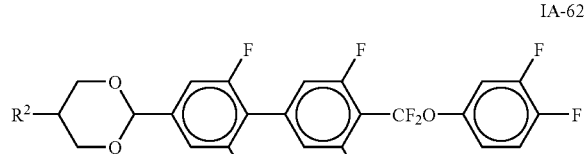
IA-63
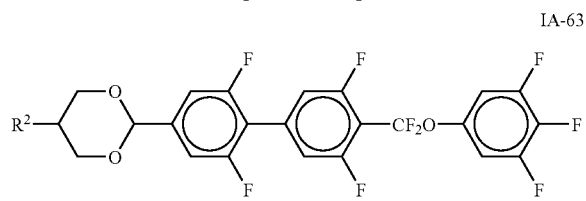

IA-64
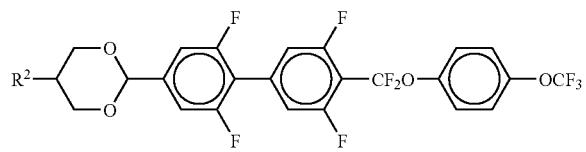
IA-65
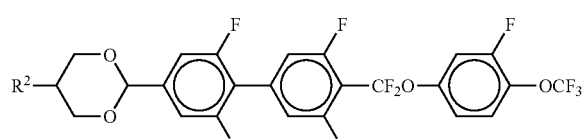
IA-66
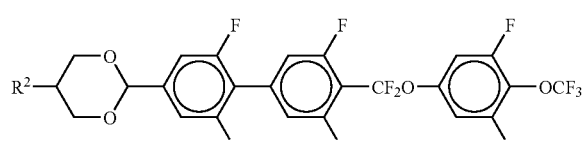
IA-67
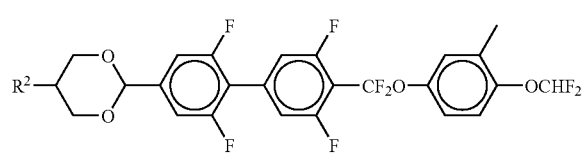
IA-68
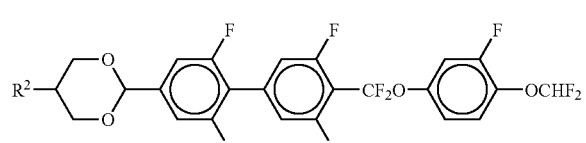
IA-69
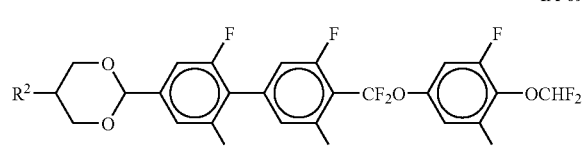
IA-70
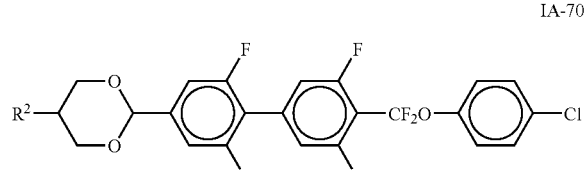
IA-71
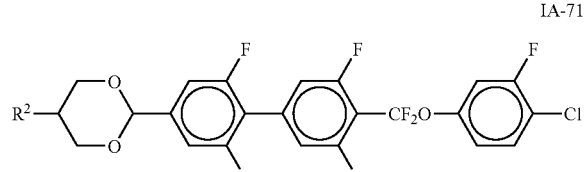
IA-72
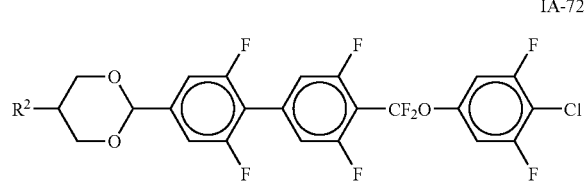

-continued
IA-73
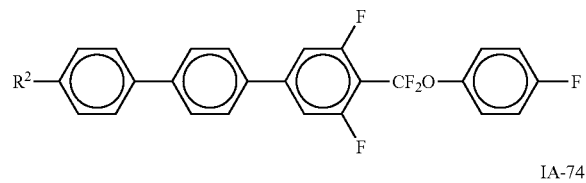
IA-74
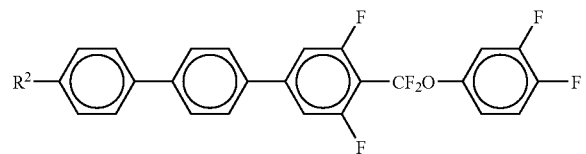
IA-75
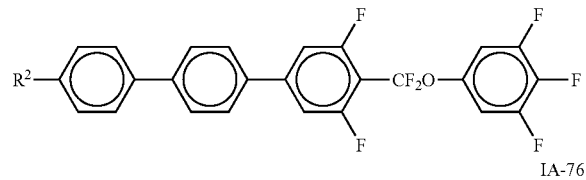
IA-76
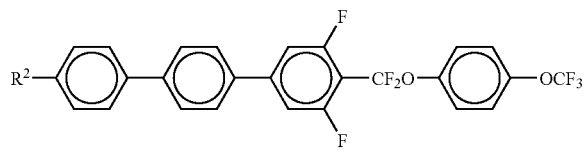
IA-77
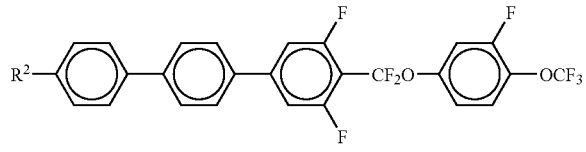
IA-78
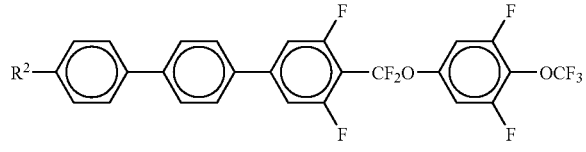
IA-79
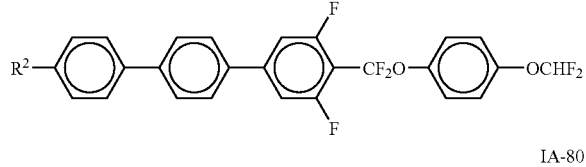
IA-80
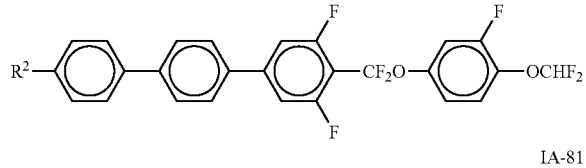
IA-81
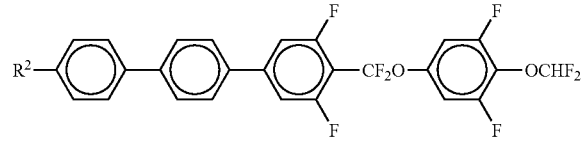

-continued
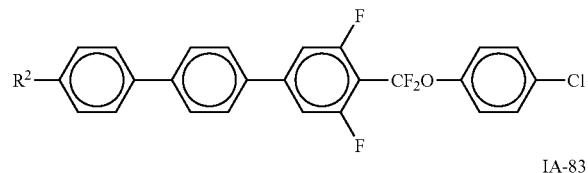
IA-82
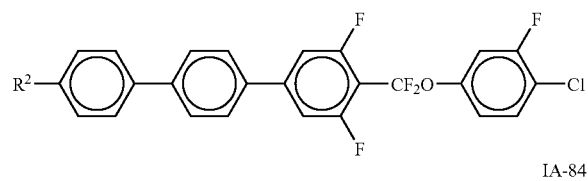
IA-83
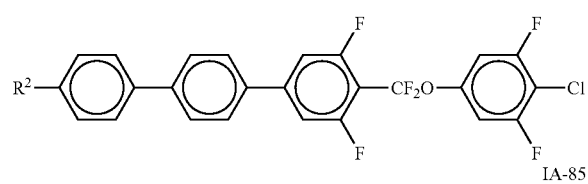
IA-84
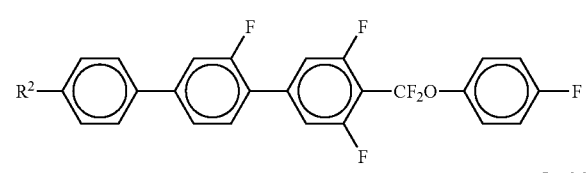
IA-85
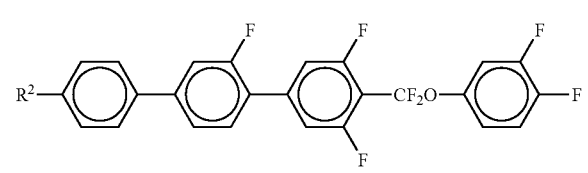
IA-86
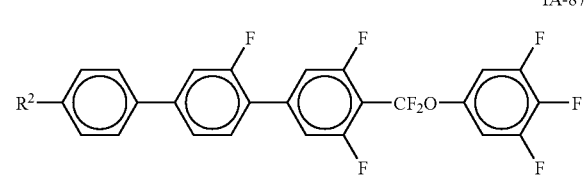
IA-87
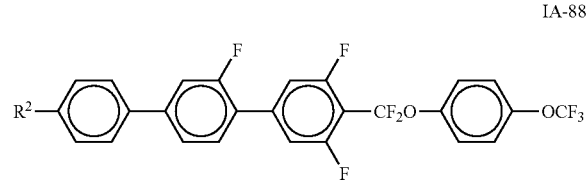
IA-88
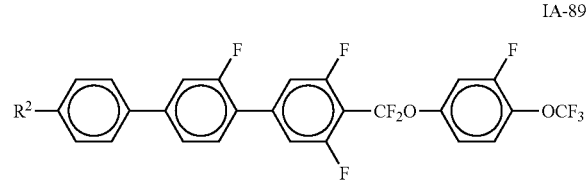
IA-89
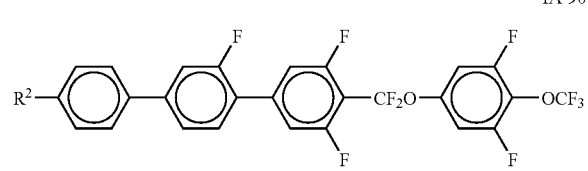
IA-90

-continued
IA-91
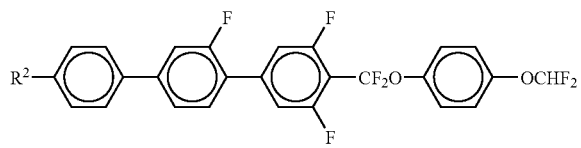
IA-92
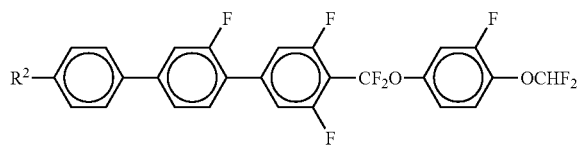
IA-93
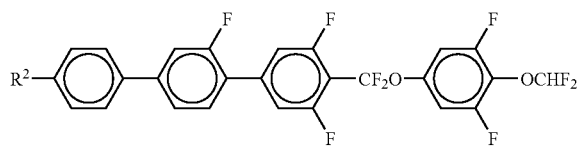
IA-94
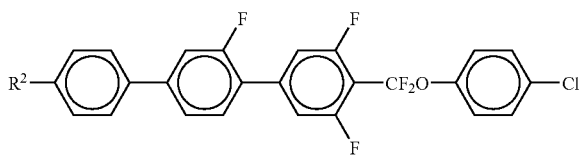
IA-95
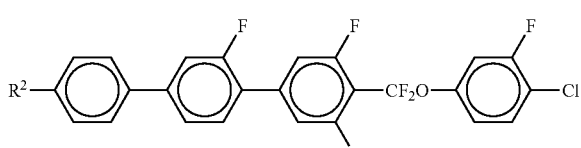
IA-96
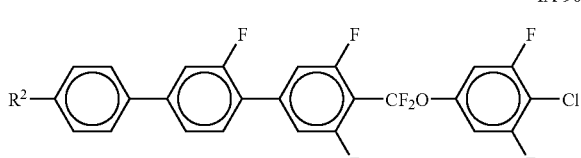
IA-97
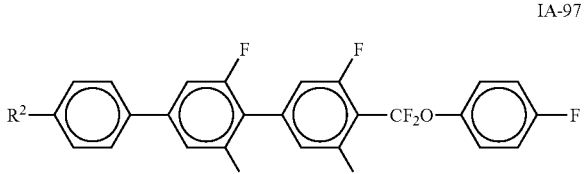
IA-98
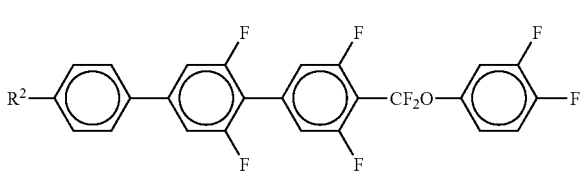
IA-99
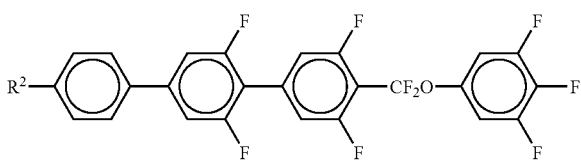

-continued
IA-100
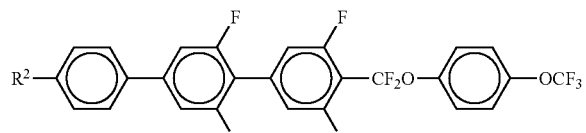
IA-101
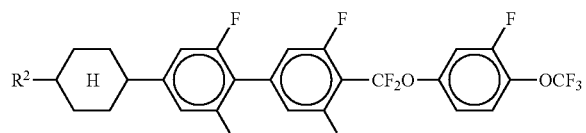
IA-102
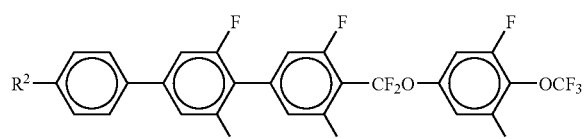
IA-103
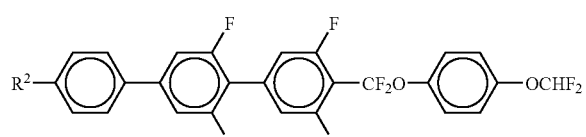
IA-104
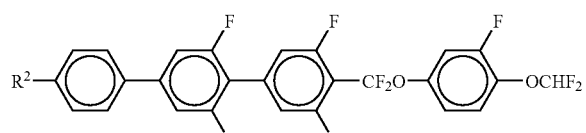
IA-105
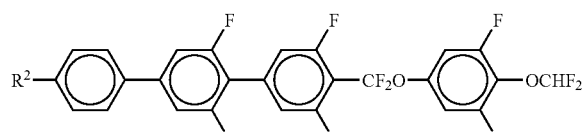
IA-106
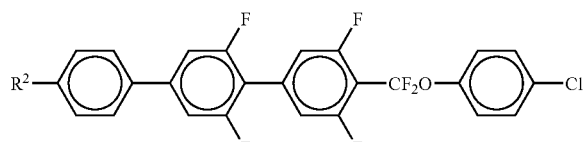
IA-107
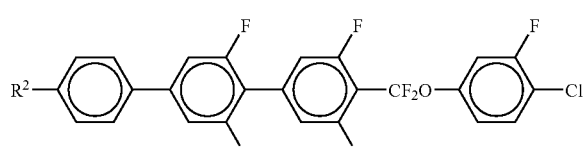
IA-108
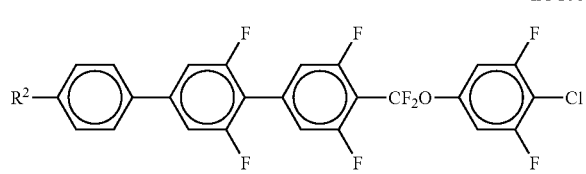

in which $R^2$ is as defined above.

Of these preferred compounds, particular preference is given to those of the formulae IA-1 to IA-36, in particular those of the formulae IA-2, IA-3, IA-5, IA-6 and IA-14, IA-15 and IA-18, in more particular those of the formulae IA-3 and IA-15.

$R^2$ in the compounds of the formulae IA and IA-1 to IA-108 is preferably H, straight-chain alkyl having from 1 to 7 carbon atoms, in particular $CH_3$, $C_2H_5$, n-$C_3H_7$, n-$C_4H_9$, n-$C_5H_{11}$, n-$C_6H_{13}$, n-$C_7H_{15}$, furthermore 1E- or 3-alkenyl, in particular $CH_2$=CH, $CH_3CH$=CH, $CH_2$=CHCH$_2$CH$_2$ or $CH_3CH$=CH—$CH_2CH_2$.

Preferred embodiments are indicated below:

The medium comprises one, two or more compounds selected from the group consisting of the formulae IA-1 to IA-108;

The medium preferably comprises in each case one or more, preferably two or three, compounds (homologues) of the formulae I-10 and/or I-19;

The medium preferably comprises in each case one or more, preferably two or three, compounds (homologues) of the formula IA-3;

The medium additionally comprises one or more compounds selected from the group consisting of compounds of the general formulae II to VI:

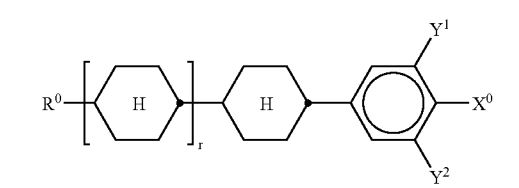

II

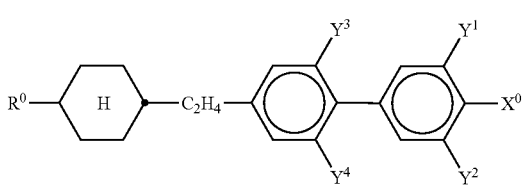

III

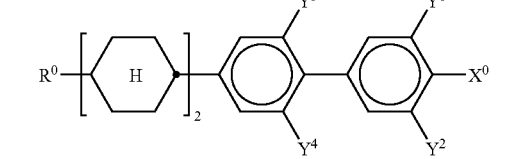

IV

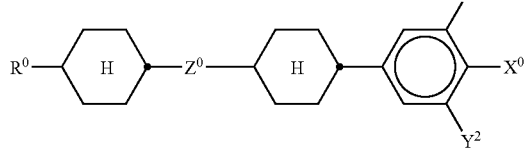

V

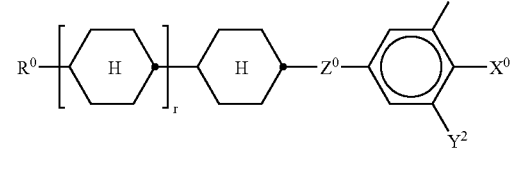

VI in which the individual radicals have the following meanings:

$R^0$ is n-alkyl, oxaalkyl, alkoxy, fluoroalkyl or alkenyl, each having 1 to 9 carbon atoms, $X^0$ is F, Cl halogenated alkyl, halogenated alkenyl, halogenated alkenyloxy or alkoxy having 1 to 6 carbon atoms, $Z^0$ is —$C_2F_4$—, —CF=CF—, —CH=CF—, —CF=CH—, —$C_2H_4$—, —$(CH_2)_4$—, —OCHF—, —CHFO—, —CH=CH—, —O—CO—, —$CF_2$O—, —$OCF_2$—, —$OCH_2$— or —$CH_2O$—, $Y^1$ and $Y^2$ are each, independently of one another, H or F, r is 0 or 1, where the compound of the formula VI is not identical with the compound of formula I.

The compound of the formula IV is preferably

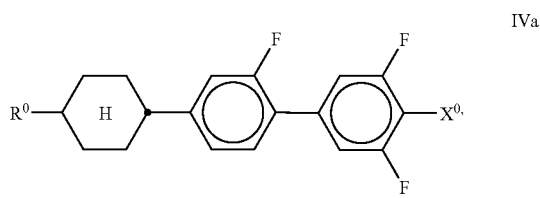

IVa

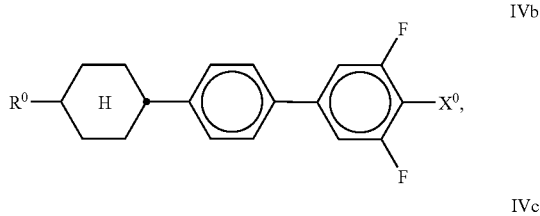

IVb

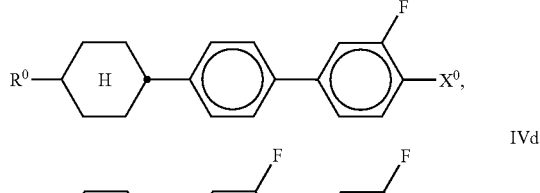

IVc

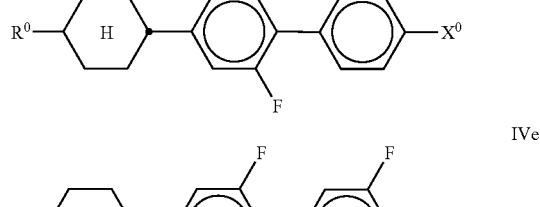

IVd

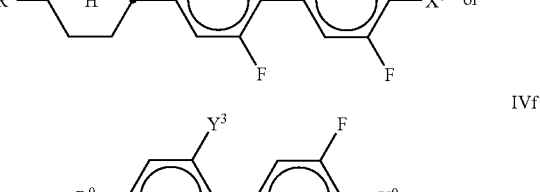

IVe or

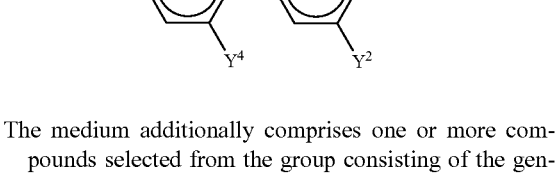

IVf

The medium additionally comprises one or more compounds selected from the group consisting of the general formulae VII to XII:

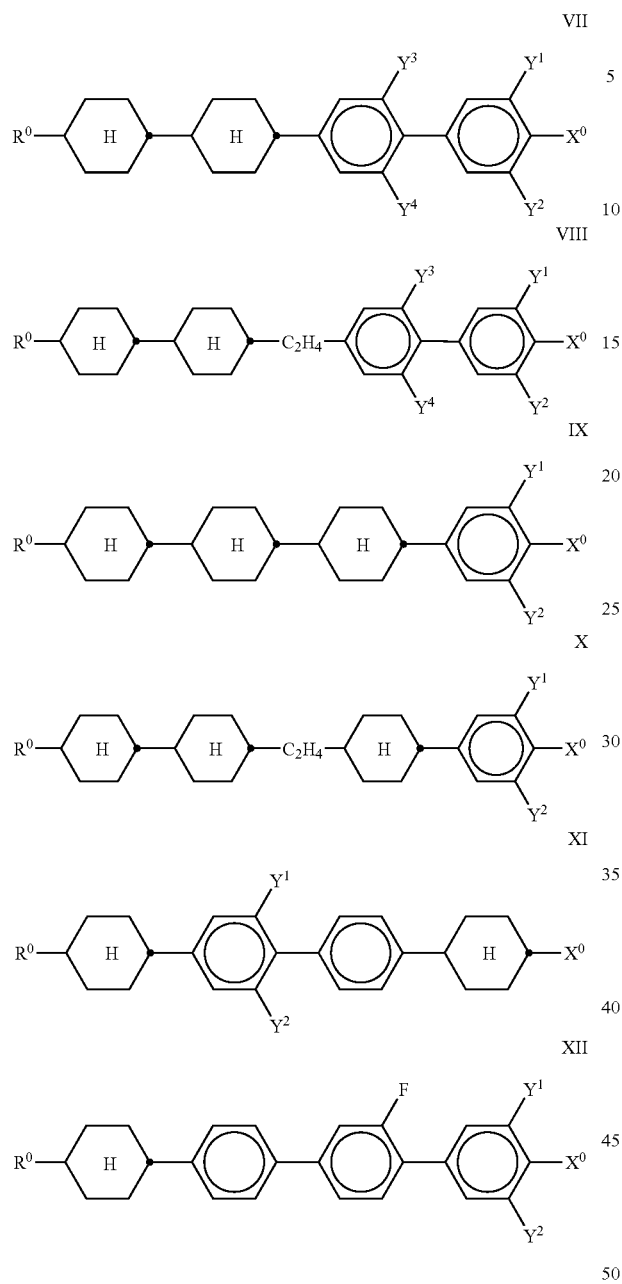

in which $R^0$, $X^0$, $Y^1$ and $Y^2$ are each, independently of one another, as defined above. $Y^3$ and $Y^4$ are each, independently of one another, H or F. $X^0$ is preferably F, Cl, $CF_3$, $OCF_3$ or $OCHF_2$. $R^0$ is preferably alkyl, oxaalkyl, alkoxy, fluoroalkyl or alkenyl, each having 1 to 6 n carbon atoms.

The medium additionally comprises one or more ester compounds of the formulae Ea to Ef:

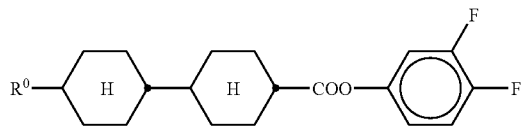

Ea

-continued

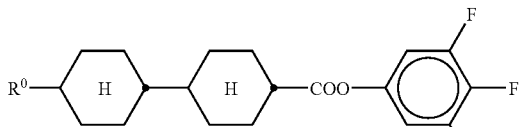

Eb

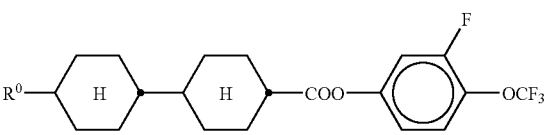

Ec

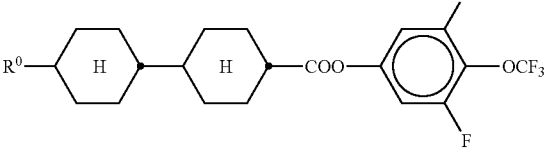

Ed

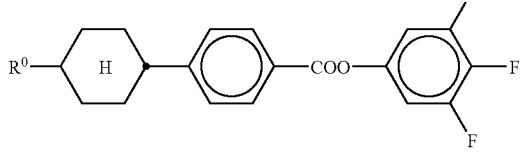

Ee

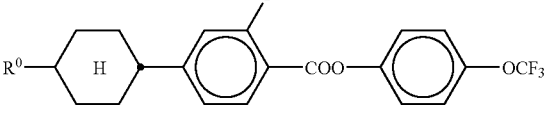

Ef in which $R^0$ is as defined above;

The medium comprises one or more compounds containing a dioxane ring, of the formulae D1 and/or D2:

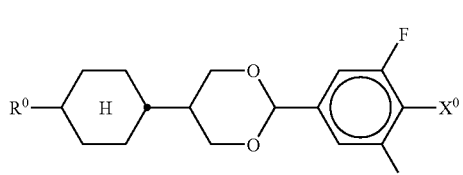

D1

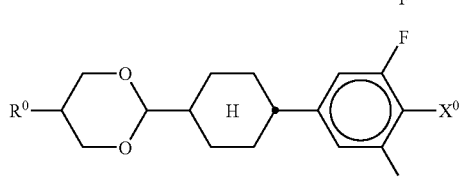

D2 in which $R^0$ and $X^0$ are as defined above. $X^0$ is preferably F or $OCF_3$, $R^0$ is preferably alkyl.

The proportion of the compounds of the formulae Ea to Ef is preferably 10–30% by weight, in particular 15–25% by weight;

The proportion of compounds of the formulae IA and I to VI together in the mixture as a whole is at least 50% by weight;

The proportion of compounds of the formula I in the mixture as a whole is from 5 to 40% by weight, particularly preferably from 10 to 30% by weight;

The proportion of compounds of the formula IA in the mixture as a whole is from 5 to 40% by weight, particularly preferably from 10 to 30% by weight;

The proportion of compounds of the formulae II to VI in the mixture as a whole is from 30 to 80% by weight;

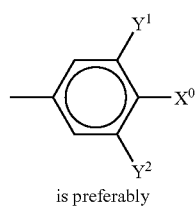

is preferably

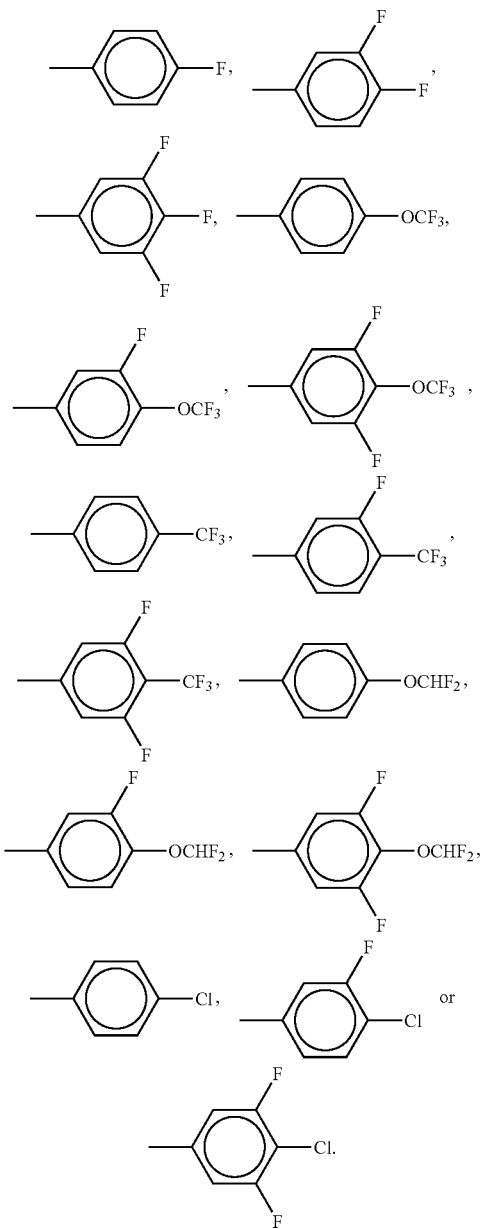

The medium comprises compounds of the formula II, IV, I, V or VI;

$R^0$ is straight-chain alkyl or alkenyl having from 2 to 7 carbon atoms;

The medium essentially consists of compounds of the formulae IA and I and one or more compounds selected from the group consisting of the compounds II to VI, where "essentially" denotes $\geq 60\%$ by weight;

The medium comprises further compounds, preferably selected from the following group consisting of the general formulae XIII to XVI:

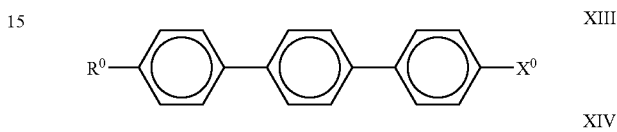

XIII

XIV

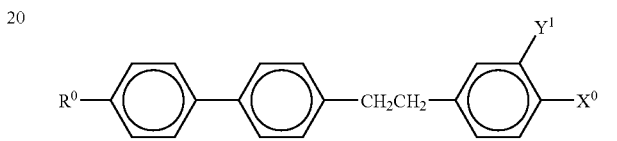

XV

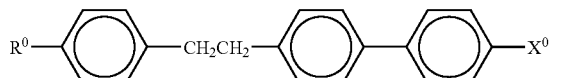

XVI

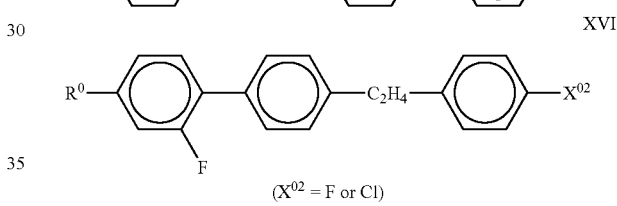

($X^{02}$ = F or Cl)

in which $R^0$ and $X^0$ are as defined above, and the 1,4-phenylene rings may be substituted by CN, chlorine or fluorine. The 1,4-phenylene rings are preferably monosubstituted or polysubstituted by fluorine atoms.

The medium additionally comprises one or more compounds of the formulae XVII and/or XVIII

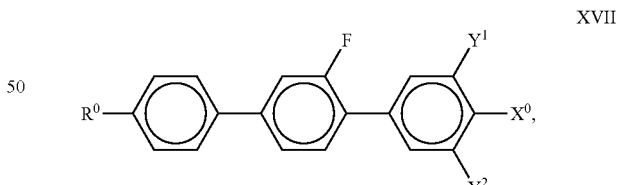

XVII

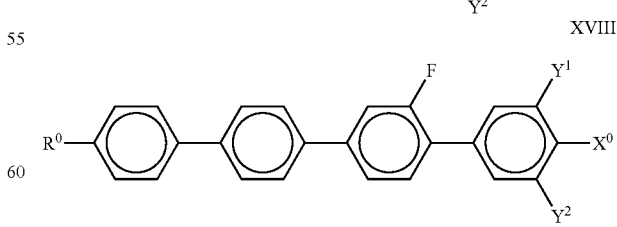

XVIII in which $R^0$, $X^0$, $Y^1$ and $Y^2$ are as defined above.

The proportion of the compounds of the formulae XVII and/or XVIII is preferably 2–30% by weight;

The medium additionally comprises one, two, three or more, preferably two or three, compounds of the formulae

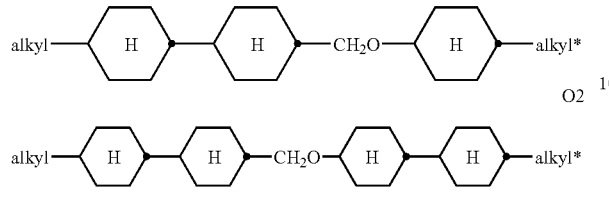

in which "alkyl" and "alkyl*" are each, independently of one another, a straight-chain or branched alkyl radical having 1–9 carbon atoms.

The proportion of the compounds of the formulae O1 and/or O2 in the mixtures according to the invention is preferably 5–10% by weight.

The medium preferably comprises 5–35% by weight of compound IVa and/or IVf.

The medium preferably comprises one, two or three compounds of the formula IVa in which $X^0$ is F or $OCF_3$.

The medium preferably comprises one or more compounds of the formulae IIa to IIg

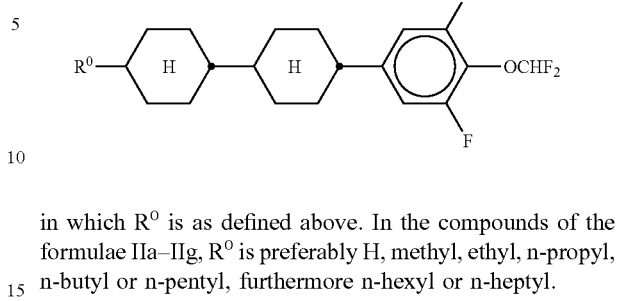

in which $R^0$ is as defined above. In the compounds of the formulae IIa–IIg, $R^0$ is preferably H, methyl, ethyl, n-propyl, n-butyl or n-pentyl, furthermore n-hexyl or n-heptyl.

The (I+IA):(II+III+IV+V+VI) weight ratio is preferably from 1:10 to 10:1.

The medium consists of ≧60% by weight of compounds selected from the group consisting of the general formulae IA and I to XVIII.

The proportion of the compounds of the formulae IVb and/or IVc in which $X^0$ is fluorine and $R^0$ is $C_2H_5$, n-$C_3H_7$, n-$C_4H_9$ or n-$C_5H_{11}$ in the mixture as a whole is from 2 to 20% by weight, in particular from 2 to 15% by weight;

The medium preferably comprises one, two or three, furthermore four, homologues of the compounds selected from the group consisting of H1 to H18 (n=1–12):

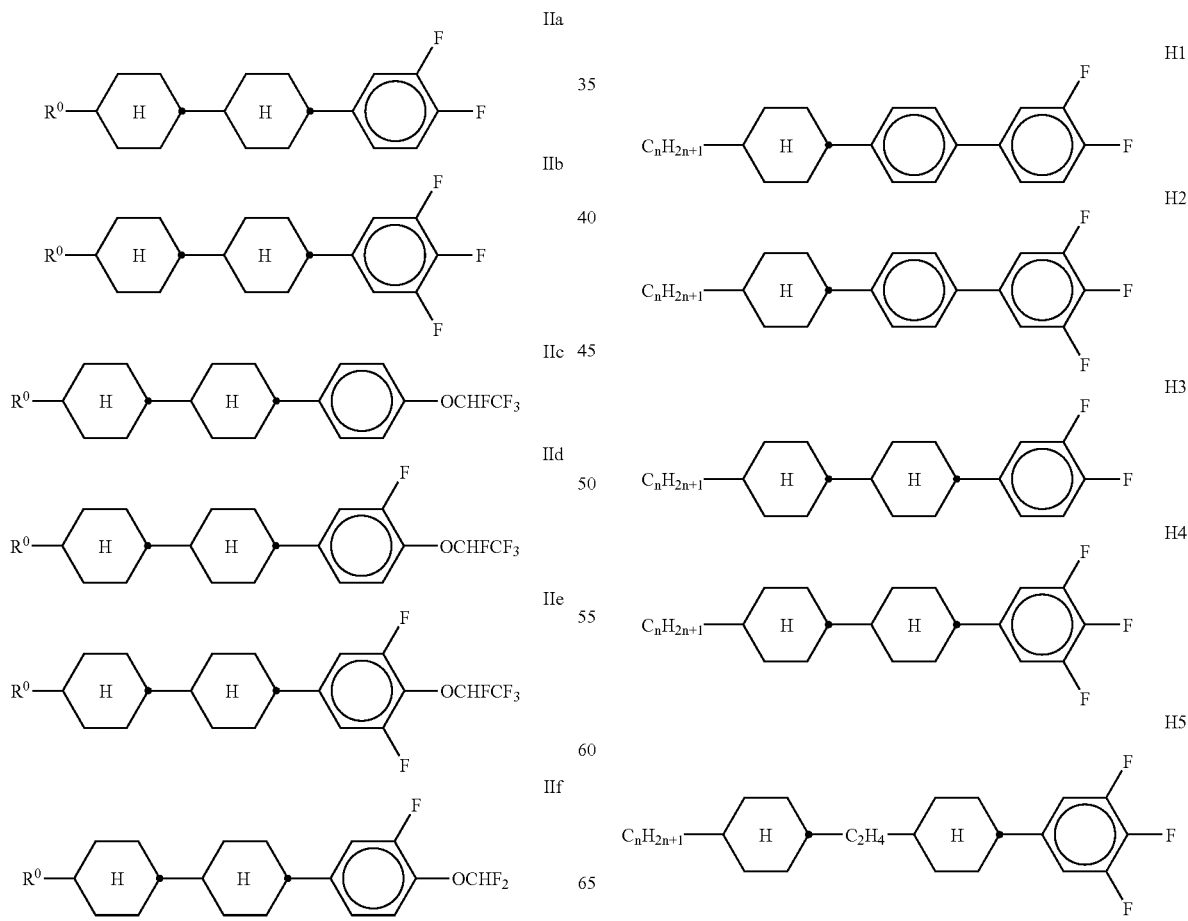

-continued
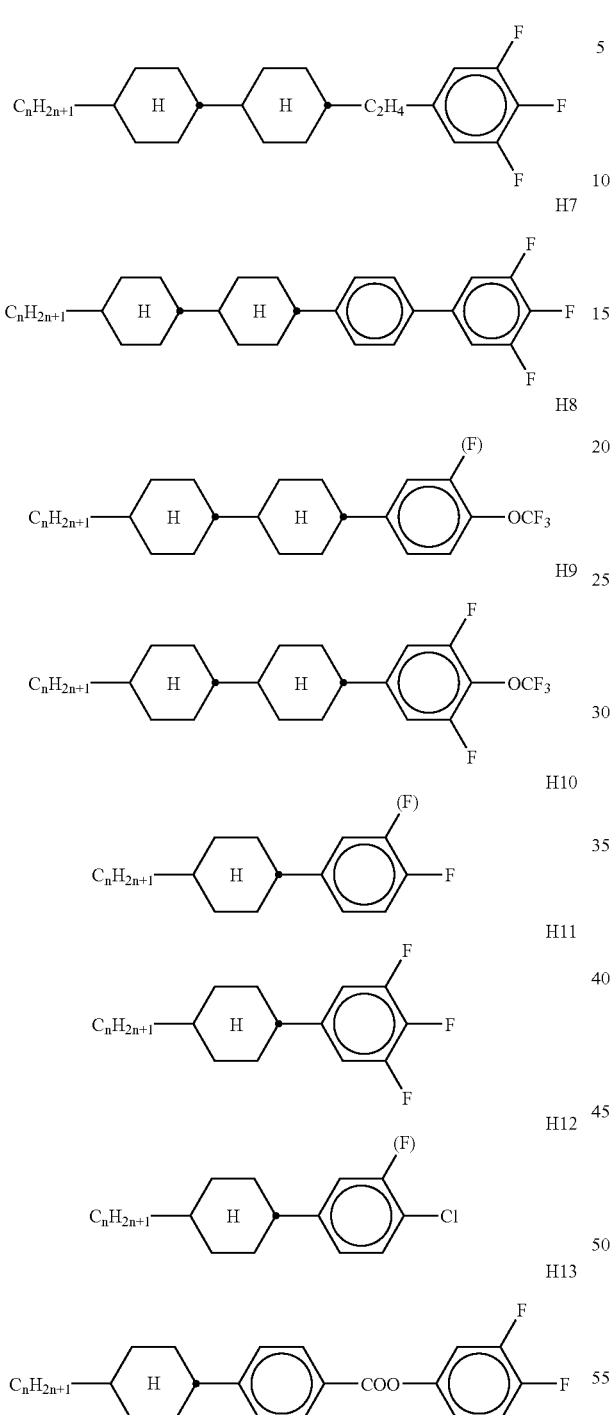
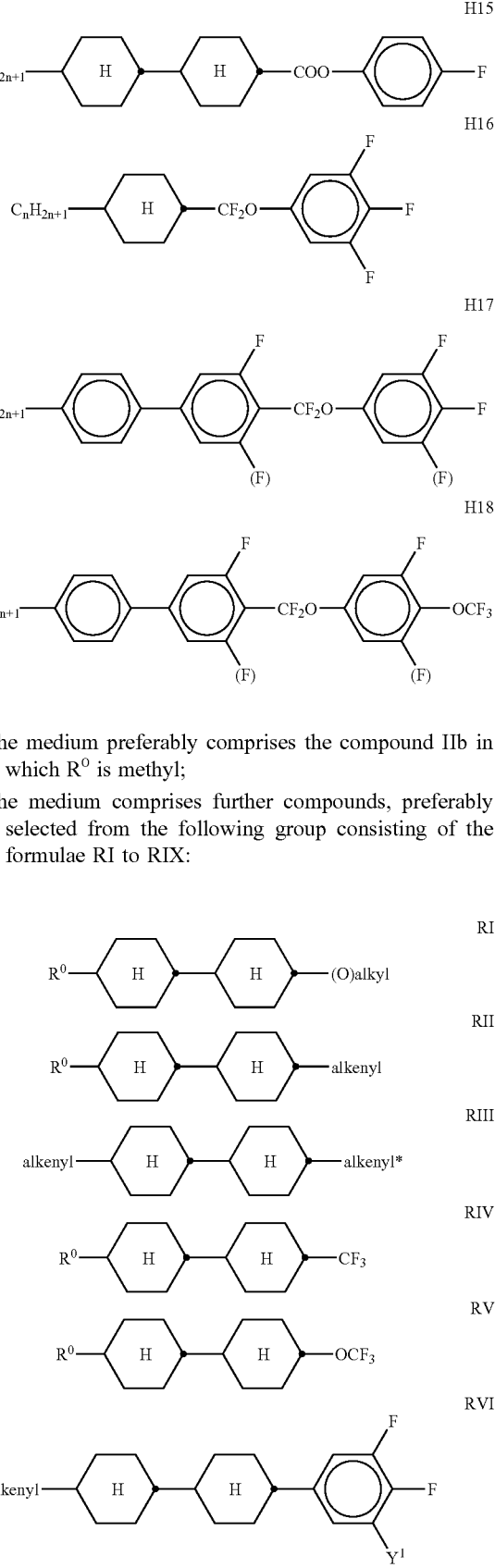
The medium preferably comprises the compound IIb in which $R^0$ is methyl;
The medium comprises further compounds, preferably selected from the following group consisting of the formulae RI to RIX:

-continued

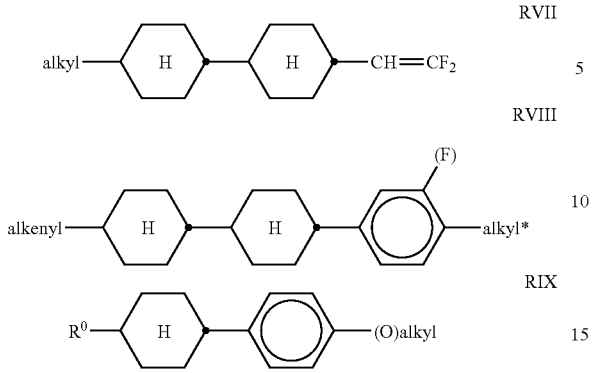

RVII, RVIII, RIX in which
R⁰ is n-alkyl, alkoxy, oxaalkyl, fluoroalkyl, alkenyloxy or alkenyl, each having up to 9 carbon atoms,
$Y^1$ is H or F,
alkyl and
alkyl* are each, independently of one another, a straight-chain or branched alkyl radical having 1–9 carbon atoms,
alkenyl and
alkenyl* are each, independently of one another, a straight-chain or branched alkenyl radical having from 2 to 9 carbon atoms.

The proportion of compounds of the formulae RI to RVIII in the mixtures according to the invention is preferably from 1 to 40% by weight.

The medium preferably comprises one or more compounds of the formulae

RIa, RIc, RIIa, RIIb, RIIIa in which
n and m are each 1, 2, 3, 4, 5, 6, 7, 8, 9, 10, 11 or 12. n and m are preferably 1, 2, 3, 4, 5 or 6.

The medium additionally comprises one, two or more compounds containing fused rings, of the formulae AN1 to AN12:

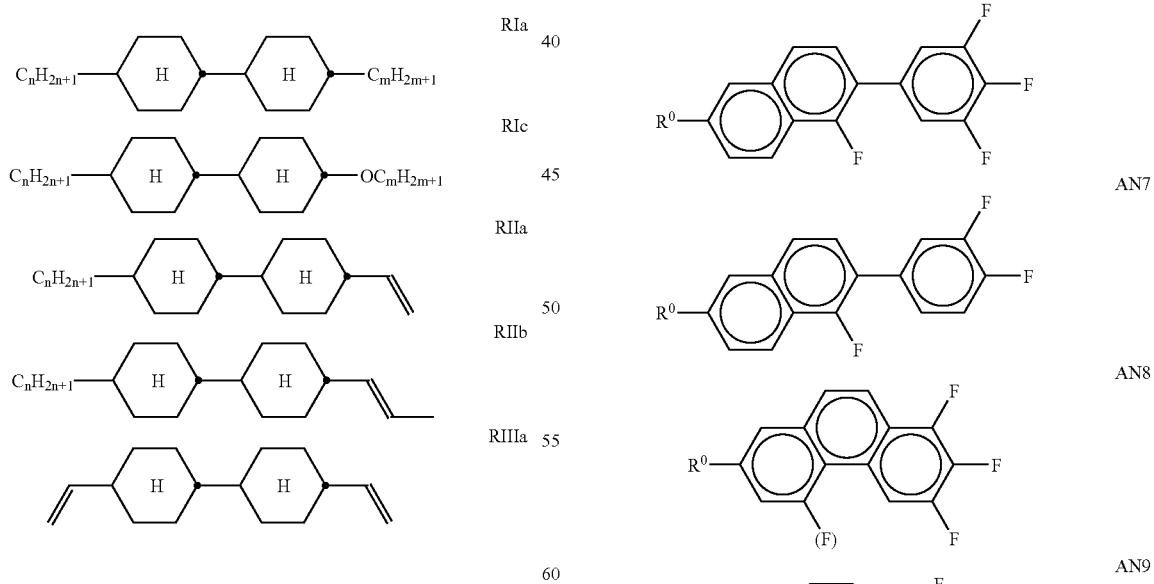

-continued

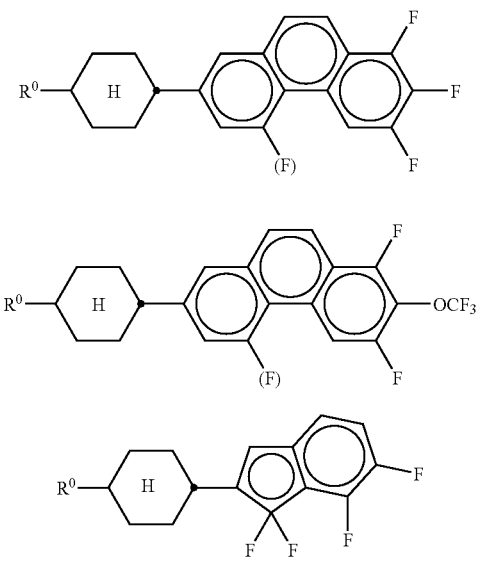

in which R⁰ is as defined above.

The term "alkyl" or "alkyl*" covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" covers straight-chain and branched alkenyl groups having 2–7 carbon atoms, in particular the straight-chain groups. Preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of particular preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "alkoxy" or "oxaalkyl" preferably covers straight-chain radicals of the formula $C_nH_{2n+1}$—O—$(CH_2)_m$, in which n and m are each, independently of one another, from 1 to 6. Preferably, n=1 and m is from 1 to 6. m may also be 0.

It has been found that even a relatively small proportion of compounds of the formulae I and IA mixed with conventional liquid-crystal materials, but in particular with one or more compounds of the formulae II, III, IV, V and/or VI, results in a significant lowering of the threshold voltage and in high values for the VHR (100° C.), with broad nematic phases with low smectic-nematic transition temperatures being observed at the same time, improving the shelf life. Preference is given, in particular, to mixtures which, besides one or more compounds of the formulae I and IA, comprise one or more compounds of the formula II, in particular compounds of the formula II in which X⁰ is F or OCF₃. The compounds of the formulae IA and I to VI are colorless, stable and readily miscible with one another and with other liquid-crystal materials.

Through a suitable choice of the meanings of R⁰ and X⁰, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in shorter addressing times, improved nematic tendencies and a higher ratio between the elastic constants $k_{33}$ (bend) and $k_{11}$ (splay) compared with alkyl and alkoxy radicals. 4-Alkenyl radicals, 3-alkenyl radicals and the like generally give lower threshold voltages and smaller values of $k_{33}/k_{11}$ compared with alkyl and alkoxy radicals.

A —CH₂CH₂— group generally results in higher values of $k_{33}/k_{11}$ compared with a single covalent bond. Higher values of $k_{33}/k_{11}$, facilitate, for example, flatter transmission characteristic lines in TN cells with a 90° twist (in order to achieve gray shades) and steeper transmission characteristic lines in STN, SBE and OMI cells (greater multiplexability), and vice versa.

The optimum mixing ratio of the compounds of the formulae I, IA and II+III+IV+V+VI depends substantially on the desired properties, on the choice of the components of the formulae I, IA, II, III, IV, V and/or VI, and on the choice of any further components that may be present. Suitable mixing ratios within the range given above can easily be determined from case to case.

The total amount of compounds of the formulae IA and I to XII in the mixtures according to the invention is not crucial. The mixtures can therefore comprise one or more further components for the purposes of optimization of various properties. However, the observed effect on the addressing times and the threshold voltage is generally greater, the higher the total concentration of compounds of the formulae IA and I to XII.

In a particularly preferred embodiment, the media according to the invention comprise compounds of the formulae II to VI (preferably II, IIII and/or IV, in particular IVa) in which X⁰ is F, OCF₃, OCHF₂, OCH=CF₂, OCF=CF₂ or OCF₂—CF₂H. A favorable synergistic effect with the compounds of the formulae I and IA results in particularly advantageous properties. In particular, mixtures comprising compounds of the formula I and IA and of the formula II are distinguished by their low threshold voltages.

The individual compounds of the formulae IA and I to XVIII and their sub-formulae which can be used in the media according to the invention are either known or can be prepared analogously to the known compounds.

The construction of the MLC display according to the invention from polarizers, electrode base plates and surface-treated electrodes corresponds to the usual design for displays of this type. The term usual design is broadly drawn here and also covers all derivatives and modifications of the MLC display, in particular including matrix display elements based on poly-Si TFTs or MIM.

A significant difference between the displays according to the invention and the hitherto conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in lesser amount is dissolved in the components making up the principal constituent, advantageously at elevated temperature. It is also possible to mix solutions of the components in an organic solvent, for example in acetone, chloroform or methanol, and to remove the solvent again, for example by distillation, after thorough mixing.

The dielectrics may also comprise further additives known to the person skilled in the art and described in the literature, such as, for example, stabilizers, UV filters and antioxidants. For example, 0–15% of pleochroic dyes or chiral dopants can be added. Suitable stabilizers, UV filters, antioxidants, etc., are listed below in Table D.

The entire disclosure of all applications, patents and publications, cited herein and of corresponding German application No. 10309513.6, filed Mar. 5, 2003 is incorporated by reference herein.

C denotes a crystalline phase, S a smectic phase, $S_c$ a smectic C phase, N a nematic phase and I the isotropic phase.

$V_{10}$ denotes the voltage for 10% transmission (viewing angle perpendicular to the plate surface). ton denotes the switch-on time and toff the switch-off time at an operating voltage corresponding to 2.0 times the value of $V_{10}$. $\Delta n$ denotes the optical anisotropy. $\Delta\epsilon$ denotes the dielectric anisotropy ($\Delta\epsilon=\epsilon\|-\epsilon\bot$, where $\epsilon\|$ denotes the dielectric constant parallel to the longitudinal molecular axes and $\epsilon\bot$ denotes the dielectric constant perpendicular thereto). The electro-optical data are measured in a TN cell at the 1st minimum (i.e. at a d·$\Delta n$ value of 0.5 μm) at 20° C., unless expressly stated otherwise. The optical data are measured at 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively; n and m are integers and are preferably 0, 1, 2, 3, 4, 5, 6, 7, 8, 9, 10, 11 or 12. The coding in Table B is self-evident. In Table A, only the acronym for the parent structure is indicated. In individual cases, the acronym for the parent structure is followed, separated by a dash, by a code for the substituents $R^{1*}$, $R^{2*}$, $L^{1*}$ and $L^{2*}$:

| Code for $R^{1*}$, $R^{2*}$, $L^{1*}$, $L^{2*}$ | $R^{1*}$ | $R^{2*}$ | $L^{1*}$ | $L^{2*}$ |
|---|---|---|---|---|
| nm | $C_nH_{2n+1}$ | $C_mH_{2m+1}$ | H | H |
| nOm | $OC_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | F | H |
| nN.F.F | $C_nH_{2n+1}$ | CN | F | F |
| nF | $C_nH_{2n+1}$ | F | H | H |
| nOF | $OC_nH_{2n+1}$ | F | H | H |
| nF.F | $C_nH_{2n+1}$ | F | F | H |
| nF.F.F | $C_nH_{2n+1}$ | F | F | F |
| nmF | $C_nH_{2n+1}$ | $C_mH_{2m+1}$ | F | H |
| nOCF$_3$ | $C_nH_{2n+1}$ | OCF$_3$ | H | H |
| nOCF$_3$.F | $C_nH_{2n+1}$ | OCF$_3$ | F | H |
| n-Vm | $C_nH_{2n+1}$ | —CH=CH—$C_mH_{2m+1}$ | H | H |
| nV-Vm | $C_nH_{2n+1}$—CH=CH— | —CH=CH—$C_mH_{2m+1}$ | H | H |
| nOCF$_3$.F.F | $C_nH_{2n+1}$ | OCF$_3$ | F | F |

Preferred mixture components are given in Tables A and B.

TABLE A

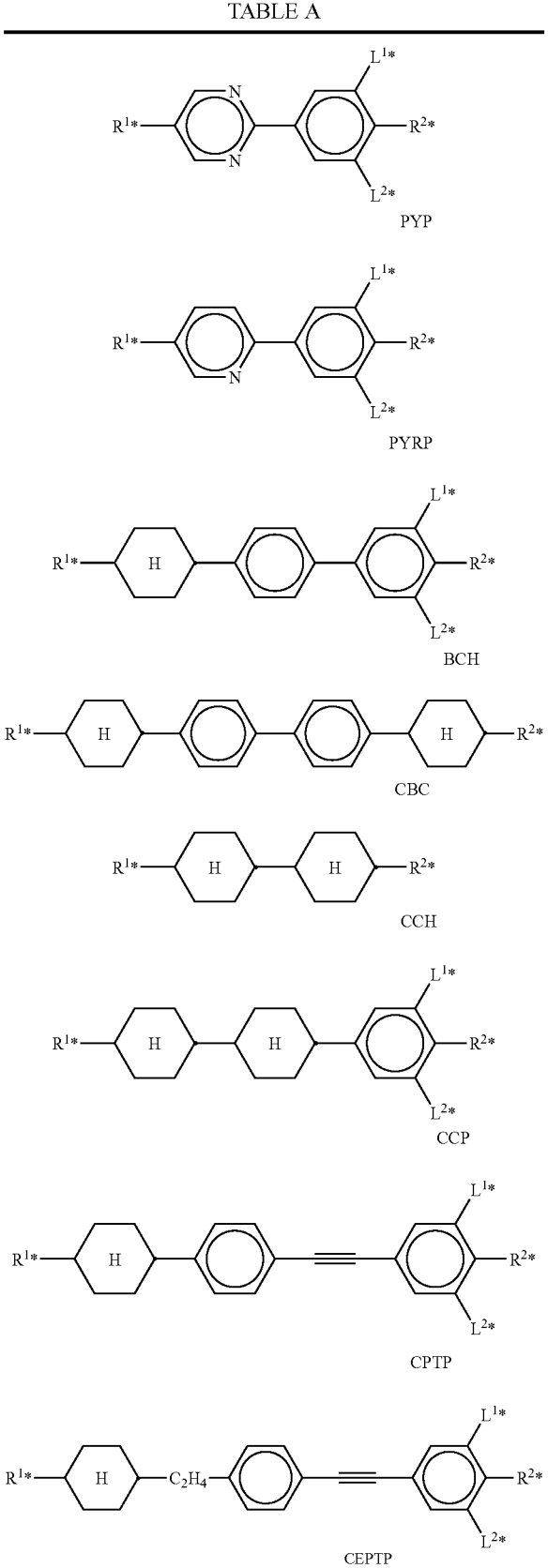

TABLE A-continued
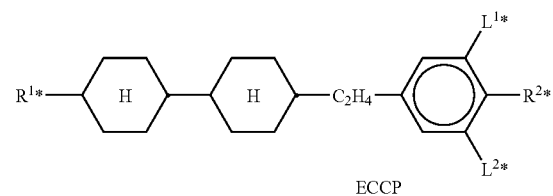
ECCP
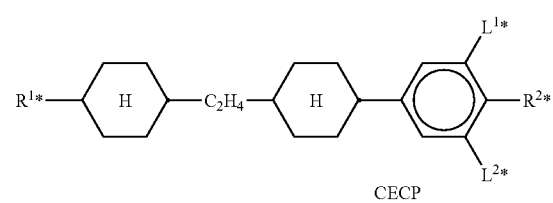
CECP
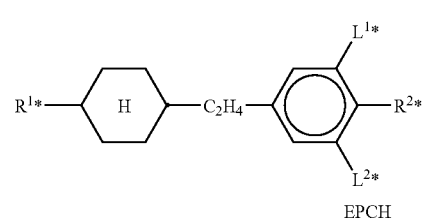
EPCH
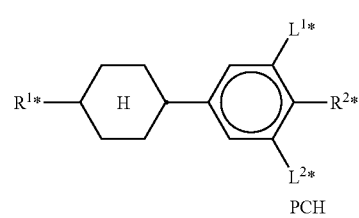
PCH
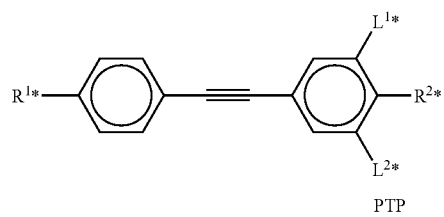
PTP
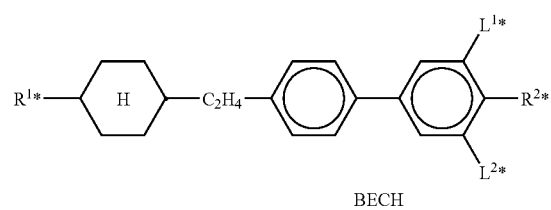
BECH
TABLE A-continued
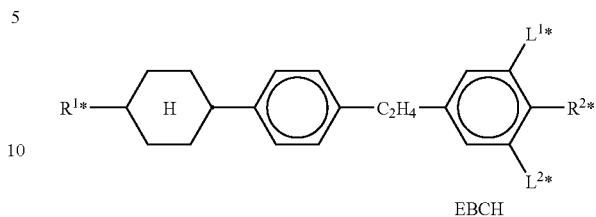
EBCH
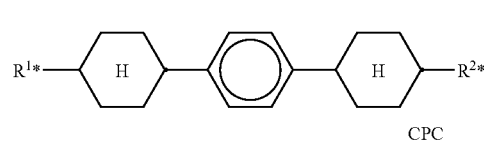
CPC
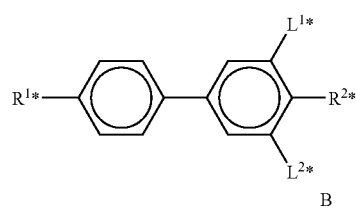
B
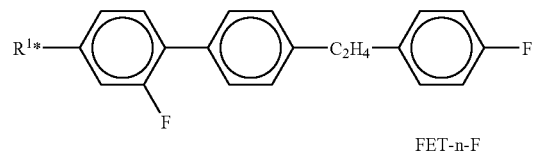
FET-n-F
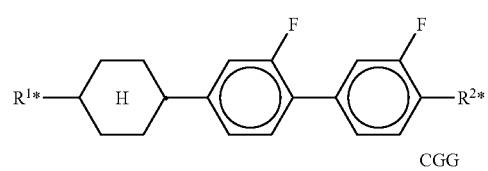
CGG
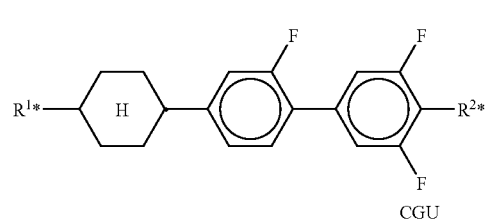
CGU
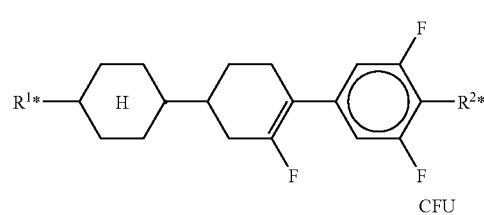
CFU TABLE B
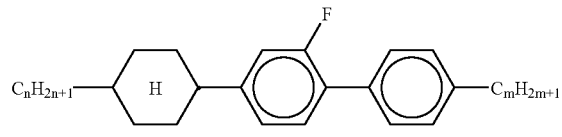
BCH-n.Fm
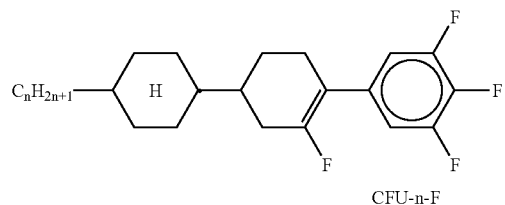
CFU-n-F
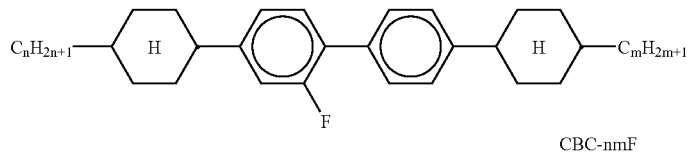
CBC-nmF
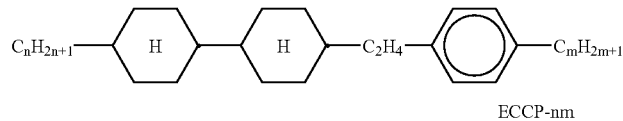
ECCP-nm
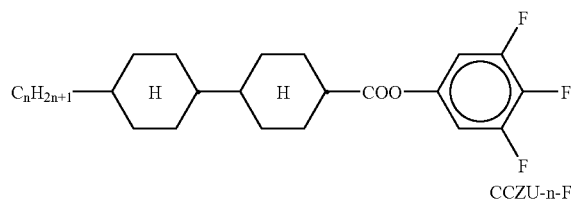
CCZU-n-F
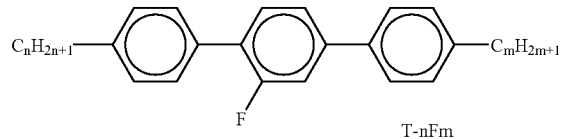
T-nFm
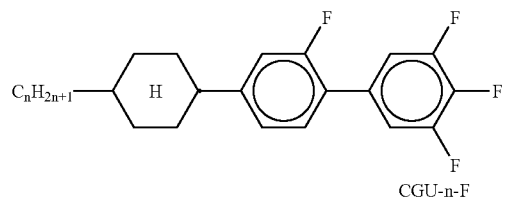
CGU-n-F
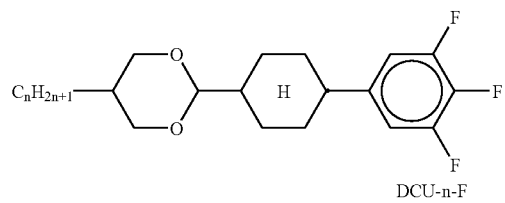
DCU-n-F TABLE B-continued
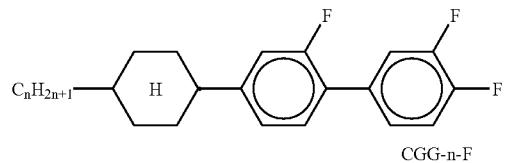
CGG-n-F
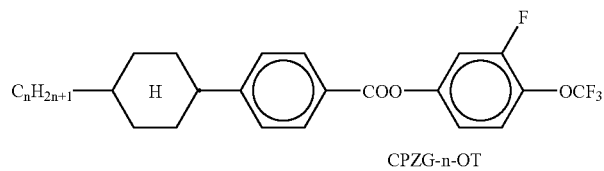
CPZG-n-OT
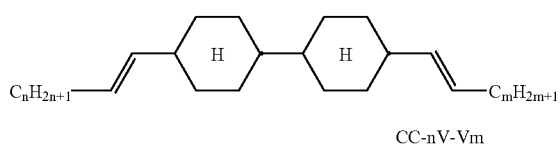
CC-nV-Vm
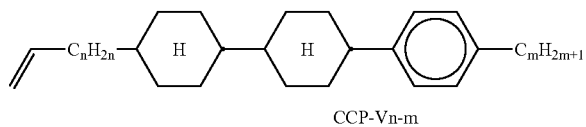
CCP-Vn-m
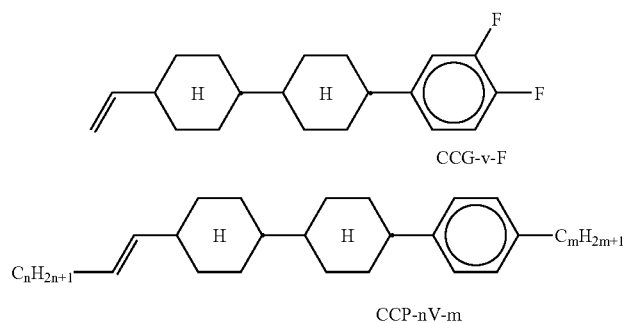
CCG-v-F
CCP-nV-m
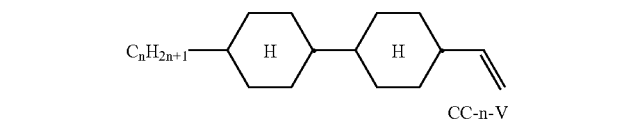
CC-n-V
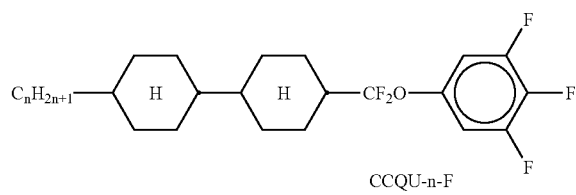
CCQU-n-F
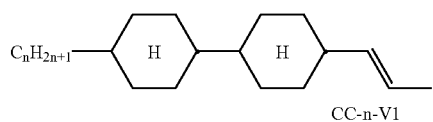
CC-n-V1
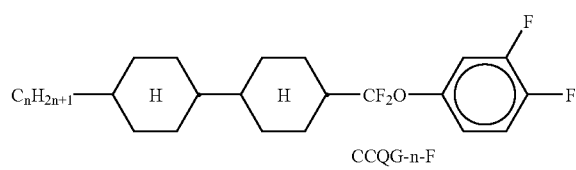
CCQG-n-F TABLE B-continued
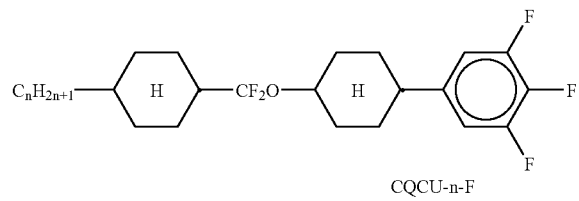
CQCU-n-F
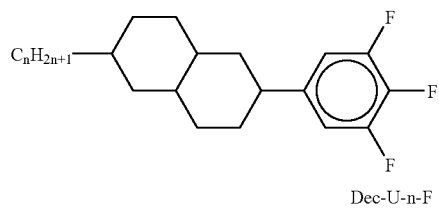
Dec-U-n-F
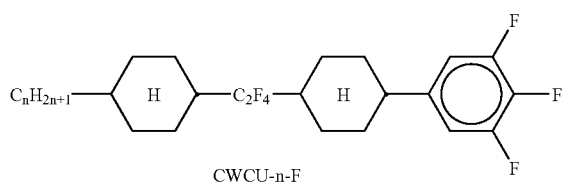
CWCU-n-F
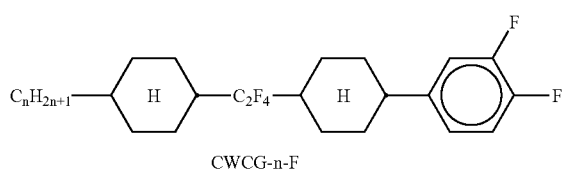
CWCG-n-F
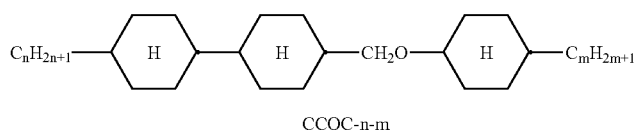
CCOC-n-m
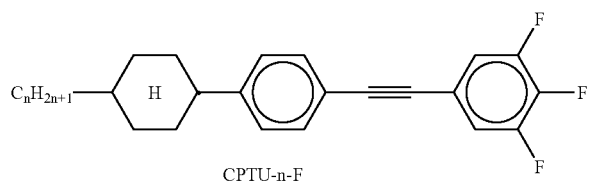
CPTU-n-F
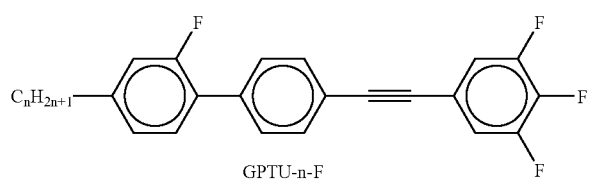
GPTU-n-F
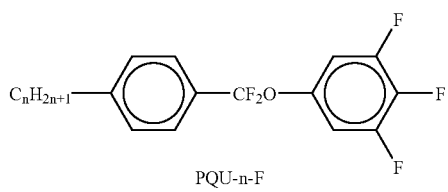
PQU-n-F TABLE B-continued
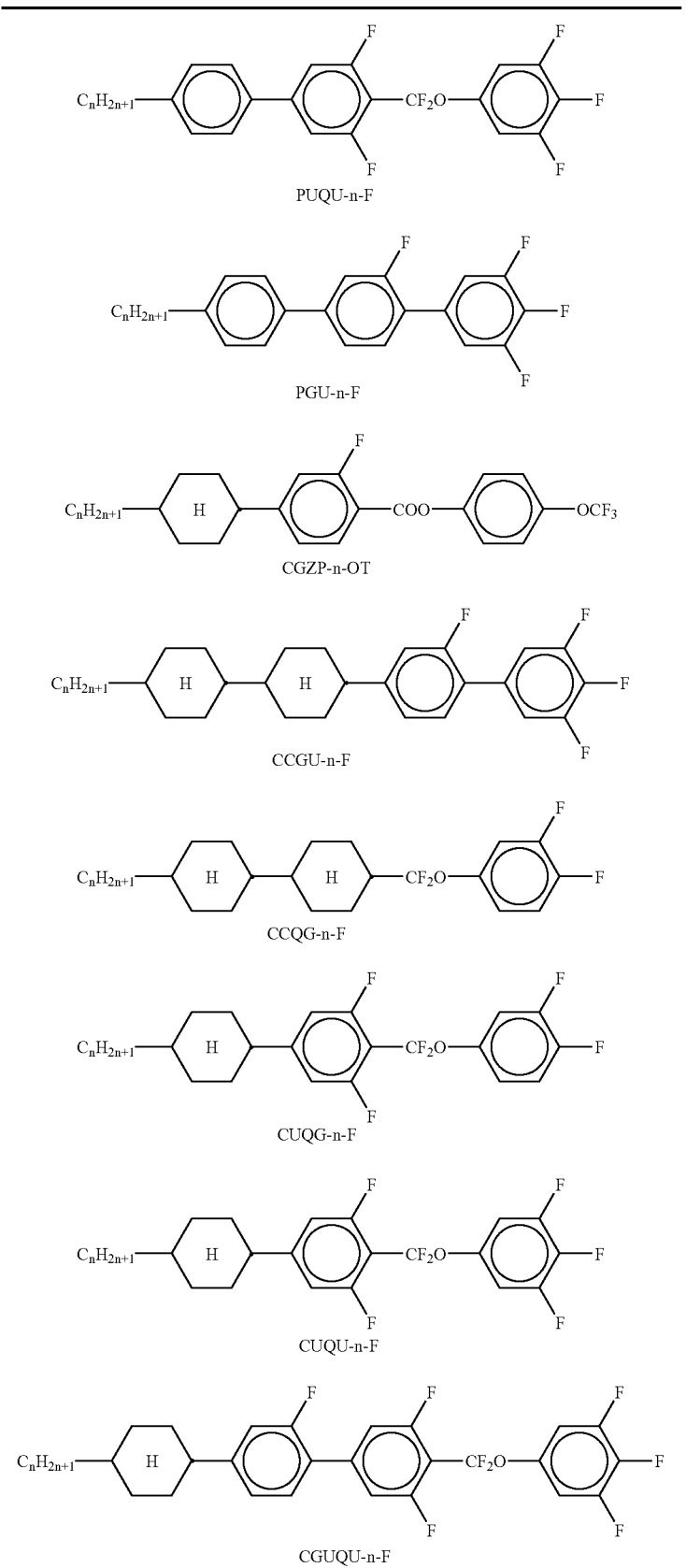

TABLE B-continued
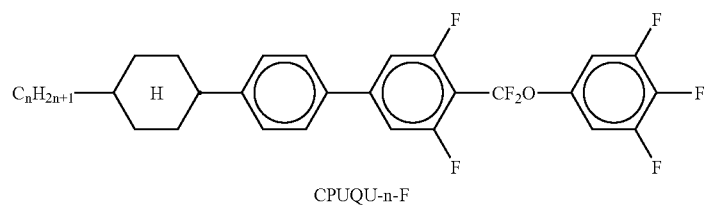
CPUQU-n-F
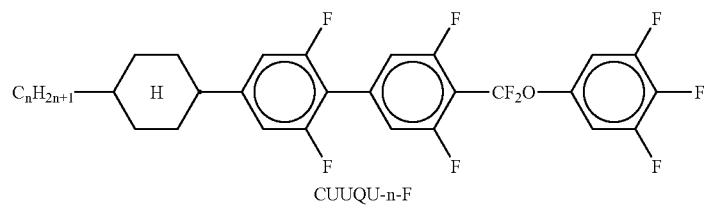
CUUQU-n-F
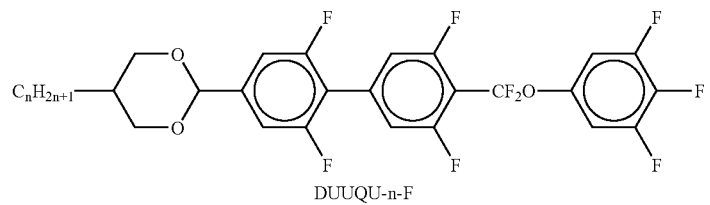
DUUQU-n-F
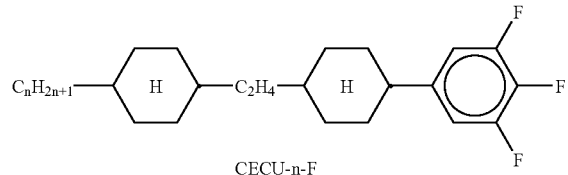
CECU-n-F
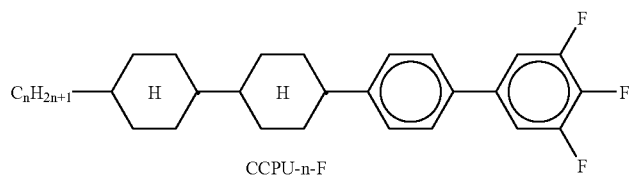
CCPU-n-F
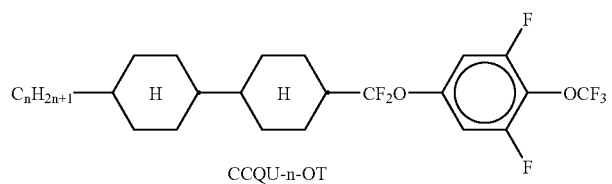
CCQU-n-OT
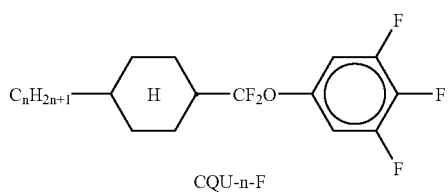
CQU-n-F Particular preference is given to liquid-crystalline mixtures which, besides the compounds of the formulae I and IA, comprise at least one, two, three or four compounds from Table B.

TABLE C

Table C shows possible dopants which can be added to the mixtures according to the invention. The mixtures according to the invention preferably comprise 0.01–10% by weight of a dopant or dopant mixture. Of the dopants mentioned, particular preference is given to CN, CM 44, R/S-2011, R/S-4011, R/S-5011, furthermore C15 or CB15.

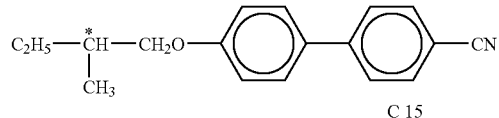

C 15

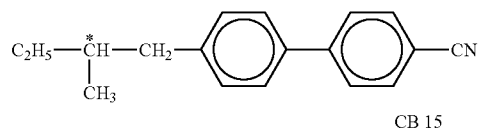

CB 15

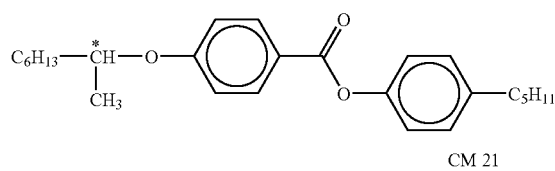

CM 21

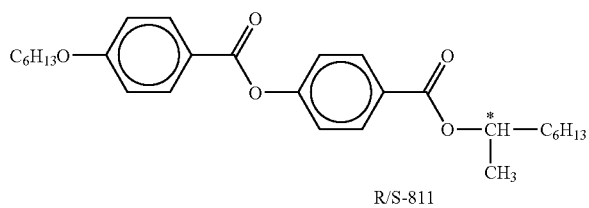

R/S-811

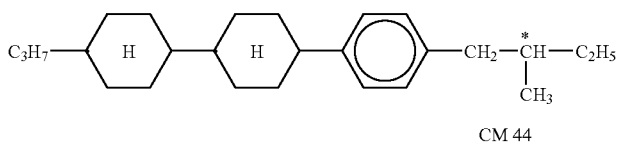

CM 44

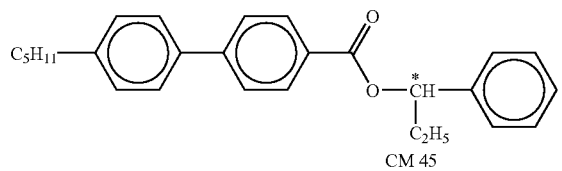

CM 45

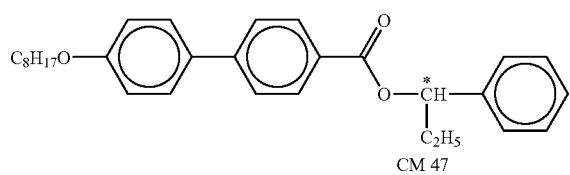

CM 47

TABLE C-continued
Table C shows possible dopants which can be added to the mixtures according to the invention. The mixtures according to the invention preferably comprise 0.01–10% by weight of a dopant or dopant mixture. Of the dopants mentioned, particular preference is given to CN, CM 44, R/S-2011, R/S-4011, R/S-5011, furthermore C15 or CB15.
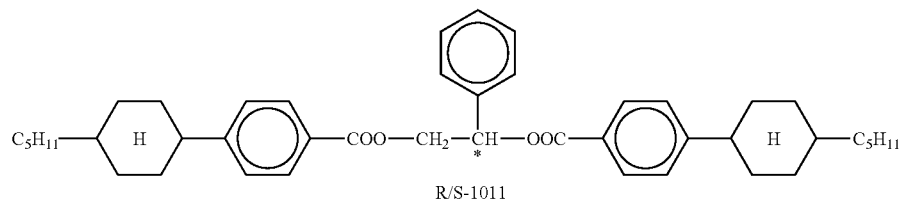
R/S-1011
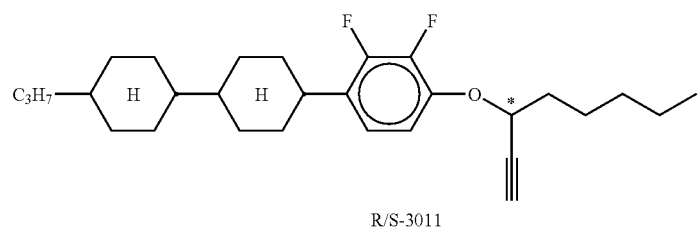
R/S-3011
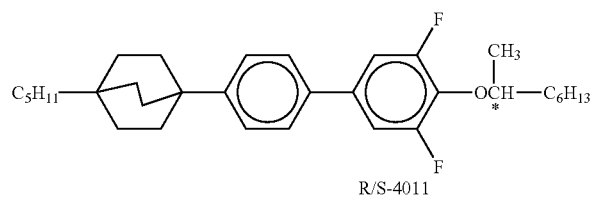
R/S-4011
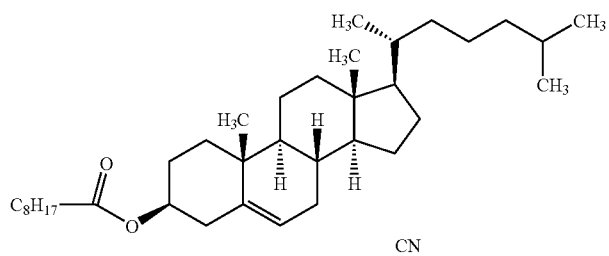
CN
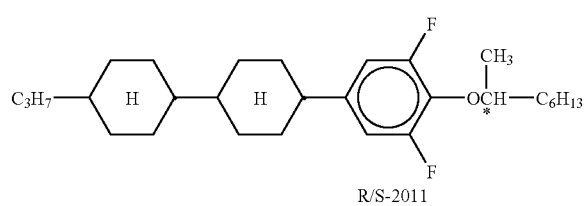
R/S-2011
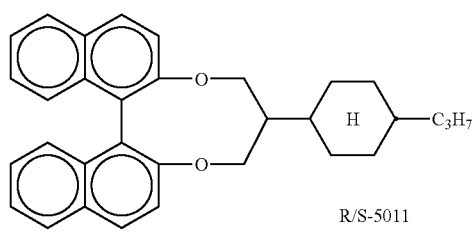
R/S-5011

TABLE D
Stabilizers which can be added, for example, to the mixtures according to the invention are mentioned below. If the mixtures according to the invention comprise a stabilizer, it is added in amounts of from 0.01 to 10% by weight.
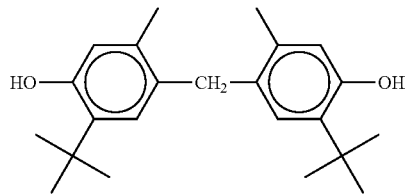
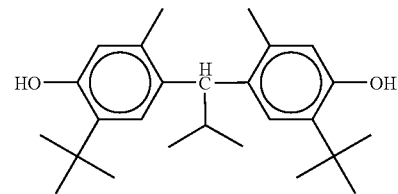
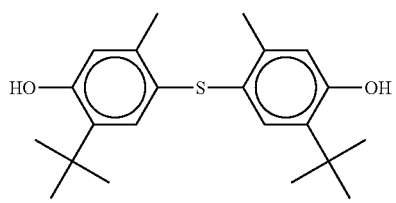
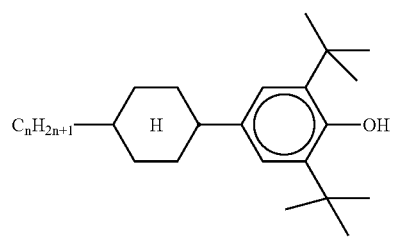
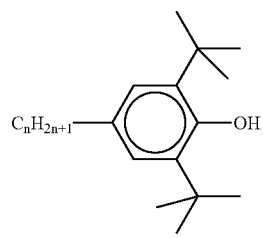
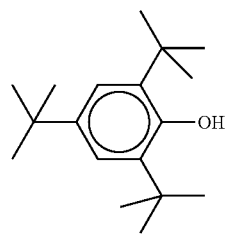
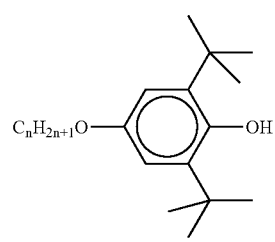
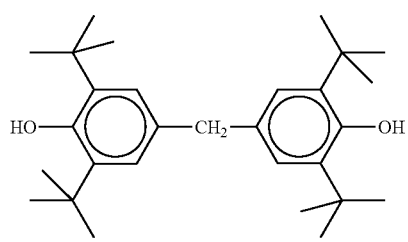
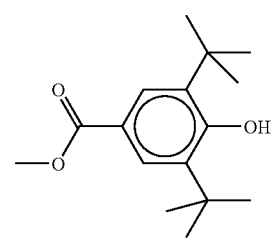
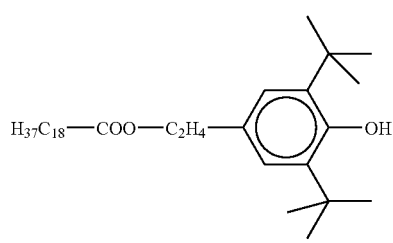

TABLE D-continued
Stabilizers which can be added, for example, to the mixtures according to the invention are mentioned below. If the mixtures according to the invention comprise a stabilizer, it is added in amounts of from 0.01 to 10% by weight.
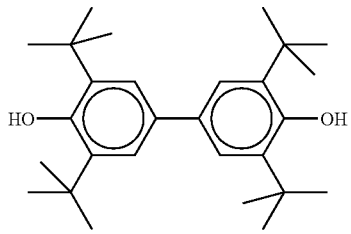
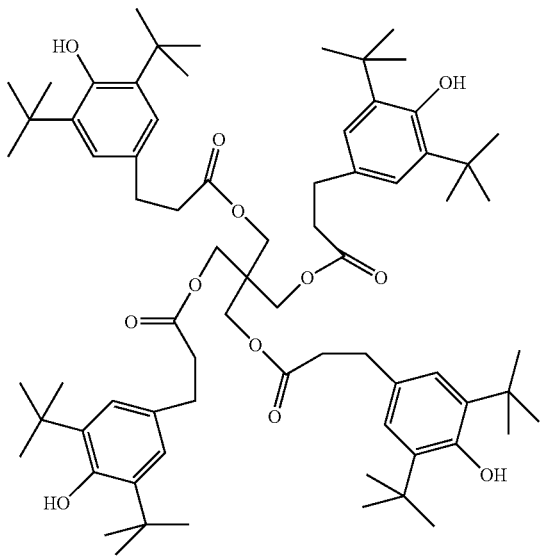
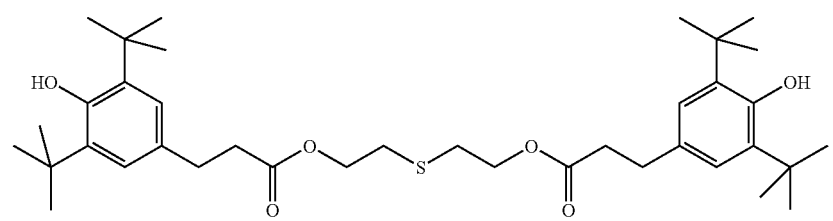
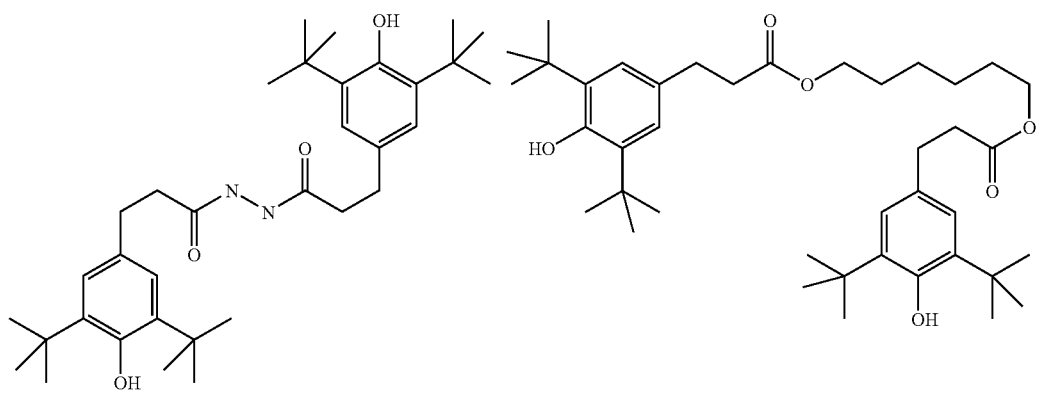

TABLE D-continued
Stabilizers which can be added, for example, to the mixtures according to the invention are mentioned below. If the mixtures according to the invention comprise a stabilizer, it is added in amounts of from 0.01 to 10% by weight.
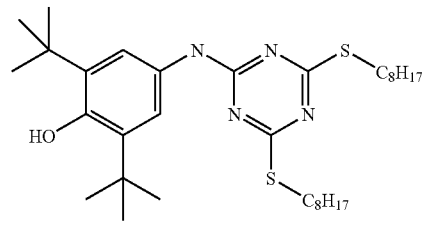
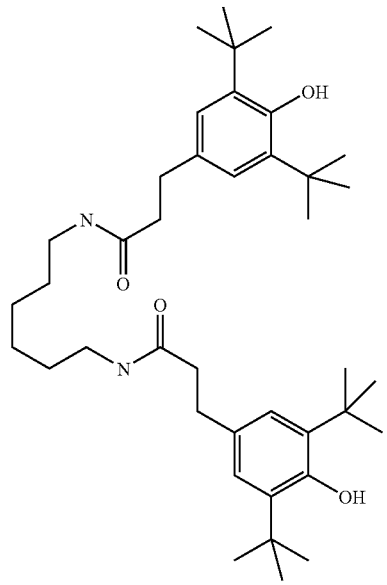
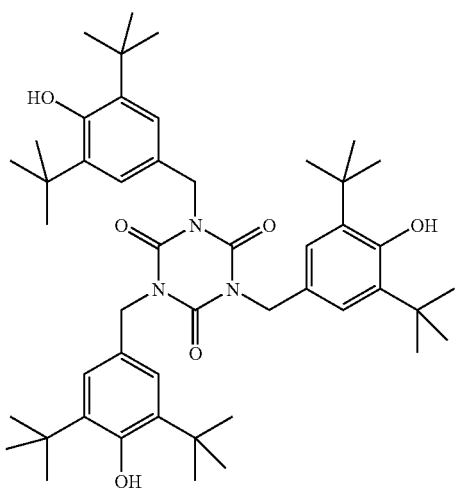
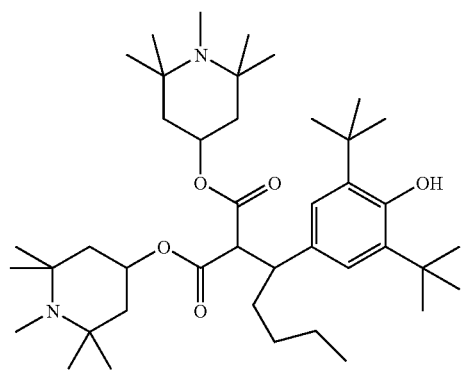
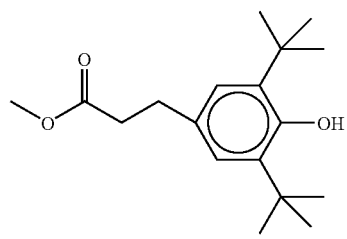
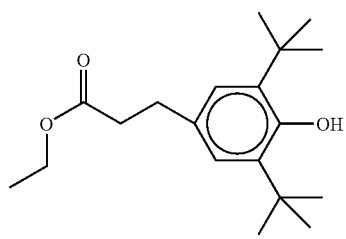
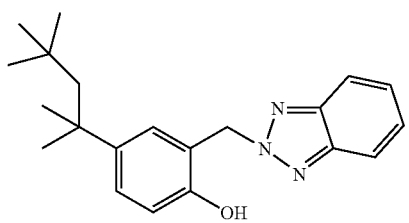
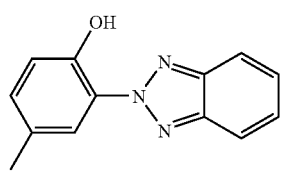

TABLE D-continued
Stabilizers which can be added, for example, to the mixtures according to the invention are mentioned below. If the mixtures according to the invention comprise a stabilizer, it is added in amounts of from 0.01 to 10% by weight.
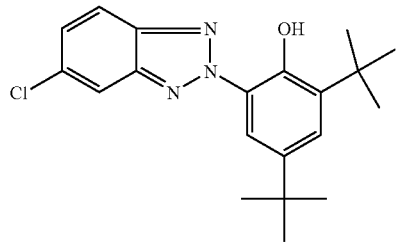 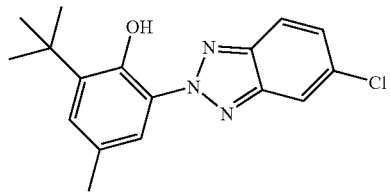
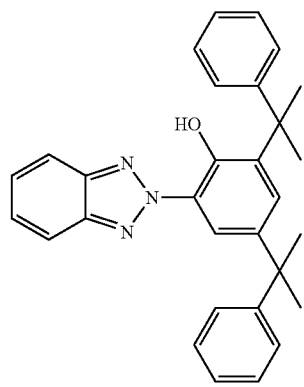 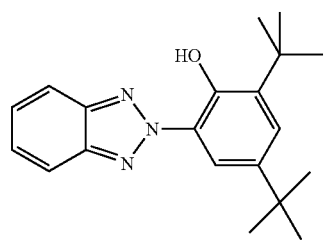
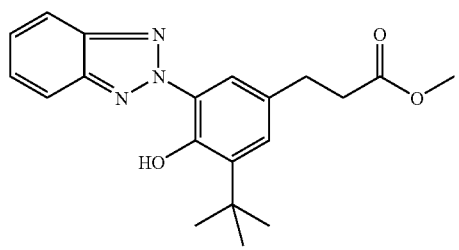 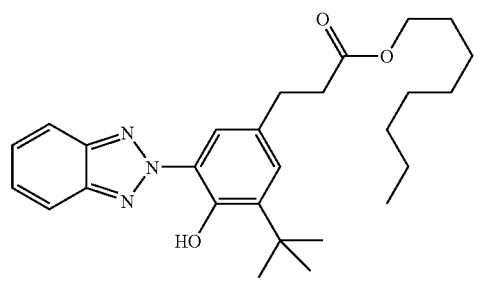
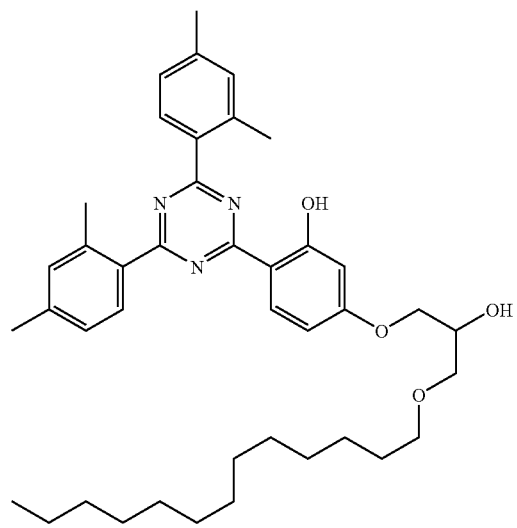 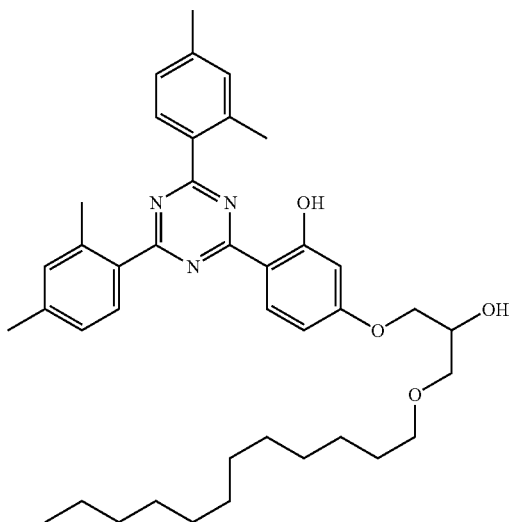

TABLE D-continued

Stabilizers which can be added, for example, to the mixtures according to the invention are mentioned below. If the mixtures according to the invention comprise a stabilizer, it is added in amounts of from 0.01 to 10% by weight.

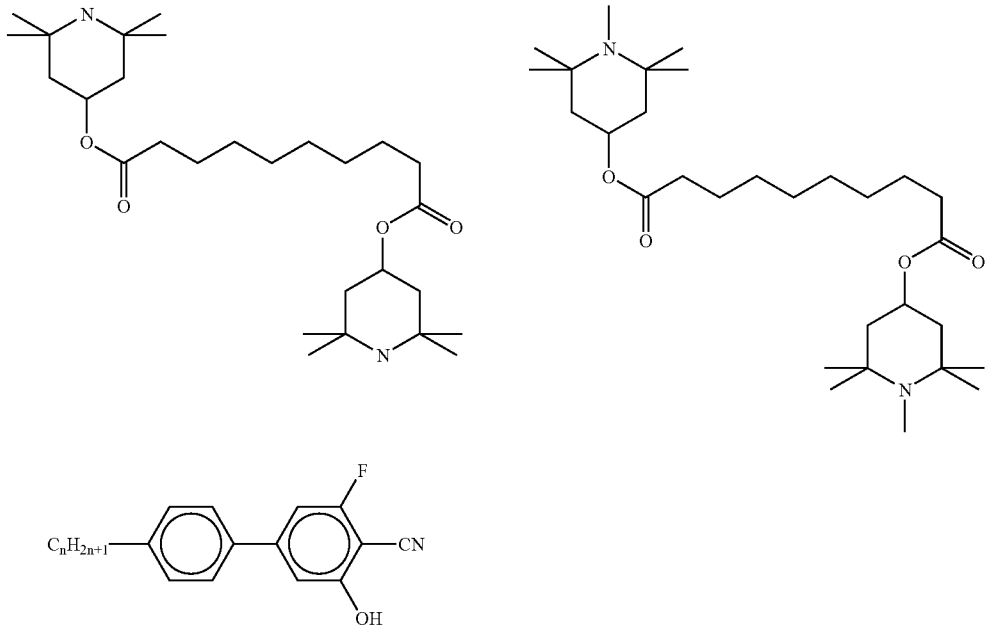

The following examples are intended to explain the invention without restricting it. Above and below, percentages are per cent by weight. All temperatures are given in degrees Celsius. m.p. denotes melting point, cl.p. clearing point. Furthermore, C=crystalline state, N=nematic phase, S=smectic phase and I=isotropic phase. The data between these symbols represent the transition temperatures. An denotes optical anisotropy (589 nm, 20° C.), Δε the dielectric anisotropy (1 kHz, 20° C). The flow viscosity $v_{20}$ (mm²/sec) was determined at 20° C. The rotational viscosity $\gamma_1$ (mPa·s) is likewise determined at 20° C.

EXAMPLES

Example 1

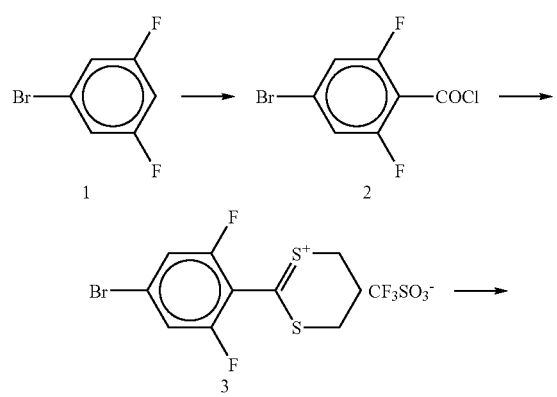

-continued

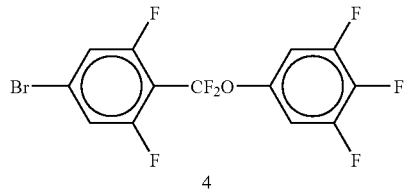

Step 1.1

A solution of 0.2 mol of 1 in 300 ml of THF is treated with 0.21 mol of lithium diisopropylamide (LDA; 1 M in THF) at −40° C. After 30 minutes, a vigorous stream of $CO_2$ is passed in. The reaction mixture is poured into 1.5 l of ice-cold 1 N HCl. The solution is extracted with $CH_2Cl_2$, and the combined organic extracts are dried over $Na_2SO_4$ and evaporated to dryness. For purification, the crude product is recrystallized from toluene. The carboxylic acid obtained in this way is dissolved in 200 ml of $SOCl_2$ and, after addition of 0.1 ml of DMF, heated at the boil for 3 hours. The excess $SOCl_2$ is removed by distillation.

Step 1.2

Firstly 0.11 mol of propane-1,3-dithiol, then 0.25 mol of trifluoromethanesulfonic acid are added to 0.1 mol of 2 at 0° C. The mixture is stirred for 1 hour with ice-cooling, and then 0.4 mol of acetic anhydride is allowed to run in slowly. After a further hour, 500 ml of diethyl ether are added, and the precipitated dithianylium salt 3 is filtered off with suction and dried under reduced pressure.

Step 1.3

A suspension of 0.1 mol of 3 in 300 ml of $CH_2Cl_2$ is cooled to −70° C., and a mixture of 0.15 mol of 3,4,5- trifluorophenol, 0.17 mol of NEt₃ and 100 ml of CH₂Cl₂ is added dropwise. After 5 minutes, firstly 0.5 mol of NEt₃.3HF and, after a further 5 minutes, 0.5 mol of Br₂ are added dropwise. The mixture is stirred at −70° C. for 1 hour, then allowed to come to room temperature, and the orange-yellow solution is poured into ice-cold 0.1 N NaOH. The mixture is extracted with CH₂Cl₂, and the combined organic extracts are dried over Na₂SO₄ and evaporated to dryness in a rotary evaporator. For further purification, the crude product is dissolved in n-heptane and filtered through a silica gel frit. The product 4 is subsequently recrystallized from n-heptane at −20° C.

Step 1.4 are added dropwise. The mixture is stirred at −70° C. for 1 hour, then allowed to come to room temperature, and the orange-yellow solution is poured into ice-cold 0.1 N NaOH. The mixture is extracted with CH₂Cl₂, and the combined organic extracts are dried over Na₂SO₄ and evaporated to dryness in a rotary evaporator. For further purification, the crude product is dissolved in n-heptane and filtered through a silica gel frit. The product 5 is subsequently recrystallized from n-heptane at −20° C.

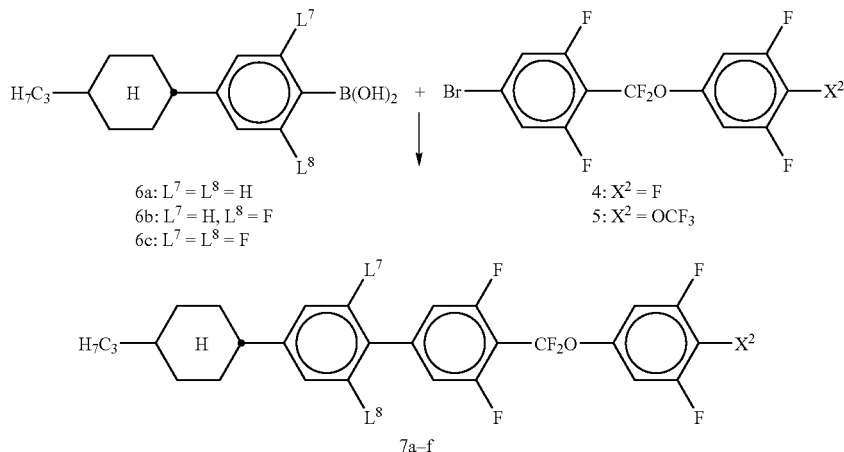

6a: L⁷ = L⁸ = H
6b: L⁷ = H, L⁸ = F
6c: L⁷ = L⁸ = F

4: X² = F
5: X² = OCF₃

7a–f

General procedure for 7a–f: A mixture of 50 mmol of 6a–c, 50 mmol of 4 or 5, 2.5 mmol of Pd(PPh₃)₄, 300 ml of toluene and 300 ml of Na borate buffer pH 9 is stirred at 80° C. for 18 hours. The mixture is poured into 500 ml of 0.1 N HCl, and the product is extracted with CH₂Cl₂, dried over Na₂SO₄ and evaporated to dryness in a rotary evaporator. The crude product is chromatographed over silica gel in n-heptane and subsequently recrystallized from n-heptane at −20° C.

The following compounds of the formula

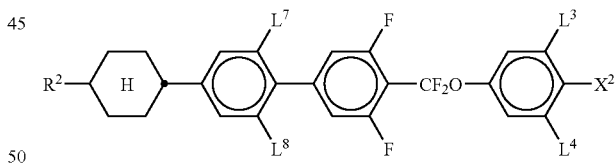

are prepared analogously:

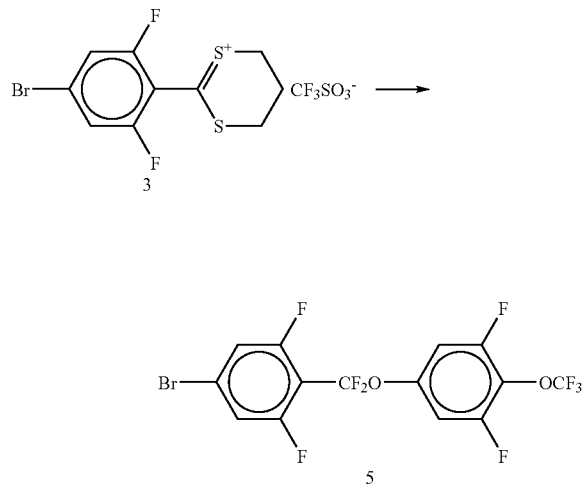

A suspension of 0.1 mol of 3 in 300 ml of CH₂Cl₂ is cooled to −70° C., and a mixture of 0.15 mol of 3,5-difluoro-4-trifluoromethoxyphenol, 0.17 mol of NEt₃ and 100 ml of CH₂Cl₂ is added dropwise. After 5 minutes, firstly 0.5 mol of NEt₃.3HF and, after a further 5 minutes, 0.5 mol of Br₂

| R² | L⁷ | L⁸ | X² | L³ | L⁴ | |
|---|---|---|---|---|---|---|
| H | H | H | F | H | H | |
| H | H | H | F | F | H | C 88 I; Δn = 0.1231; Δε = 22.4 |
| H | H | H | F | F | F | C 91 I; Δn = 0.0991; Δε = 23.8 |
| H | H | F | F | F | F | |
| H | F | F | F | F | F | |
| CH₃ | H | H | F | H | H | |
| CH₃ | H | H | F | F | H | |

| R² | L⁷ | L⁸ | X² | L³ | L⁴ | |
|---|---|---|---|---|---|---|
| CH₃ | H | H | F | F | F | |
| CH₃ | H | H | F | F | F | |
| CH₃ | F | F | F | F | F | |
| C₂H₅ | H | H | F | H | H | |
| C₂H₅ | H | H | F | F | H | |
| C₂H₅ | H | H | F | F | F | |
| C₂H₅ | H | F | F | F | F | |
| | | | | | | C 85 N (85.0) I; |
| C₂H₅ | F | F | F | F | F | Δn = 0.1150; Δε = 28.7 |
| n-C₃H₇ | H | H | F | H | H | |
| n-C₃H₇ | H | H | F | F | H | |
| n-C₃H₇ | H | H | F | F | F | |
| n-C₃H₇ | H | F | F | F | F | |
| | | | | | | C 94 N 112.4 I; |
| n-C₃H₇ | F | F | F | F | F | Δn = 0.1240; Δε = 28.6 |
| n-C₄H₉ | H | H | F | H | H | |
| n-C₄H₉ | H | H | F | F | H | |
| n-C₄H₉ | H | H | F | F | F | |
| n-C₄H₉ | H | F | F | F | F | |
| n-C₄H₉ | F | F | F | F | F | |
| n-C₅H₁₁ | H | H | F | H | H | |
| n-C₅H₁₁ | H | H | F | F | H | |
| n-C₅H₁₁ | H | H | F | F | F | |
| n-C₅H₁₁ | H | F | F | F | F | |
| n-C₅H₁₁ | F | F | F | F | F | |
| n-C₆H₁₃ | H | H | F | H | H | |
| n-C₆H₁₃ | H | H | F | F | H | |
| n-C₆H₁₃ | H | H | F | F | F | |
| n-C₆H₁₃ | H | F | F | F | F | |
| n-C₆H₁₃ | F | F | F | F | F | |
| CH₂=CH | H | H | F | H | H | |
| CH₂=CH | H | H | F | F | H | |
| CH₂=CH | H | H | F | F | F | |
| CH₂=CH | H | F | F | F | F | |
| CH₂=CH | F | F | F | F | F | |
| CH₃CH=CH | H | H | F | H | H | |
| CH₃CH=CH | H | H | F | F | H | |
| CH₃CH=CH | H | H | F | F | F | |
| CH₃CH=CH | H | F | F | F | F | |
| CH₃CH=CH | F | F | F | F | F | |
| CH₂=CHCH₂CH₂ | H | H | F | H | H | |
| CH₂=CHCH₂CH₂ | H | H | F | F | H | |
| CH₂=CHCH₂CH₂ | H | H | F | F | F | |
| CH₂=CHCH₂CH₂ | H | F | F | F | F | |
| CH₂=CHCH₂CH₂ | F | F | F | F | F | |
| H | H | H | OCF₃ | H | H | |
| H | H | H | OCF₃ | F | H | |
| | | | | | | C 69 I; Δn = 0.1246; Δε = 28.2 |
| H | H | H | OCF₃ | F | F | |
| H | H | F | OCF₃ | F | F | |
| H | F | F | OCF₃ | F | F | |
| CH₃ | H | H | OCF₃ | H | H | |
| CH₃ | H | H | OCF₃ | F | H | |
| CH₃ | H | H | OCF₃ | F | F | |
| CH₃ | H | F | OCF₃ | F | F | |
| CH₃ | F | F | OCF₃ | F | F | |
| C₂H₅ | H | H | OCF₃ | H | H | |
| C₂H₅ | H | H | OCF₃ | F | H | |
| C₂H₅ | H | H | OCF₃ | F | F | |
| | | | | | | C 76 N 120.7 I; |
| C₂H₅ | H | F | OCF₃ | F | F | Δn = 0.1295; Δε = 26.9 |
| | | | | | | C 77 N 103.5 I; |
| C₂H₅ | F | F | OCF₃ | F | F | Δn = 0.1154; Δε = 30.5 |
| n-C₃H₇ | H | H | OCF₃ | H | H | |
| n-C₃H₇ | H | H | OCF₃ | F | H | |
| n-C₃H₇ | H | H | OCF₃ | F | F | |
| | | | | | | C 71 N 142.5 I; |

| R² | L⁷ | L⁸ | X² | L³ | L⁴ | |
|---|---|---|---|---|---|---|
| n-C₃H₇ | H | F | OCF₃ | F | F | Δn = 0.1320; Δε = 26.8 C 77 N 128.7 I; |
| n-C₃H₇ | F | F | OCF₃ | F | F | Δn = 0.1240; Δε = 29.9 |
| n-C₄H₉ | H | H | OCF₃ | H | H | |
| n-C₄H₉ | H | H | OCF₃ | F | H | |
| n-C₄H₉ | H | H | OCF₃ | F | F | |
| n-C₄H₉ | H | F | OCF₃ | F | F | |
| n-C₄H₉ | F | F | OCF₃ | F | F | |
| n-C₅H₁₁ | H | H | OCF₃ | H | H | |
| n-C₅H₁₁ | H | H | OCF₃ | F | H | |
| n-C₅H₁₁ | H | H | OCF₃ | F | F | |
| n-C₅H₁₁ | H | F | OCF₃ | F | F | |
| n-C₅H₁₁ | F | F | OCF₃ | F | F | |
| n-C₆H₁₃ | H | H | OCF₃ | H | H | |
| n-C₆H₁₃ | H | H | OCF₃ | F | H | |
| n-C₆H₁₃ | H | H | OCF₃ | F | F | |
| n-C₆H₁₃ | H | F | OCF₃ | F | F | |
| n-C₆H₁₃ | F | F | OCF₃ | F | F | |
| CH₂=CH | H | H | OCF₃ | H | H | |
| CH₂=CH | H | H | OCF₃ | F | H | |
| CH₂=CH | H | H | OCF₃ | F | F | |
| CH₂=CH | H | F | OCF₃ | F | F | |
| CH₂=CH | F | F | OCF₃ | F | F | |
| CH₃CH=CH | H | H | OCF₃ | H | H | |
| CH₃CH=CH | H | H | OCF₃ | F | H | |
| CH₃CH=CH | H | H | OCF₃ | F | F | |
| CH₃CH=CH | H | F | OCF₃ | F | F | |
| CH₃CH=CH | F | F | OCF₃ | F | F | |
| CH₂=CHCH₂CH₂ | H | H | OCF₃ | H | H | |
| CH₂=CHCH₂CH₂ | H | H | OCF₃ | F | H | |
| CH₂=CHCH₂CH₂ | H | H | OCF₃ | F | F | |
| CH₂=CHCH₂CH₂ | H | F | OCF₃ | F | F | |
| CH₂=CHCH₂CH₂ | F | F | OCF₃ | F | F | |
| H | H | H | Cl | H | H | |
| H | H | H | Cl | F | H | |
| | | | | | | C 92 I; |
| H | H | H | Cl | F | F | Δn = 0.1489; Δε = 20.4 |
| H | H | H | Cl | H | H | |
| H | H | H | Cl | F | H | |
| H | H | F | Cl | F | F | |
| H | F | F | Cl | F | F | |
| CH₃ | H | H | Cl | H | H | |
| CH₃ | H | H | Cl | F | H | |
| CH₃ | H | H | Cl | F | F | |
| CH₃ | H | F | Cl | F | F | |
| CH₃ | F | F | Cl | F | F | |
| C₂H₅ | H | H | Cl | H | H | |
| C₂H₅ | H | H | Cl | F | H | |
| C₂H₅ | H | H | Cl | F | F | |
| C₂H₅ | H | F | Cl | F | F | |
| C₂H₅ | F | F | Cl | F | F | |
| n-C₃H₇ | H | H | Cl | H | H | |
| n-C₃H₇ | H | H | Cl | F | H | |
| n-C₃H₇ | H | H | Cl | F | F | |
| n-C₃H₇ | H | F | Cl | F | F | |
| n-C₃H₇ | F | F | Cl | F | F | |
| n-C₄H₉ | H | H | Cl | H | H | |
| n-C₄H₉ | H | H | Cl | F | H | |
| n-C₄H₉ | H | H | Cl | F | F | |
| n-C₄H₉ | H | F | Cl | F | F | |
| n-C₄H₉ | F | F | Cl | F | F | |
| n-C₅H₁₁ | H | H | Cl | H | H | |
| n-C₅H₁₁ | H | H | Cl | F | H | |
| n-C₅H₁₁ | H | H | Cl | F | F | |
| n-C₅H₁₁ | H | F | Cl | F | F | |
| n-C₅H₁₁ | F | F | Cl | F | F | |
| n-C₆H₁₃ | H | H | Cl | H | H | |
| n-C₆H₁₃ | H | H | Cl | F | H | |
| n-C₆H₁₃ | H | H | Cl | F | F | |
| n-C₆H₁₃ | H | F | Cl | F | F | |
| n-C₆H₁₃ | F | F | Cl | F | F | |
| CH₂=CH | H | H | Cl | H | H | |

-continued

| R² | L⁷ | L⁸ | X² | L³ | L⁴ |
|---|---|---|---|---|---|
| CH₂=CH | H | H | Cl | H | H |
| CH₂=CH | H | H | Cl | F | H |
| CH₂=CH | H | F | Cl | F | F |
| CH₂=CH | F | F | Cl | F | F |
| CH₃CH=CH | H | H | Cl | H | H |
| CH₃CH=CH | H | H | Cl | F | H |
| CH₃CH=CH | H | F | Cl | F | F |
| CH₃CH=CH | F | F | Cl | F | F |
| CH₂=CHCH₂CH₂ | H | H | Cl | H | H |
| CH₂=CHCH₂CH₂ | H | H | Cl | F | H |
| CH₂=CHCH₂CH₂ | H | F | Cl | F | F |
| CH₂=CHCH₂CH₂ | F | F | Cl | F | F |
| H | H | H | OCHF₂ | H | H |
| H | H | H | OCHF₂ | F | H |
| H | H | F | OCHF₂ | F | F |
| H | F | F | OCHF₂ | F | F |
| CH₃ | H | H | OCHF₂ | H | H |
| CH₃ | H | H | OCHF₂ | F | H |
| CH₃ | H | F | OCHF₂ | F | F |
| CH₃ | F | F | OCHF₂ | F | F |
| C₂H₅ | H | H | OCHF₂ | H | H |
| C₂H₅ | H | H | OCHF₂ | F | H |
| C₂H₅ | H | F | OCHF₂ | F | F |
| C₂H₅ | F | F | OCHF₂ | F | F |
| n-C₃H₇ | H | H | OCHF₂ | H | H |
| n-C₃H₇ | H | H | OCHF₂ | F | H |
| n-C₃H₇ | H | F | OCHF₂ | F | F |
| n-C₃H₇ | F | F | OCHF₂ | F | F |
| n-C₄H₉ | H | H | OCHF₂ | H | H |
| n-C₄H₉ | H | H | OCHF₂ | F | H |
| n-C₄H₉ | H | F | OCHF₂ | F | F |
| n-C₄H₉ | F | F | OCHF₂ | F | F |
| n-C₅H₁₁ | H | H | OCHF₂ | H | H |
| n-C₅H₁₁ | H | H | OCHF₂ | F | H |
| n-C₅H₁₁ | H | F | OCHF₂ | F | F |
| n-C₅H₁₁ | F | F | OCHF₂ | F | F |
| n-C₆H₁₃ | H | H | OCHF₂ | H | H |
| n-C₆H₁₃ | H | H | OCHF₂ | F | H |
| n-C₆H₁₃ | H | F | OCHF₂ | F | F |
| n-C₆H₁₃ | F | F | OCHF₂ | F | F |
| CH₂=CH | H | H | OCHF₂ | H | H |
| CH₂=CH | H | H | OCHF₂ | F | H |
| CH₂=CH | H | F | OCHF₂ | F | F |
| CH₂=CH | F | F | OCHF₂ | F | F |
| CH₃CH=CH | H | H | OCHF₂ | H | H |
| CH₃CH=CH | H | H | OCHF₂ | F | H |
| CH₃CH=CH | H | F | OCHF₂ | F | F |
| CH₃CH=CH | F | F | OCHF₂ | F | F |
| CH₂=CHCH₂CH₂ | H | H | OCHF₂ | H | H |
| CH₂=CHCH₂CH₂ | H | H | OCHF₂ | F | H |
| CH₂=CHCH₂CH₂ | H | F | OCHF₂ | F | F |
| CH₂=CHCH₂CH₂ | F | F | OCHF₂ | F | F |
| H | H | H | SF₅ | H | H |
| H | H | H | SF₅ | F | H |
| H | H | F | SF₅ | F | F |
| H | F | F | SF₅ | F | F |
| CH₃ | H | H | SF₅ | H | H |
| CH₃ | H | H | SF₅ | F | H |
| CH₃ | H | F | SF₅ | F | F |
| CH₃ | F | F | SF₅ | F | F |
| C₂H₅ | H | H | SF₅ | H | H |
| C₂H₅ | H | H | SF₅ | F | H |

-continued

| R² | L⁷ | L⁸ | X² | L³ | L⁴ |
|---|---|---|---|---|---|
| C₂H₅ | H | F | SF₅ | F | F |
| C₂H₅ | F | F | SF₅ | F | F |
| n-C₃H₇ | H | H | SF₅ | H | H |
| n-C₃H₇ | H | H | SF₅ | F | H |
| n-C₃H₇ | H | F | SF₅ | F | F |
| n-C₃H₇ | F | F | SF₅ | F | F |
| n-C₄H₉ | H | H | SF₅ | H | H |
| n-C₄H₉ | H | H | SF₅ | F | H |
| n-C₄H₉ | H | F | SF₅ | F | F |
| n-C₄H₉ | F | F | SF₅ | F | F |
| n-C₅H₁₁ | H | H | SF₅ | H | H |
| n-C₅H₁₁ | H | H | SF₅ | F | H |
| n-C₅H₁₁ | H | F | SF₅ | F | F |
| n-C₅H₁₁ | F | F | SF₅ | F | F |
| n-C₆H₁₃ | H | H | SF₅ | H | H |
| n-C₆H₁₃ | H | H | SF₅ | F | H |
| n-C₆H₁₃ | H | F | SF₅ | F | F |
| n-C₆H₁₃ | F | F | SF₅ | F | F |
| CH₂=CH | H | H | SF₅ | H | H |
| CH₂=CH | H | H | SF₅ | F | H |
| CH₂=CH | H | F | SF₅ | F | F |
| CH₂=CH | F | F | SF₅ | F | F |
| CH₃CH=CH | H | H | SF₅ | H | H |
| CH₃CH=CH | H | H | SF₅ | F | H |
| CH₃CH=CH | H | F | SF₅ | F | F |
| CH₃CH=CH | F | F | SF₅ | F | F |
| CH₂=CHCH₂CH₂ | H | H | SF₅ | H | H |
| CH₂=CHCH₂CH₂ | H | H | SF₅ | F | H |
| CH₂=CHCH₂CH₂ | H | F | SF₅ | F | F |
| CH₂=CHCH₂CH₂ | F | F | SF₅ | F | F |
| H | H | H | OC₃F₇ | H | H |
| H | H | H | OC₃F₇ | F | H |
| H | H | F | OC₃F₇ | F | F |
| H | F | F | OC₃F₇ | F | F |
| CH₃ | H | H | OC₃F₇ | H | H |
| CH₃ | H | H | OC₃F₇ | F | H |
| CH₃ | H | F | OC₃F₇ | F | F |
| CH₃ | F | F | OC₃F₇ | F | F |
| C₂H₅ | H | H | OC₃F₇ | H | H |
| C₂H₅ | H | H | OC₃F₇ | F | H |
| C₂H₅ | H | F | OC₃F₇ | F | F |
| C₂H₅ | F | F | OC₃F₇ | F | F |
| n-C₃H₇ | H | H | OC₃F₇ | H | H |
| n-C₃H₇ | H | H | OC₃F₇ | F | H |
| n-C₃H₇ | H | F | OC₃F₇ | F | F |
| n-C₃H₇ | F | F | OC₃F₇ | F | F |
| n-C₄H₉ | H | H | OC₃F₇ | H | H |
| n-C₄H₉ | H | H | OC₃F₇ | F | H |
| n-C₄H₉ | H | F | OC₃F₇ | F | F |
| n-C₄H₉ | F | F | OC₃F₇ | F | F |
| n-C₅H₁₁ | H | H | OC₃F₇ | H | H |
| n-C₅H₁₁ | H | H | OC₃F₇ | F | H |
| n-C₅H₁₁ | H | F | OC₃F₇ | F | F |
| n-C₅H₁₁ | F | F | OC₃F₇ | F | F |
| n-C₆H₁₃ | H | H | OC₃F₇ | H | H |
| n-C₆H₁₃ | H | H | OC₃F₇ | F | H |
| n-C₆H₁₃ | H | F | OC₃F₇ | F | F |
| n-C₆H₁₃ | F | F | OC₃F₇ | F | F |
| CH₂=CH | H | H | OC₃F₇ | H | H |
| CH₂=CH | H | H | OC₃F₇ | F | H |
| CH₂=CH | H | F | OC₃F₇ | F | F |
| CH₂=CH | F | F | OC₃F₇ | F | F |

| R² | L⁷ | L⁸ | X² | L³ | L⁴ |
|---|---|---|---|---|---|
| CH₃CH=CH | H | H | OC₃F₇ | H | H |
| CH₃CH=CH | H | H | OC₃F₇ | F | H |
| CH₃CH=CH | H | H | OC₃F₇ | F | F |
| CH₃CH=CH | H | F | OC₃F₇ | F | F |
| CH₃CH=CH | F | F | OC₃F₇ | F | F |
| CH₂=CHCH₂CH₂ | H | H | OC₃F₇ | H | H |
| CH₂=CHCH₂CH₂ | H | H | OC₃F₇ | F | H |
| CH₂=CHCH₂CH₂ | H | H | OC₃F₇ | F | F |
| CH₂=CHCH₂CH₂ | H | F | OC₃F₇ | F | F |
| CH₂=CHCH₂CH₂ | F | F | OC₃F₇ | F | F |
| H | H | H | OCHFCF₃ | H | H |
| H | H | H | OCHFCF₃ | F | H |
| H | H | H | OCHFCF₃ | F | F |
| H | H | F | OCHFCF₃ | F | F |
| H | F | F | OCHFCF₃ | F | F |
| CH₃ | H | H | OCHFCF₃ | H | H |
| CH₃ | H | H | OCHFCF₃ | F | H |
| CH₃ | H | H | OCHFCF₃ | F | F |
| CH₃ | H | F | OCHFCF₃ | F | F |
| CH₃ | F | F | OCHFCF₃ | F | F |
| C₂H₅ | H | H | OCHFCF₃ | H | H |
| C₂H₅ | H | H | OCHFCF₃ | F | H |
| C₂H₅ | H | H | OCHFCF₃ | F | F |
| C₂H₅ | H | F | OCHFCF₃ | F | F |
| C₂H₅ | F | F | OCHFCF₃ | F | F |
| n-C₃H₇ | H | H | OCHFCF₃ | H | H |
| n-C₃H₇ | H | H | OCHFCF₃ | F | H |
| n-C₃H₇ | H | H | OCHFCF₃ | F | F |
| n-C₃H₇ | H | F | OCHFCF₃ | F | F |
| n-C₃H₇ | F | F | OCHFCF₃ | F | F |
| n-C₄H₉ | H | H | OCHFCF₃ | H | H |
| n-C₄H₉ | H | H | OCHFCF₃ | F | H |
| n-C₄H₉ | H | H | OCHFCF₃ | F | F |
| n-C₄H₉ | H | F | OCHFCF₃ | F | F |
| n-C₄H₉ | F | F | OCHFCF₃ | F | F |
| n-C₅H₁₁ | H | H | OCHFCF₃ | H | H |
| n-C₅H₁₁ | H | H | OCHFCF₃ | F | H |
| n-C₅H₁₁ | H | H | OCHFCF₃ | F | F |
| n-C₅H₁₁ | H | F | OCHFCF₃ | F | F |
| n-C₅H₁₁ | F | F | OCHFCF₃ | F | F |
| n-C₆H₁₃ | H | H | OCHFCF₃ | H | H |
| n-C₆H₁₃ | H | H | OCHFCF₃ | F | H |
| n-C₆H₁₃ | H | H | OCHFCF₃ | F | F |
| n-C₆H₁₃ | H | F | OCHFCF₃ | F | F |
| n-C₆H₁₃ | F | F | OCHFCF₃ | F | F |
| CH₂=CH | H | H | OCHFCF₃ | H | H |
| CH₂=CH | H | H | OCHFCF₃ | F | H |
| CH₂=CH | H | H | OCHFCF₃ | F | F |
| CH₂=CH | H | F | OCHFCF₃ | F | F |
| CH₂=CH | F | F | OCHFCF₃ | F | F |
| CH₃CH=CH | H | H | OCHFCF₃ | H | H |
| CH₃CH=CH | H | H | OCHFCF₃ | F | H |
| CH₃CH=CH | H | H | OCHFCF₃ | F | F |
| CH₃CH=CH | H | F | OCHFCF₃ | F | F |
| CH₃CH=CH | F | F | OCHFCF₃ | F | F |
| CH₂=CHCH₂CH₂ | H | H | OCHFCF₃ | H | H |
| CH₂=CHCH₂CH₂ | H | H | OCHFCF₃ | F | H |
| CH₂=CHCH₂CH₂ | H | H | OCHFCF₃ | F | F |
| CH₂=CHCH₂CH₂ | H | F | OCHFCF₃ | F | F |
| CH₂=CHCH₂CH₂ | F | F | OCHFCF₃ | F | F |
| H | H | H | OCF₂CHFCF₃ | H | H |
| H | H | H | OCF₂CHFCF₃ | F | H |
| H | H | H | OCF₂CHFCF₃ | F | F |
| H | H | F | OCF₂CHFCF₃ | F | F |
| H | F | F | OCF₂CHFCF₃ | F | F |
| CH₃ | H | H | OCF₂CHFCF₃ | H | H |
| CH₃ | H | H | OCF₂CHFCF₃ | F | H |
| CH₃ | H | H | OCF₂CHFCF₃ | F | F |
| CH₃ | H | F | OCF₂CHFCF₃ | F | F |
| CH₃ | F | F | OCF₂CHFCF₃ | F | F |
| C₂H₅ | H | H | OCF₂CHFCF₃ | H | H |
| C₂H₅ | H | H | OCF₂CHFCF₃ | F | H |
| C₂H₅ | H | H | OCF₂CHFCF₃ | F | F |
| C₂H₅ | H | F | OCF₂CHFCF₃ | F | F |
| C₂H₅ | F | F | OCF₂CHFCF₃ | F | F |
| n-C₃H₇ | H | H | OCF₂CHFCF₃ | H | H |
| n-C₃H₇ | H | H | OCF₂CHFCF₃ | F | H |
| n-C₃H₇ | H | H | OCF₂CHFCF₃ | F | F |
| n-C₃H₇ | H | F | OCF₂CHFCF₃ | F | F |
| n-C₃H₇ | F | F | OCF₂CHFCF₃ | F | F |
| n-C₄H₉ | H | H | OCF₂CHFCF₃ | H | H |
| n-C₄H₉ | H | H | OCF₂CHFCF₃ | F | H |
| n-C₄H₉ | H | H | OCF₂CHFCF₃ | F | F |
| n-C₄H₉ | H | F | OCF₂CHFCF₃ | F | F |
| n-C₄H₉ | F | F | OCF₂CHFCF₃ | F | F |
| n-C₅H₁₁ | H | H | OCF₂CHFCF₃ | H | H |
| n-C₅H₁₁ | H | H | OCF₂CHFCF₃ | F | H |
| n-C₅H₁₁ | H | H | OCF₂CHFCF₃ | F | F |
| n-C₅H₁₁ | H | F | OCF₂CHFCF₃ | F | F |
| n-C₅H₁₁ | F | F | OCF₂CHFCF₃ | F | F |
| n-C₆H₁₃ | H | H | OCF₂CHFCF₃ | H | H |
| n-C₆H₁₃ | H | H | OCF₂CHFCF₃ | F | H |
| n-C₆H₁₃ | H | H | OCF₂CHFCF₃ | F | F |
| n-C₆H₁₃ | H | F | OCF₂CHFCF₃ | F | F |
| n-C₆H₁₃ | F | F | OCF₂CHFCF₃ | F | F |
| CH₂=CH | H | H | OCF₂CHFCF₃ | H | H |
| CH₂=CH | H | H | OCF₂CHFCF₃ | F | H |
| CH₂=CH | H | H | OCF₂CHFCF₃ | F | F |
| CH₂=CH | H | F | OCF₂CHFCF₃ | F | F |
| CH₂=CH | F | F | OCF₂CHFCF₃ | F | F |
| CH₃CH=CH | H | H | OCF₂CHFCF₃ | H | H |
| CH₃CH=CH | H | H | OCF₂CHFCF₃ | F | H |
| CH₃CH=CH | H | H | OCF₂CHFCF₃ | F | F |
| CH₃CH=CH | H | F | OCF₂CHFCF₃ | F | F |
| CH₃CH=CH | F | F | OCF₂CHFCF₃ | F | F |
| CH₂=CHCH₂CH₂ | H | H | OCF₂CHFCF₃ | H | H |
| CH₂=CHCH₂CH₂ | H | H | OCF₂CHFCF₃ | F | H |
| CH₂=CHCH₂CH₂ | H | H | OCF₂CHFCF₃ | F | F |
| CH₂=CHCH₂CH₂ | H | F | OCF₂CHFCF₃ | F | F |
| CH₂=CHCH₂CH₂ | F | F | OCF₂CHFCF₃ | F | F |
| H | H | H | CN | H | H |
| H | H | H | CN | F | H |
| H | H | H | CN | F | F |
| H | H | F | CN | F | F |
| H | F | F | CN | F | F |
| CH₃ | H | H | CN | H | H |
| CH₃ | H | H | CN | F | H |
| CH₃ | H | H | CN | F | F |
| CH₃ | H | F | CN | F | F |
| CH₃ | F | F | CN | F | F |
| C₂H₅ | H | H | CN | H | H |
| C₂H₅ | H | H | CN | F | H |
| C₂H₅ | H | H | CN | F | F |
| C₂H₅ | H | F | CN | F | F |
| C₂H₅ | F | F | CN | F | F |
| n-C₃H₇ | H | H | CN | H | H |
| n-C₃H₇ | H | H | CN | F | H |
| n-C₃H₇ | H | H | CN | F | F |
| n-C₃H₇ | H | F | CN | F | F |
| n-C₃H₇ | F | F | CN | F | F |
| n-C₄H₉ | H | H | CN | H | H |
| n-C₄H₉ | H | H | CN | F | H |
| n-C₄H₉ | H | H | CN | F | F |
| n-C₄H₉ | H | F | CN | F | F |
| n-C₄H₉ | F | F | CN | F | F |
| n-C₅H₁₁ | H | H | CN | H | H |
| n-C₅H₁₁ | H | H | CN | F | H |
| n-C₅H₁₁ | H | H | CN | F | F |
| n-C₅H₁₁ | H | F | CN | F | F |
| n-C₅H₁₁ | F | F | CN | F | F |
| n-C₆H₁₃ | H | H | CN | H | H |
| n-C₆H₁₃ | H | H | CN | F | H |
| n-C₆H₁₃ | H | H | CN | F | F |
| n-C₆H₁₃ | H | F | CN | F | F |
| n-C₆H₁₃ | F | F | CN | F | F |
| CH₂=CH | H | H | CN | H | H |
| CH₂=CH | H | H | CN | F | H |
| CH₂=CH | H | H | CN | F | F |
| CH₂=CH | H | F | CN | F | F |
| CH₂=CH | F | F | CN | F | F |
| CH₃CH=CH | H | H | CN | H | H |
| CH₃CH=CH | H | H | CN | F | H |
| CH₃CH=CH | H | H | CN | F | F |
| CH₃CH=CH | H | F | CN | F | F |

-continued

| $R^2$ | $L^7$ | $L^8$ | $X^2$ | $L^3$ | $L^4$ |
|---|---|---|---|---|---|
| CH₃CH=CH | F | F | CN | F | F |
| CH₂=CHCH₂CH₂ | H | H | CN | H | H |
| CH₂=CHCH₂CH₂ | H | H | CN | F | H |
| CH₂=CHCH₂CH₂ | H | H | CN | F | F |
| CH₂=CHCH₂CH₂ | H | F | CN | F | F |
| CH₂=CHCH₂CH₂ | F | F | CN | F | F |

Example M1

| | | | |
|---|---|---|---|
| CCP-1F.F.F | 2.00% | Clearing point [° C.]: | 72.0 |
| CCP-3OCF₃ | 5.00% | Δn [589 nm; 20° C.]: | 0.0779 |
| CCQU-5-F | 4.00% | γ₁ [mPa·s; 20° C.]: | 98 |
| CCQU-1-F | 14.00% | V₁₀ [V]: | 1.23 |
| CCQU-2-F | 9.00% | | |
| CCQU-3-F | 9.00% | | |
| CPUQU-2-F | 8.00% | | |
| CPUQU-3-F | 3.00% | | |
| CDU-2-F | 8.00% | | |
| CDU-3-F | 9.00% | | |
| PGU-2-F | 4.00% | | |
| CC-3-V1 | 12.00% | | |
| CC-5-V | 8.00% | | |
| CCH-35 | 5.00% | | |

Example M2

| | | | |
|---|---|---|---|
| CC-3-V | 19.00% | Clearing point [° C.]: | 80.6 |
| CCH-35 | 4.00% | Δn [589 nm; 20° C.]: | 0.0763 |
| CCQU-1-F | 11.00% | γ₁ [mPa·s; 20° C.]: | 105 |
| CCQU-2-F | 10.00% | V₁₀ [V]: | 1.24 |
| CCP-2OCF₃ | 8.00% | | |
| CCP-3OCF₃ | 8.00% | | |
| CCP-4OCF₃ | 6.00% | | |
| CCZU-2-F | 4.00% | | |
| CCZU-3-F | 15.00% | | |
| CGUQU-2-F | 10.00% | | |
| CGUQU-3-F | 5.00% | | |

Example M3

| | | | |
|---|---|---|---|
| CCP-1F.F.F | 8.00% | Clearing point [° C.]: | 90.5 |
| CCP-2F.F.F | 8.00% | Δn [589 nm; 20° C.]: | 0.0783 |
| CCP-3F.F.F | 7.00% | V₁₀ [V]: | 1.14 |
| CCP-5F.F.F | 5.00% | | |
| CCP-2OCF₃.F | 10.00% | | |
| CCP-5OCF₃.F | 10.00% | | |
| CGUQU-2-F | 6.00% | | |
| CGUQU-3-F | 5.00% | | |
| CCOC-3-3 | 3.00% | | |
| CCOC-4-3 | 4.00% | | |
| CCOC-3-5 | 2.00% | | |
| CCQU-1-F | 10.00% | | |
| CCQU-2-F | 10.00% | | |
| CCQU-3-F | 12.00% | | |

Example M4

| | |
|---|---|
| CCP-1F.F.F | 8.00% |
| CCP-2F.F.F | 9.00% |
| CCP-3F.F.F | 9.00% |
| CCP-5F.F.F | 5.00% |
| CCP-2OCF₃.F | 11.00% |
| CCP-5OCF₃.F | 12.00% |
| CCQU-2-F | 10.00% |
| CCQU-3-F | 12.00% |
| CCQU-5-F | 8.00% |
| CUUQU-2-F | 5.00% |
| CUUQU-3-F | 6.00% |
| CCH-5CF₃ | 1.00% |
| CCOC-3-3 | 2.00% |
| CCOC-4-3 | 2.00% |

Example M5

| | | | |
|---|---|---|---|
| CECU-2-F | 4.00% | Clearing point [° C.]: | 79.1 |
| CECU-5-F | 9.00% | Δn [589 nm; 20° C.]: | 0.0742 |
| CCP-2F.F.F | 9.00% | Δε [kHz, 20° C.]: | 11.1 |
| CCP-3F.F.F | 10.00% | γ₁ [mPa·s; 20° C.]: | 163 |
| CCP-5F.F.F | 6.00% | | |
| CCZU-2-F | 4.00% | | |
| CCZU-3-F | 15.00% | | |
| CCZU-5-F | 4.00% | | |
| CCPU-5-F | 2.00% | | |
| CCQU-1-F | 8.00% | | |
| CCQU-2-F | 10.00% | | |
| CCQU-3-F | 11.00% | | |
| CGUQU-2-F | 8.00% | | |

Example M6

| | | | |
|---|---|---|---|
| CCQG-2-F | 8.00% | Clearing point [° C.]: | 73.5 |
| CCQG-3-F | 8.00% | Δn [589 nm; 20° C.]: | 0.0733 |
| CCQG-5-F | 8.00% | Δε [kHz, 20° C.]: | 11.8 |
| CGUQU-2-F | 7.00% | γ₁ [mPa·s; 20° C.]: | 138 |
| CGUQU-3-F | 5.00% | | |
| CCQU-1-F | 9.00% | | |
| CCQU-2-F | 10.00% | | |
| CCQU-3-F | 10.00% | | |
| CCQU-2-OT | 9.00% | | |
| CCQU-3-OT | 9.00% | | |
| CCQU-4-OT | 9.00% | | |
| CQU-3-F | 4.00% | | |
| CQU-5-F | 4.00% | | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium comprising a mixture of polar compounds of positive dielectric anisotropy, which comprises one or more compounds of the formula I

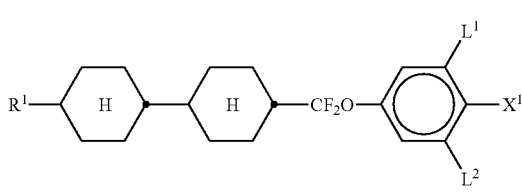

and one or more compounds of the formula IA

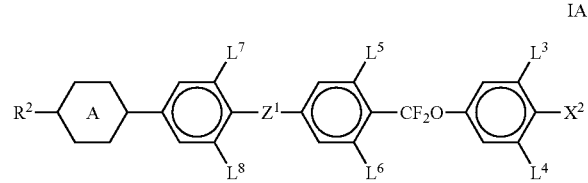

in which the individual radicals have the following meanings:

$R^1$ and $R^2$ are each, independently of one another, H, a halogenated or unsubstituted alkyl radical having from 1 to 15 carbon atoms, where one or more $CH_2$ groups in these radicals are optionally replaced, in each case independently of one another, by —C≡C—, —CH=CH—, —O—,

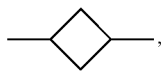

—CO—O— or —O—CO— in such a way that O atoms are not linked directly to one another, $X^1$ and $X^2$ are each, independently of one another, F, Cl, CN, $SF_5$, SCN, or OCN, or a halogenated alkyl radical, a halogenated alkenyl radical, a halogenated alkoxy radical or a halogenated alkenyloxy radical each having 1 to 6 carbon atoms, is

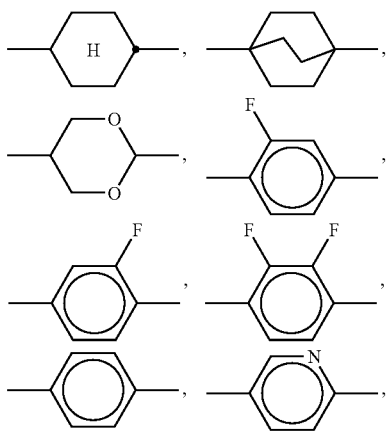

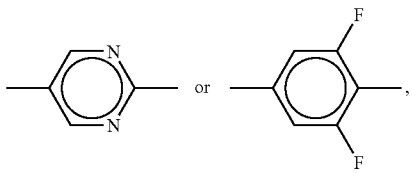

$Z^1$ is —$CH_2CH_2$—, —CH=CH—, —C≡C—, —COO—, —$CH_2O$—, —$OCH_2$—, —OOC—, —$(CH_2)_4$—, —CHFO—, —CH=CF—, —CF=CH—, —CF=CF—, —$C_2F_4$—, —$CF_2O$—, —$OCF_2$— or a single bond, $L^{1-8}$ are each, independently of one another, H or F, provided that at least one of $L^5$, $L^6$, $L^7$ or $L^8$ is F.

2. A liquid-crystalline medium comprising a mixture of polar compounds of positive dielectric anisotropy, which comprises one or more compounds of the formula I:

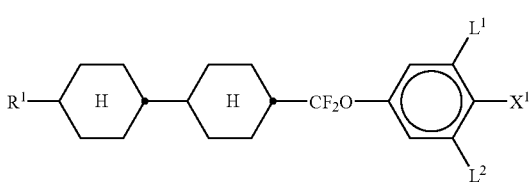

in which the individual radicals have the following meanings:

$R^1$ is H, a halogenated or unsubstituted alkyl radical having from 1 to 15 carbon atoms, where one or more $CH_9$ grouns in these radicals are optionally replaced, in each case independently of one another, by —C≡C—, —CH=CH—, —O—,

—CO—O— or —O—CO— in such a way that O atoms are not linked directly to one another, $X^1$ is F, Cl, CN, $SF_5$, SCN, OCN, or NCS, or a halogenated alkyl radical, a halogenated alkenyl radical, a halogenated alkoxy radical or a halogenated alkenyloxy radical each having 1 to 6 carbon atoms, $L^1$ and $L^2$ are each, independently of one another, H or F; and which further comprises one, two or more compounds of the formulae IA-1 to IA-108:

IA-1

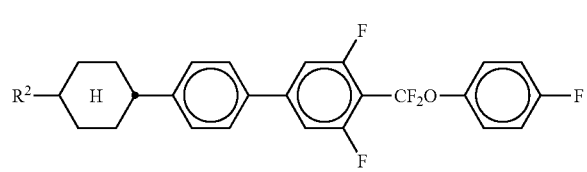

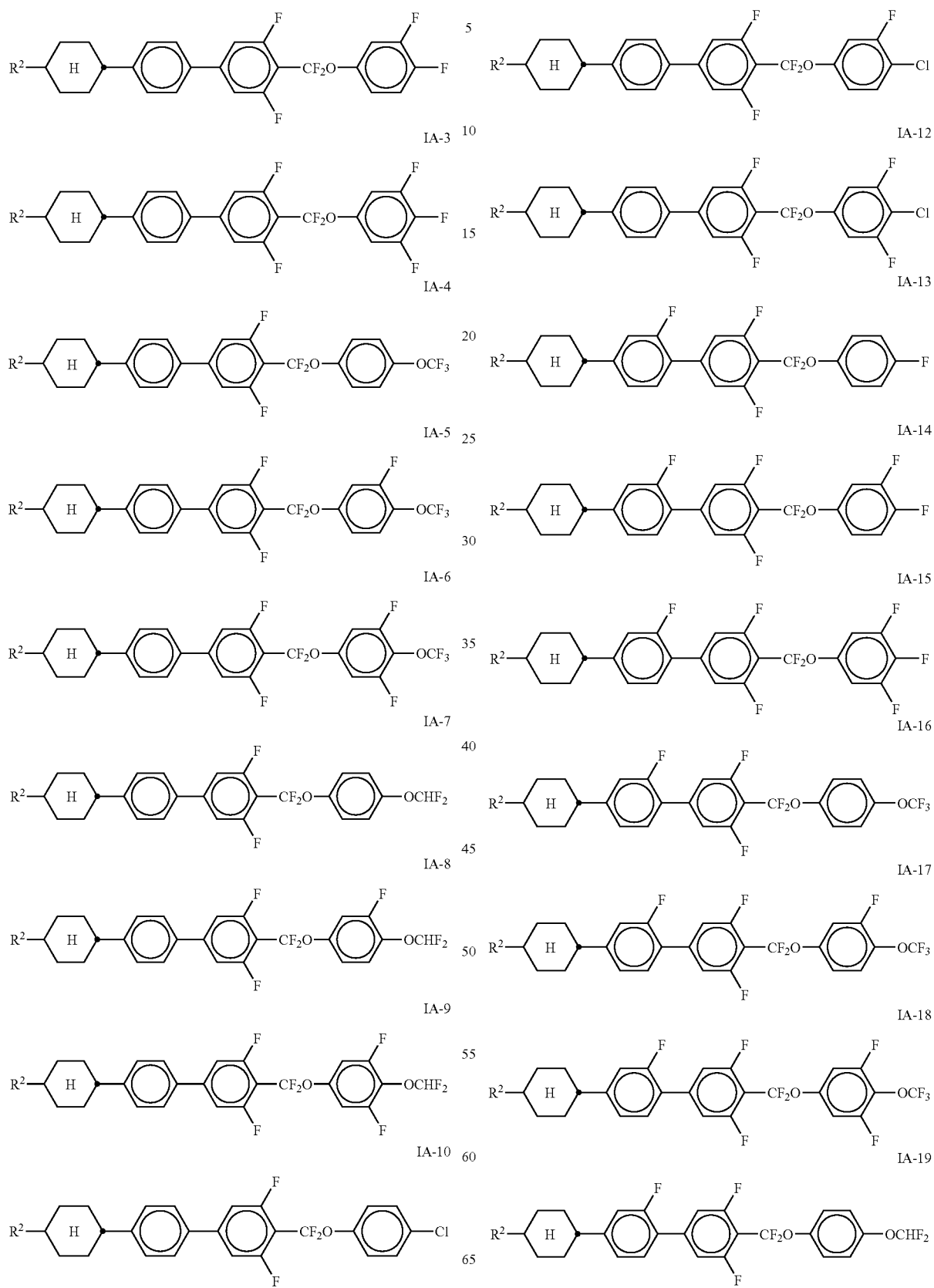

-continued
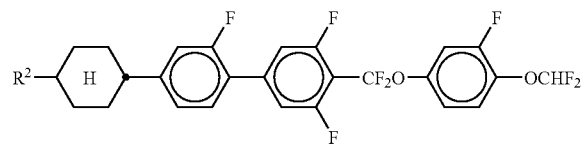
IA-20
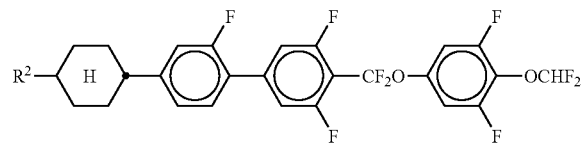
IA-21
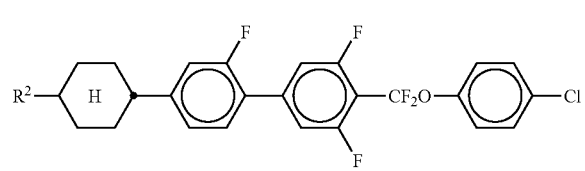
IA-22
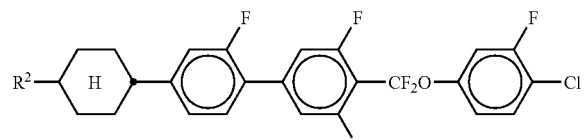
IA-23
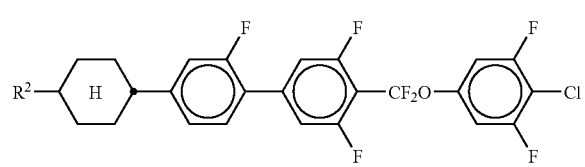
IA-24
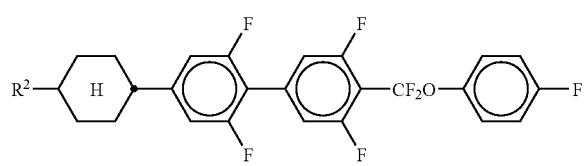
IA-25
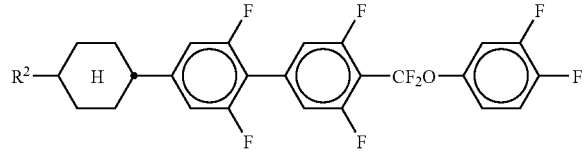
IA-26
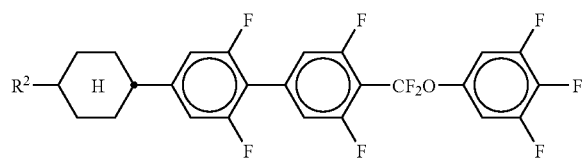
IA-27
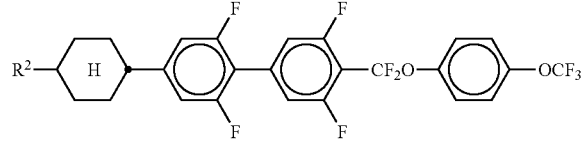
IA-28
-continued
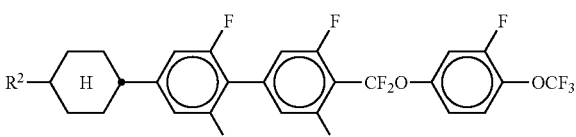
IA-29
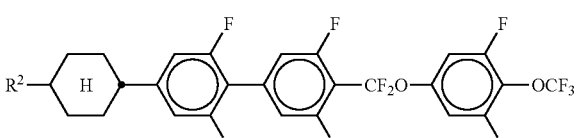
IA-30
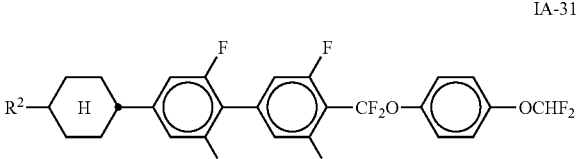
IA-31
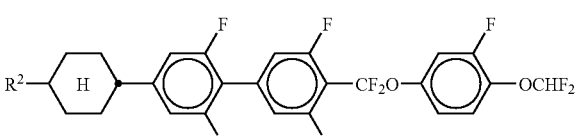
IA-32
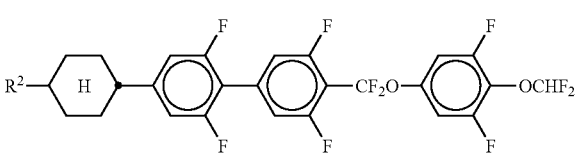
IA-33
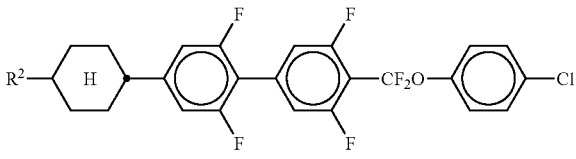
IA-34
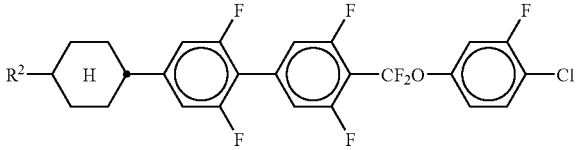
IA-35
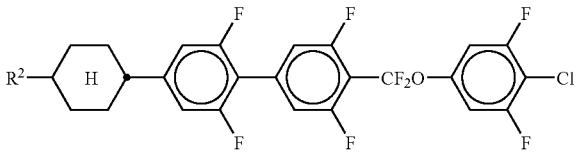
IA-36
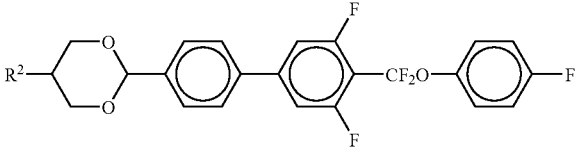
IA-37

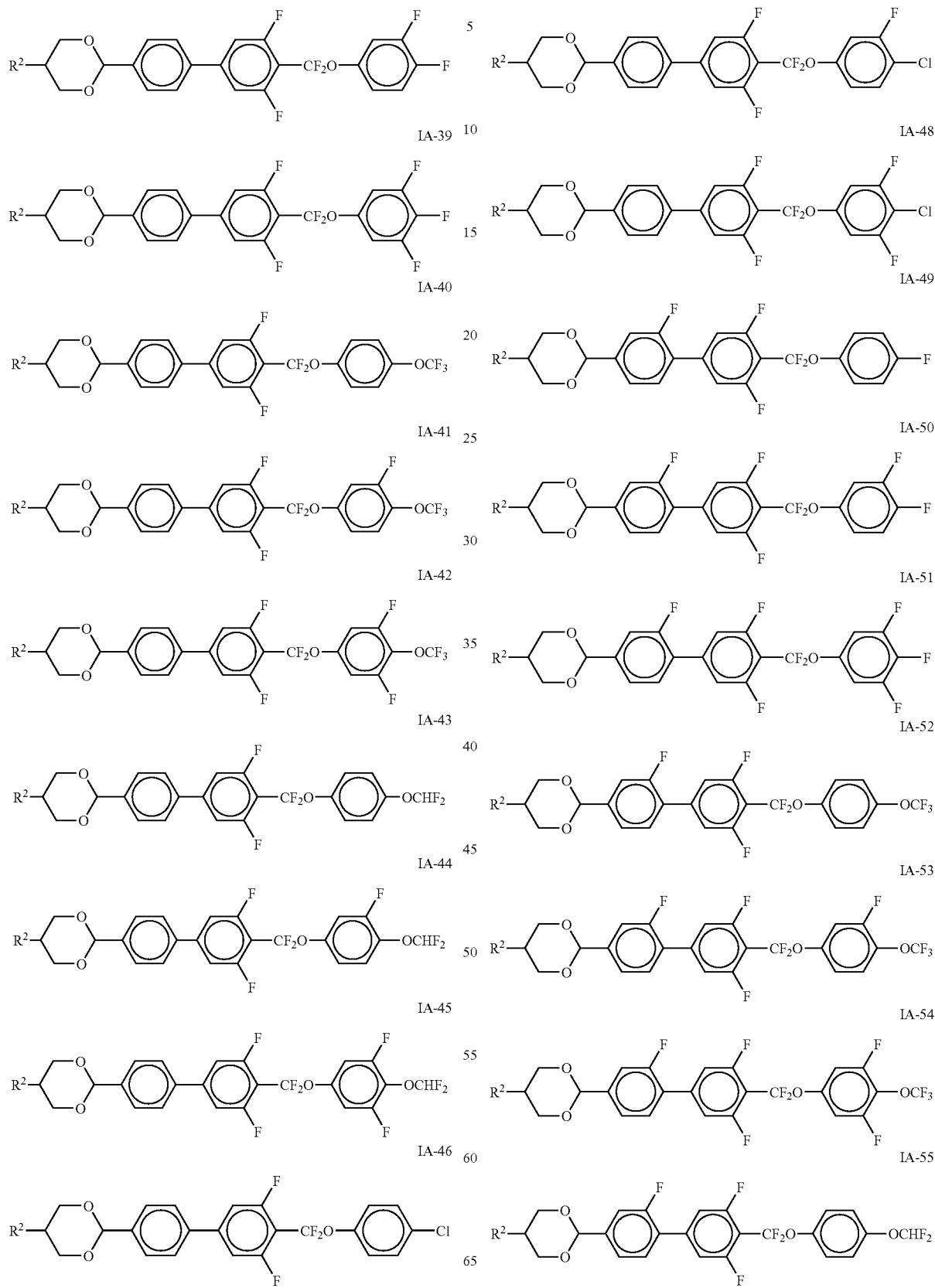

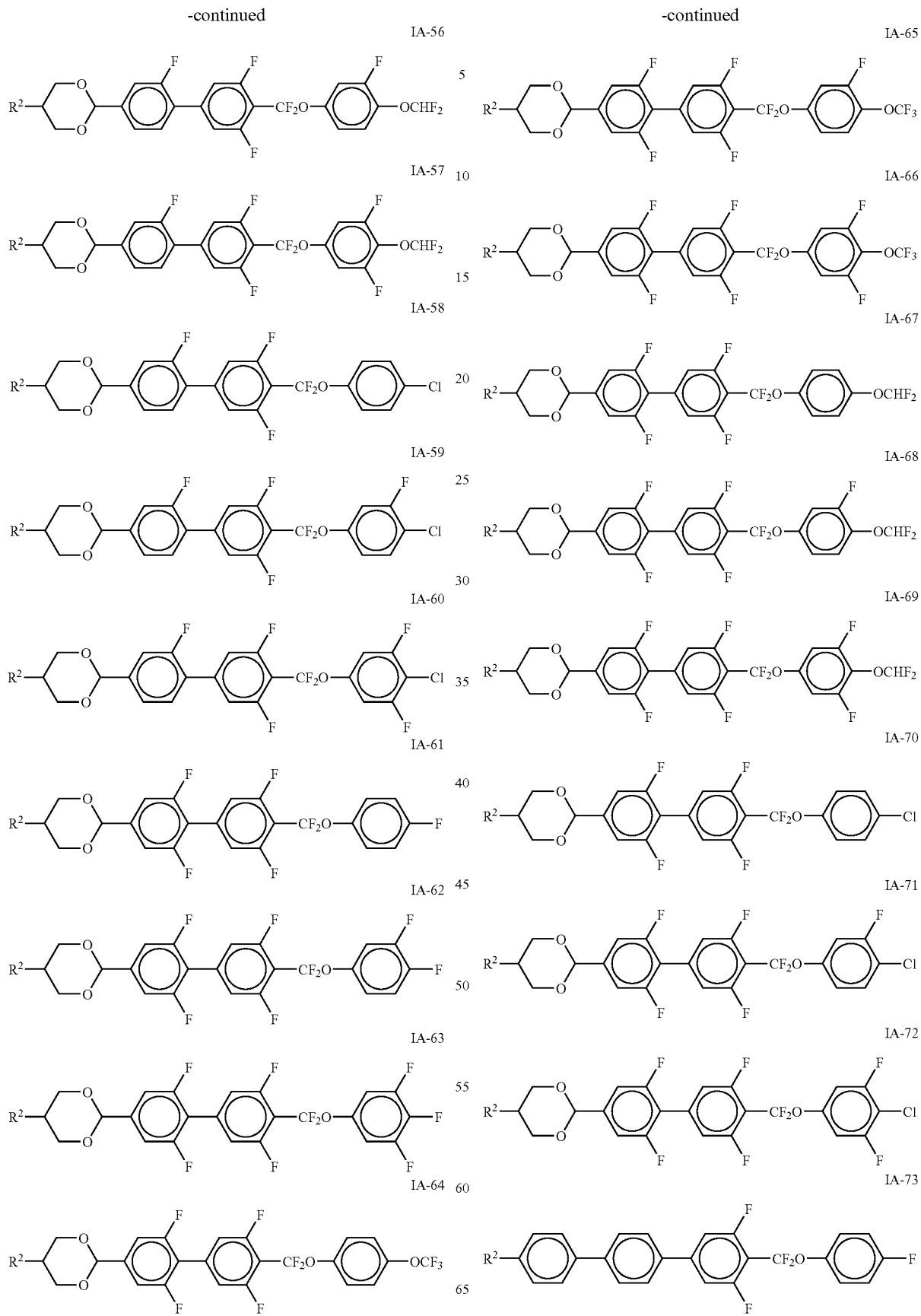

-continued
IA-74
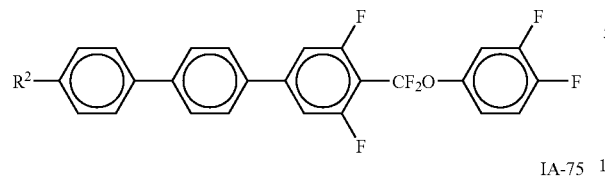
IA-75
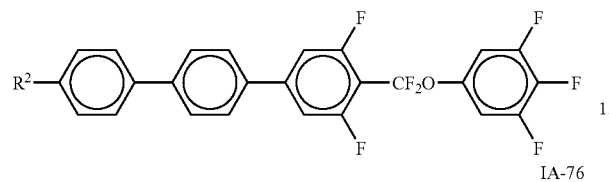
IA-76
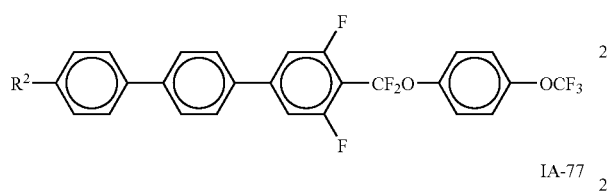
IA-77
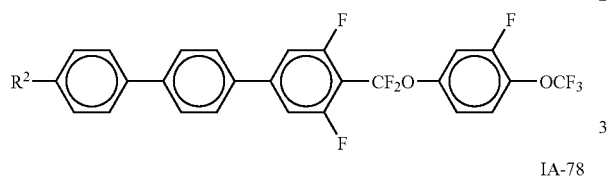
IA-78
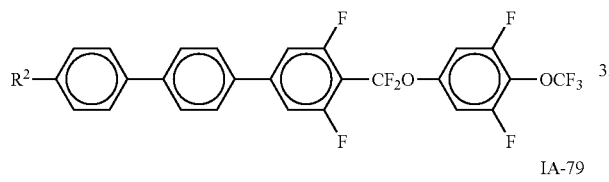
IA-79
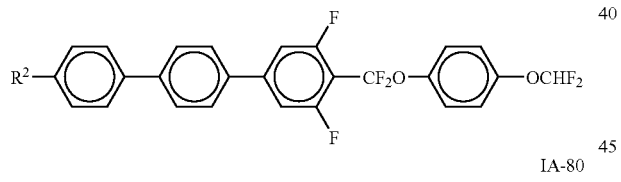
IA-80
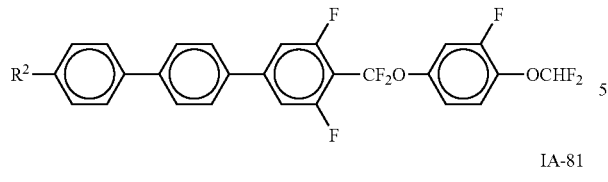
IA-81
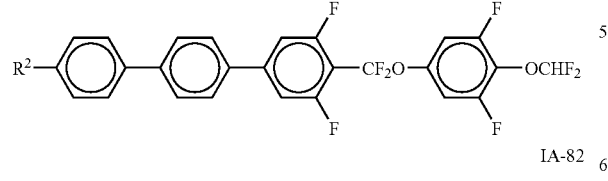
IA-82
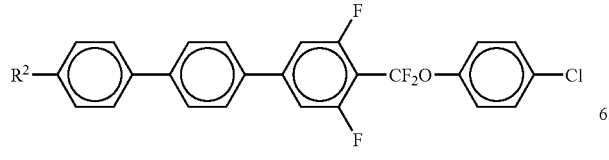
-continued
IA-83
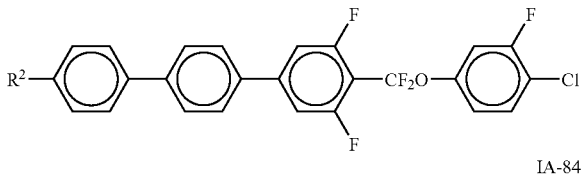
IA-84
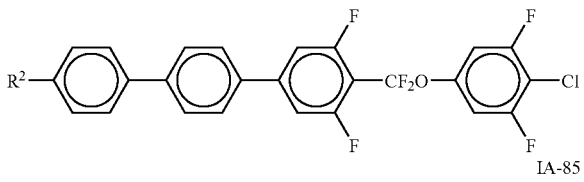
IA-85
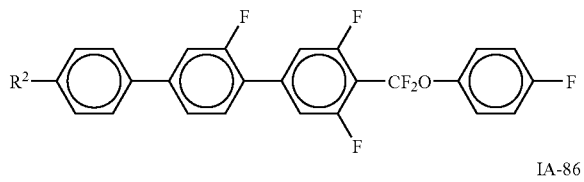
IA-86
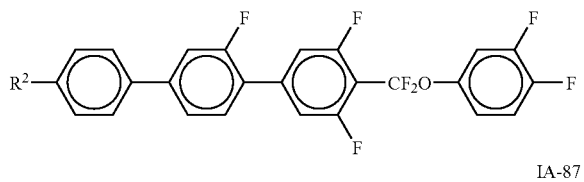
IA-87
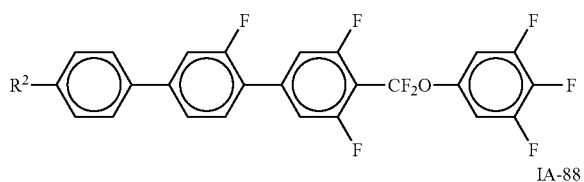
IA-88
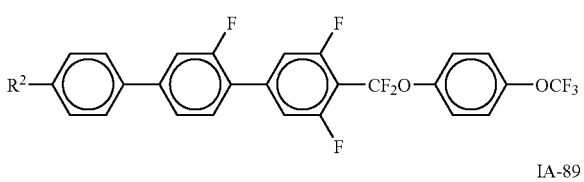
IA-89
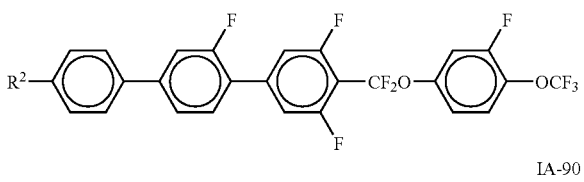
IA-90
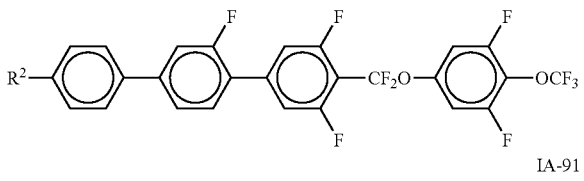
IA-91

-continued
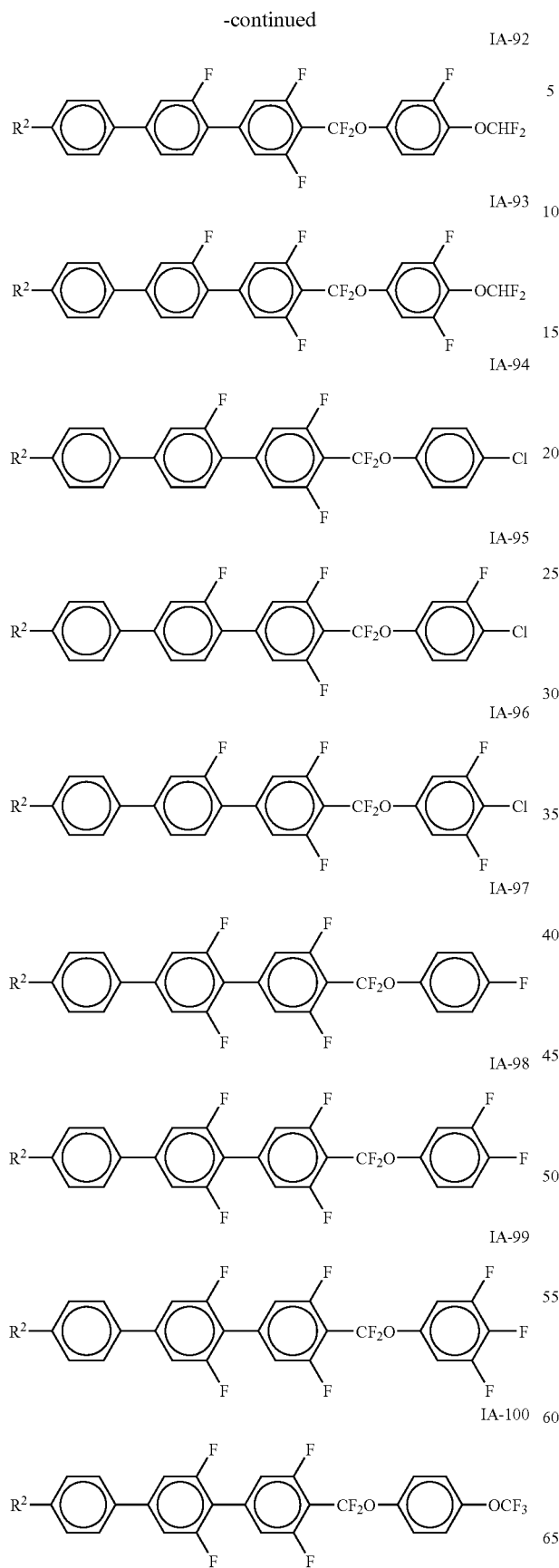
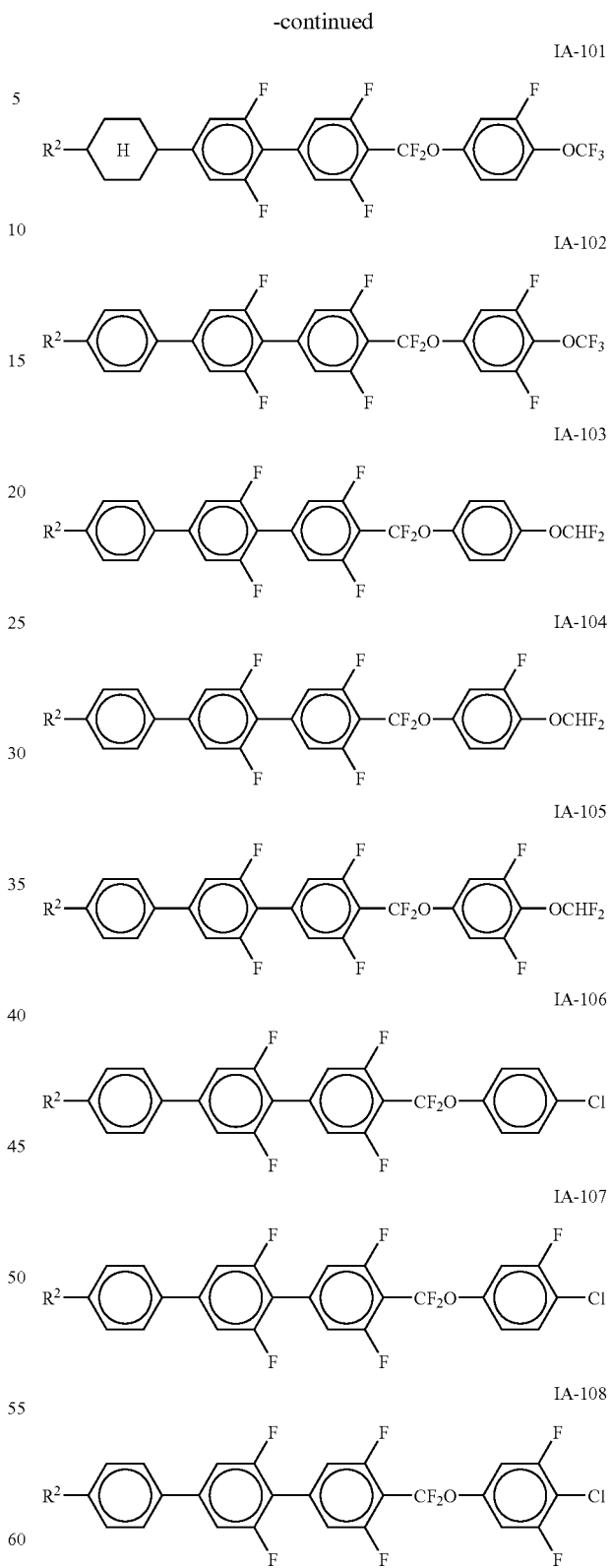
in which R² is, independently, as defined for R¹ above.
3. A liquid-crystalline medium according to claim 1, which comprises one or more compounds of the formulae I-1 to I-27:

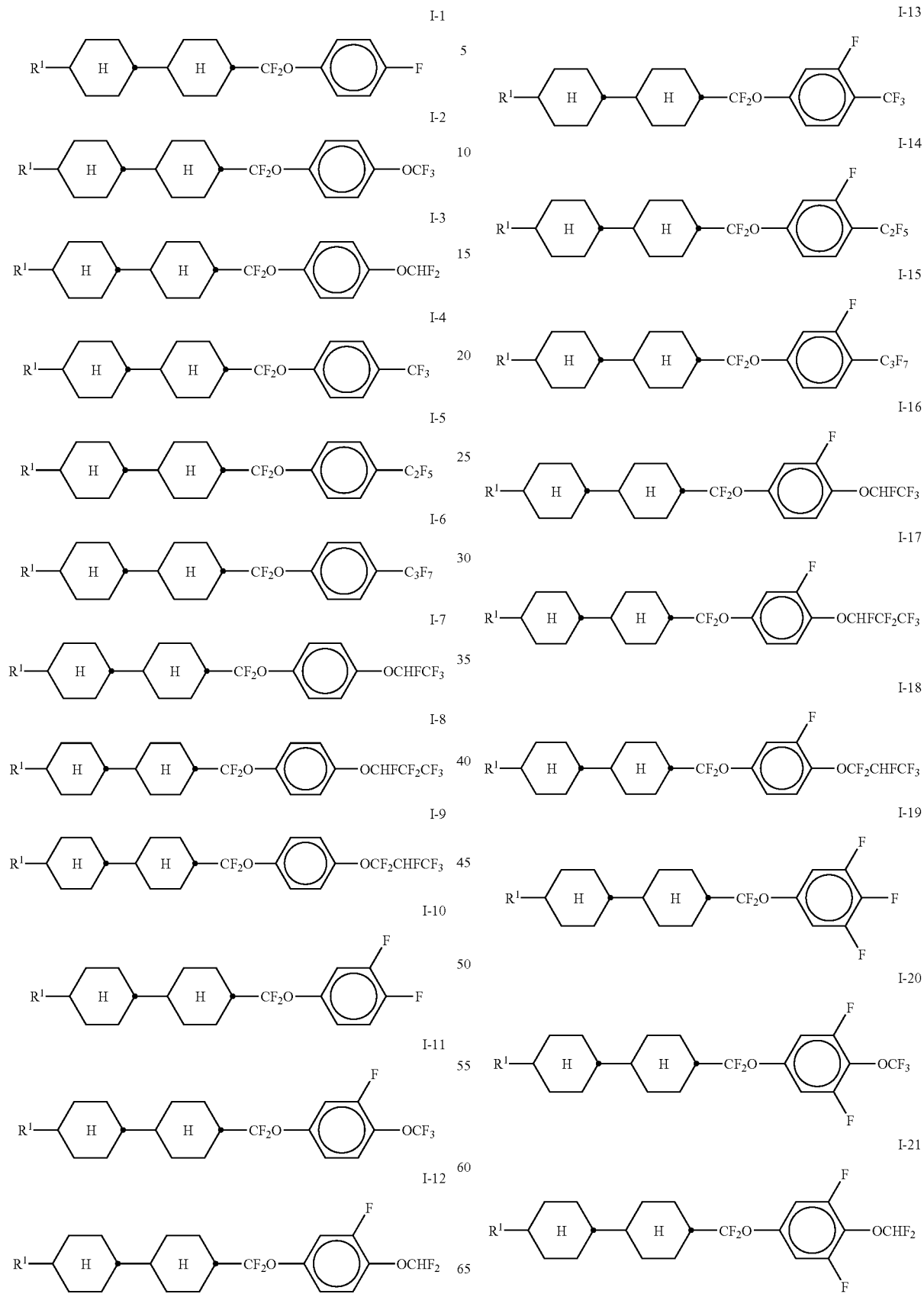

-continued
I-22
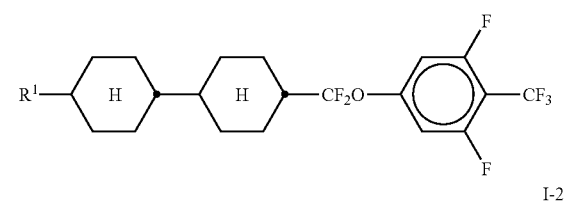
I-23
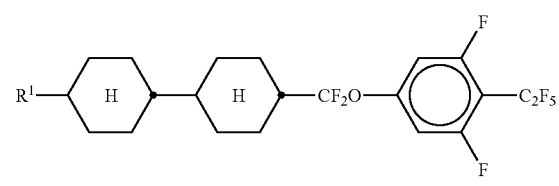
I-24
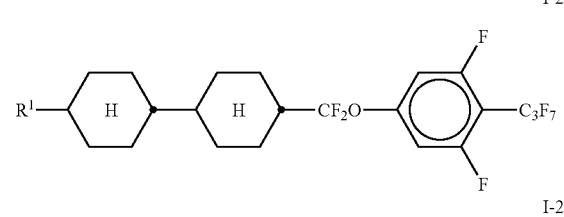
I-25
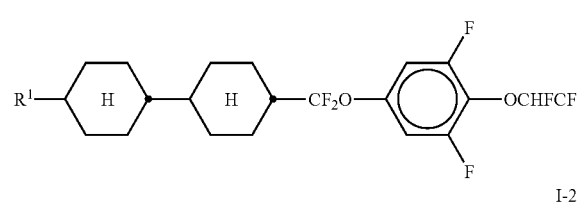
I-26
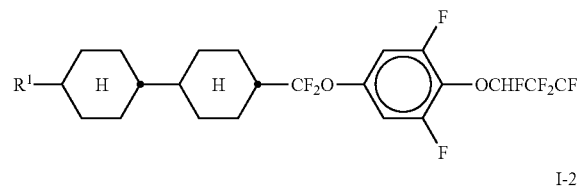
I-27
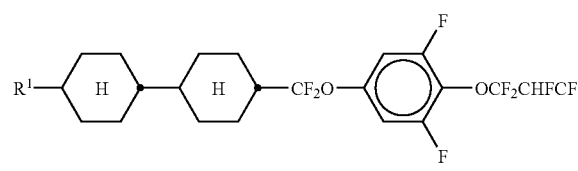
in which R$^1$ is as defined above.
4. A liquid-crystalline medium according to claim 2, which comprises one or more compounds of the formulae I-1 to I-27:
I-1
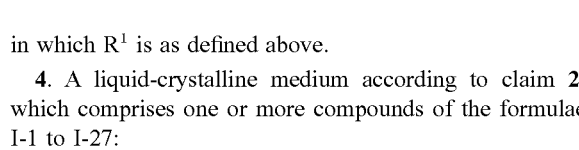
I-2
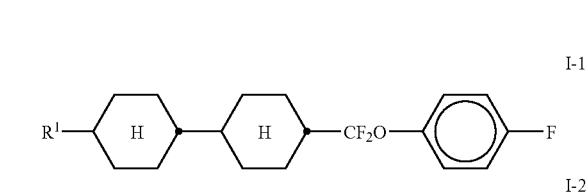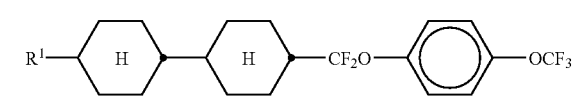
-continued
I-3
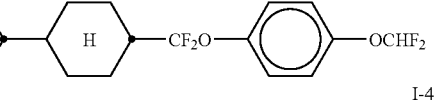
I-4
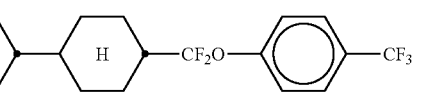
I-5
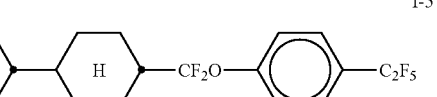
I-6
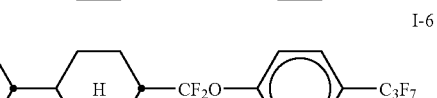
I-7
I-8
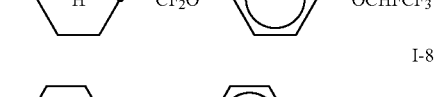
I-9
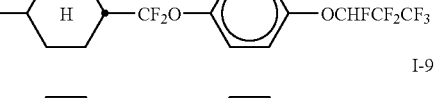
I-10
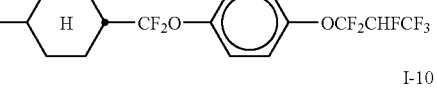
I-11
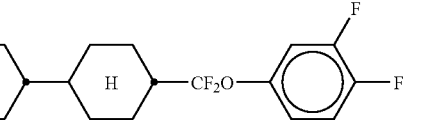
I-12
I-13
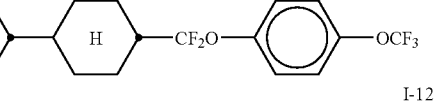
I-14

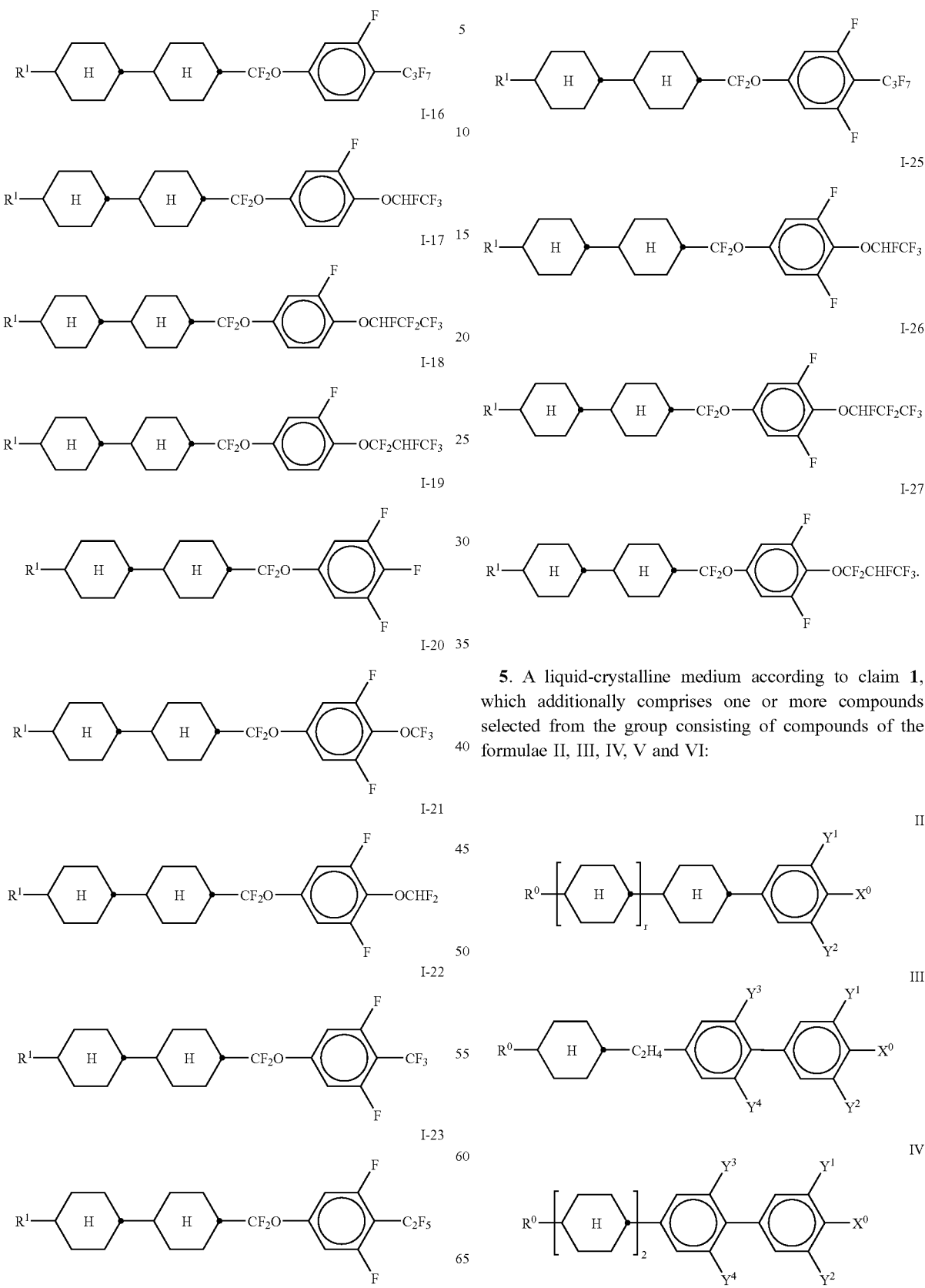
5. A liquid-crystalline medium according to claim 1, which additionally comprises one or more compounds selected from the group consisting of compounds of the formulae II, III, IV, V and VI:

-continued

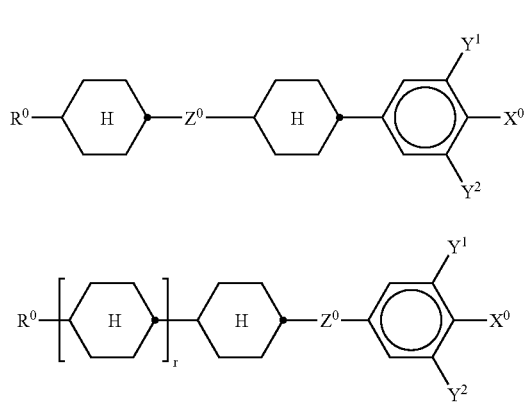

in which the individual radicals have the following meanings:

R⁰ is H, n-alkyl, oxaalkyl, alkoxy, fluoroalkyl or alkenyl, each having 1 to 9 carbon atoms, X⁰ is F, Cl, halogenated alkyl, halogenated alkenyl, halogenated alkenyloxy or alkoxy having 1 to 6 carbon atoms, Z⁰ is —C$_2$F$_4$—, —CF═CF—, —CH═CF—, —CF═CH—, —C$_2$H$_4$—, —(CH$_2$)$_4$—, —OCHF—, —CHFO—, —CH═CH—, —COO—, —OCO—, —CF$_2$O—, —OCF$_2$—, —OCH$_2$— or —CH$_2$O—, Y¹, Y², Y³ and Y⁴ are each, independently of one another, H or F, r is 0 or 1, and the compound of the formula VI is not identical with the compound of the formula I.

6. A liquid-crystalline medium according to claim 4, which additionally comprises one or more compounds selected from the group consisting of compounds of the formulae II, III, IV, V and VI:

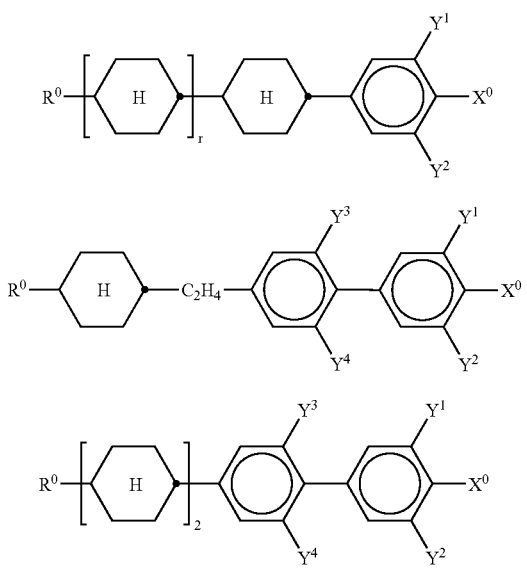

-continued

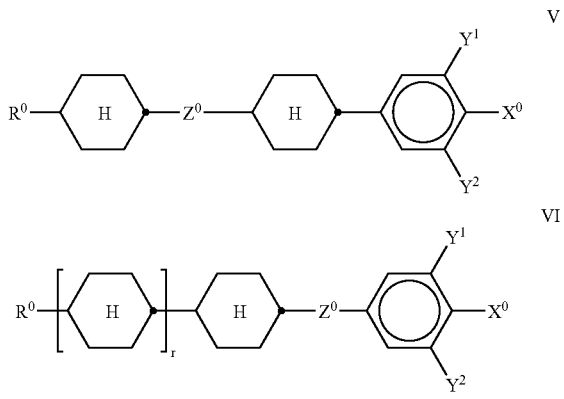

in which the individual radicals have the following meanings:

R⁰ is H, n-alkyl, oxaalkyl, alkoxy, fluoroalkyl or alkenyl, each having 1 to 9 carbon atoms, X⁰ is F, Cl, halogenated alkyl, halogenated alkenyl, halogenated alkenyloxy or alkoxy having 1 to 6 carbon atoms, Z⁰ is —C$_2$F$_4$—, —CF═CF—, —CH═CF—, —CF═CH—, —C$_2$H$_4$—, —(CH$_2$)$_4$—, —OCHF—, —CHFO—, —CH═CH—, —COO—, —OCO—, —CF$_2$O—, —OCF$_2$—, —OCH$_2$— or —CH$_2$O—, Y¹, Y², Y³ and Y⁴ are each, independently of one another, H or F, r is 0 or 1, and the compound of the formula VI is not identical with the compound of the formula I.

7. A liquid-crystalline medium according to claim 6, wherein the proportion of compounds of the formulae IA-1 to IA-108 and I to VI together in the medium as a whole is at least 50% by weight.

8. A liquid-crystalline medium according to claim 1, which additionally comprises one or more compounds of the formulae Ea to Ef:

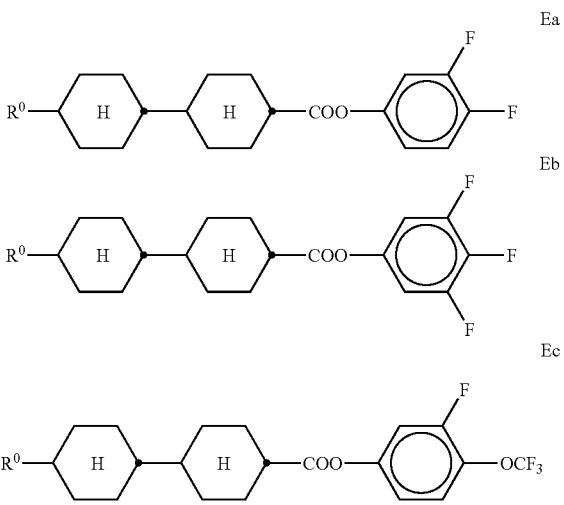

-continued

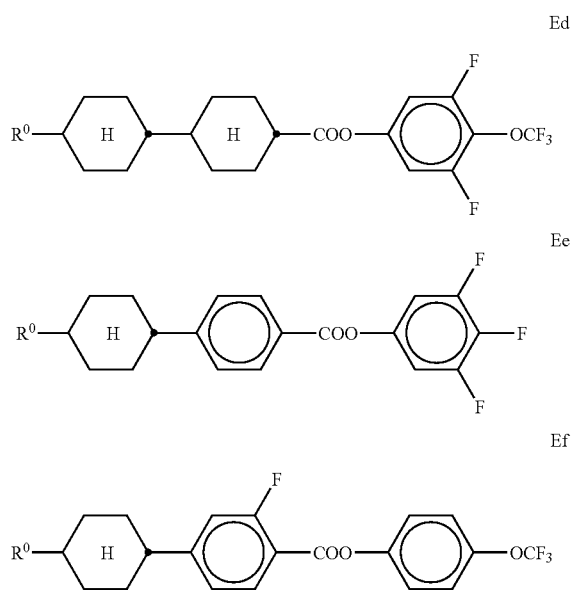

in which
R⁰ is H, n-alkyl, oxaalkyl, alkoxy, fluoroalkyl or alkenyl, each having 1 to 9 carbon atoms.

9. A liquid-crystalline medium according to claim 1, which additionally comprises one or more compounds of the formulae IIa to IIg:

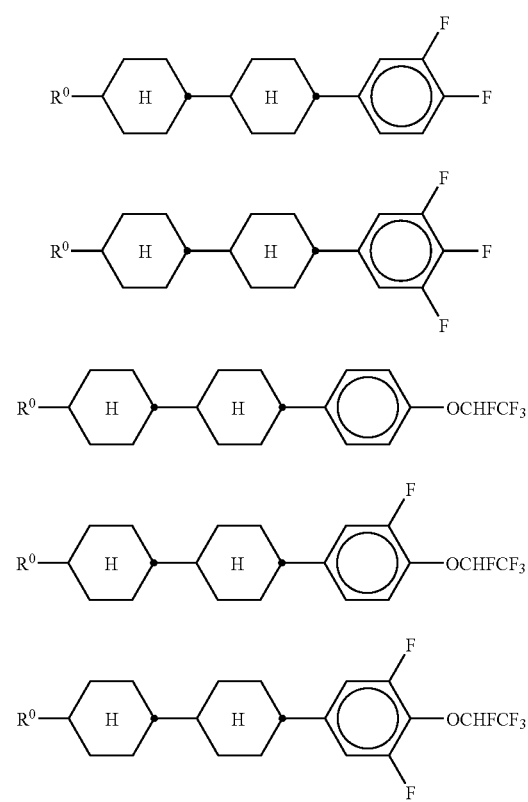

-continued

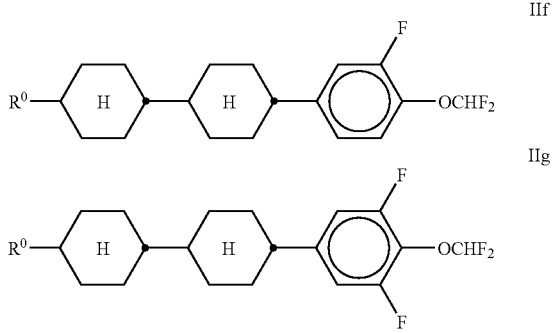

in which
R⁰ is H, n-alkyl, oxaalkyl, alkoxy, fluoroalkyl or alkenyl, each having 1 to 9 carbon atoms.

10. A liquid-crystalline medium according to claim 1, which additionally comprises one or more compounds of the formulae RI to RIX:

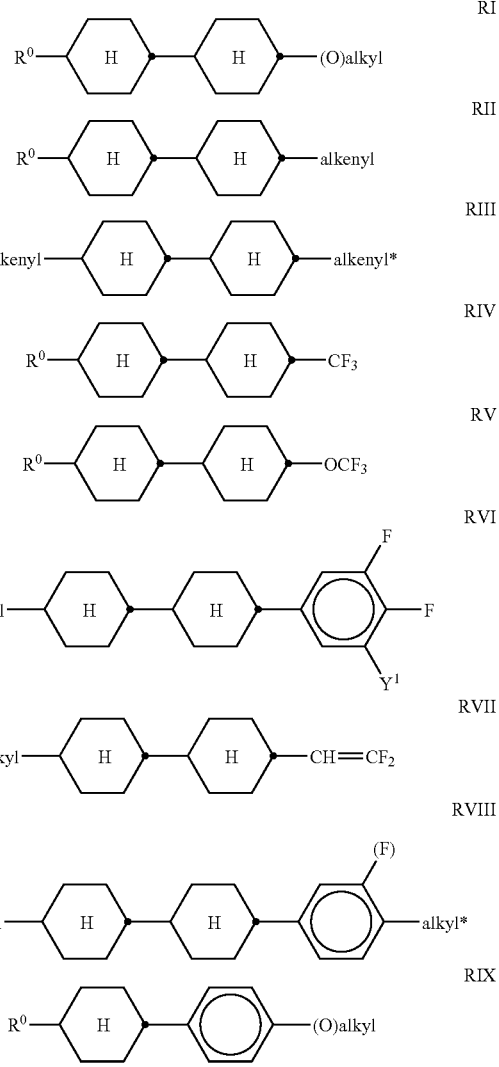

in which

R⁰ is n-alkyl, alkoxy, oxaalkyl, fluoroalkyl, alkenyloxy or alkenyl, each having 1 to 9 carbon atoms, Y¹ is H or F, alkyl and alkyl* are each, independently of one another, a straight-chain or branched alkyl radical having 1–9 carbon atoms, alkenyl and alkenyl* are each, independently of one another, a straight-chain or branched alkenyl radical having from 2 to 9 carbon atoms.

11. A liquid-crystalline medium according to claim 1, wherein the proportion of compounds of the formula IA in the medium as a whole is from 5 to 40% by weight.

12. A liquid-crystalline medium according to claim 1, wherein the proportion of compounds of the formula I in the medium as a whole is from 5 to 40% by weight.

13. An electro-optical liquid-crystal display containing a liquid-crystalline medium according to claim 1.

14. A liquid-crystalline medium according to claim 1, wherein the medium further comprises one or more compounds of the formula I or IA

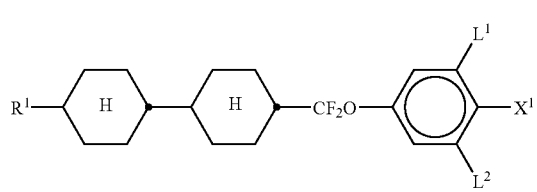
I

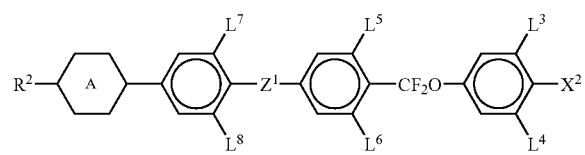
IA in which the individual radicals are as defined in claim 1, except that X¹ and X² are —NCS.

15. A liquid-crystalline medium according to claim 5, wherein the proportion of compounds of the formulae IA and I to VI together in the medium as a whole is at least 50% by weight.

16. A liquid-crystalline medium according to claim 2, which additionally comprises one or more compounds of the formulae Ea to Ef:

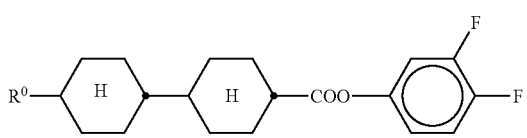
Ea

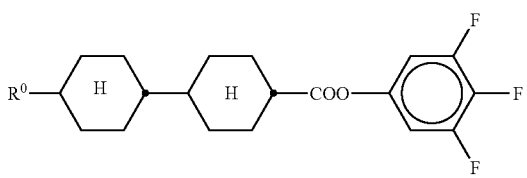
Eb

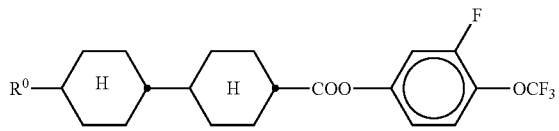
Ec

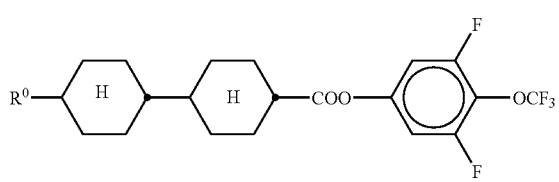
Ed

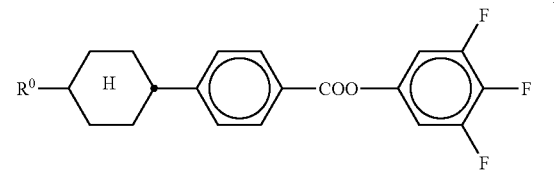
Ee

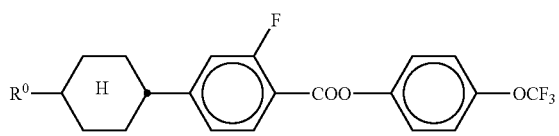
Ef in which

R⁰ is H, n-alkyl, oxaalkyl, alkoxy, fluoroalkyl or alkenyl, each having 1 to 9 carbon atoms.

17. A liquid-crystalline medium according to claim 2, which additionally comprises one or more compounds of the formulae IIa to IIg:

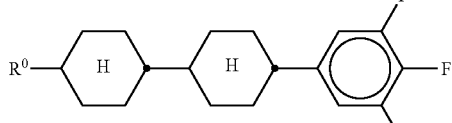
IIa

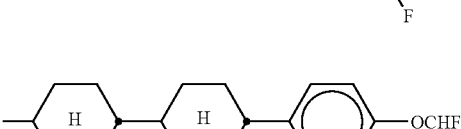
IIb

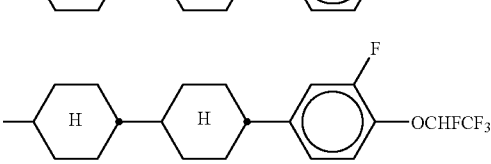
IIc

IId

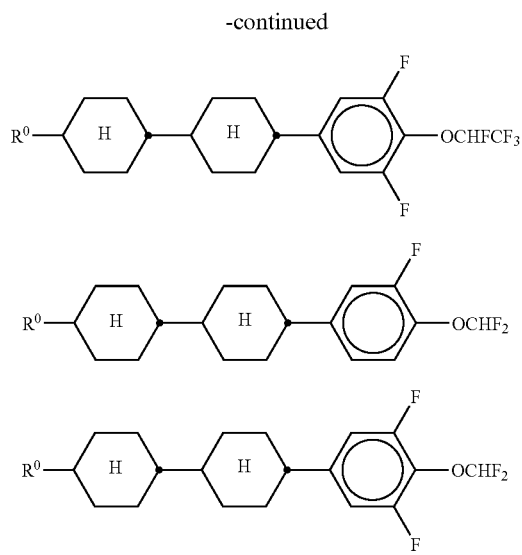

in which
R⁰ is H, n-alkyl, oxaalkyl, alkoxy, fluoroalkyl or alkenyl, each having 1 to 9 carbon atoms.

18. A liquid-crystalline medium according to claim 2, which additionally comprises one or more compounds of the formulae RI to RIX:

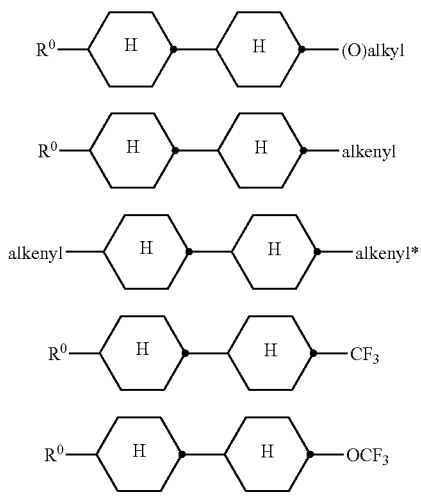

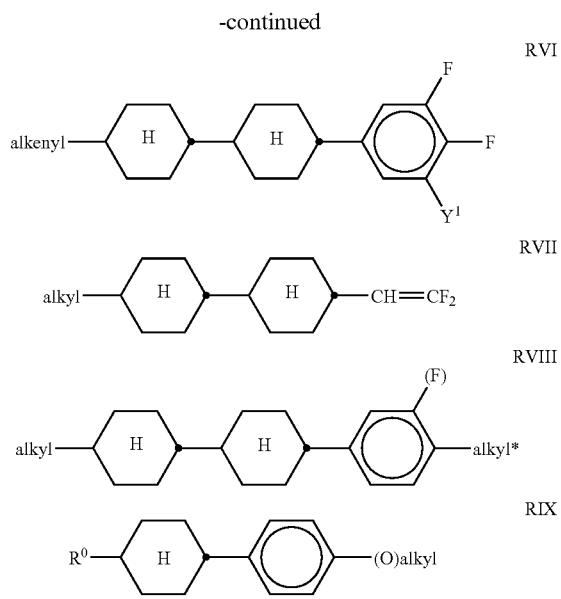

in which
R⁰ is n-alkyl, alkoxy, oxaalkyl, fluoroalkyl, alkenyloxy or alkenyl, each having 1 to 9 carbon atoms,
Y¹ is H or F,
alkyl and
alkyl* are each, independently of one another, a straight-chain or branched alkyl radical having 1–9 carbon atoms,
alkenyl and
alkenyl* are each, independently of one another, a straight-chain or branched alkenyl radical having from 2 to 9 carbon atoms.

19. A liquid-crystalline medium according to claim 2, wherein the proportion of compounds of the formulae IA-1 to IA-108 in the medium as a whole is from 5 to 40% by weight.

20. A liquid-crystalline medium according to claim 2, wherein the proportion of compounds of the formula I in the medium as a whole is from 5 to 40% by weight.

21. An electro-optical liquid-crystal display containing a liquid-crystalline medium according to claim 2.

* * * * *

UNITED STATES PATENT AND TRADEMARK OFFICE
CERTIFICATE OF CORRECTION

| | |
|---|---|
| PATENT NO. | : 7,105,210 B2 |
| APPLICATION NO. | : 10/792794 |
| DATED | : September 12, 2006 |
| INVENTOR(S) | : Michael Heckmeier et al. |

It is certified that error appears in the above-identified patent and that said Letters Patent is hereby corrected as shown below:

Column 90, line 37, reads "$CH_9$ grouns" should read -- $CH_2$ groups --

Signed and Sealed this

Twenty-second Day of May, 2007

JON W. DUDAS
*Director of the United States Patent and Trademark Office*